(12) United States Patent
Bailey et al.

(10) Patent No.: US 7,273,514 B2
(45) Date of Patent: *Sep. 25, 2007

(54) APPARATUS AND METHOD FOR FILTERING PARTICULATE AND NOX EMISSIONS

(75) Inventors: John M. Bailey, Dunlap, IL (US); Donald J. Waldman, deceased, late of Brimfield, IL (US); by Marianne F. Waldman, legal representative, Brimfield, IL (US)

(73) Assignee: Illinois Valley Holding Company, Dunlap, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/189,304

(22) Filed: Jul. 26, 2005

(65) Prior Publication Data

US 2006/0059899 A1    Mar. 23, 2006

Related U.S. Application Data

(63) Continuation of application No. 10/467,553, filed on Aug. 1, 2003, now Pat. No. 6,989,045.

(51) Int. Cl.
  *B01D 46/00*  (2006.01)
  *B01D 53/04*  (2006.01)
  *B01D 53/94*  (2006.01)
  *F01N 3/023*  (2006.01)

(52) U.S. Cl. .................. 95/279; 95/8; 95/129; 95/148; 95/273; 95/278; 95/285; 55/282.3; 55/284; 55/302; 55/303; 55/385.3; 55/394; 55/428.1; 55/429; 55/433; 55/523; 55/524; 55/DIG. 10; 55/DIG. 30; 60/274; 60/295; 60/296; 60/297; 60/299; 60/301; 60/303; 60/311; 422/168; 422/180; 422/183

(58) Field of Classification Search ............... 55/282.3, 55/284, 302, 303, 385.3, 398.1, 394, 423, 55/428.1, 429, 432, 523, DIG. 10, DIG. 30, 55/524; 60/274, 295, 296, 297, 299, 301, 60/303, 34; 95/128, 129, 135, 148, 8, 12, 95/273, 278, 285; 422/168, 180, 182, 183
See application file for complete search history.

(56) References Cited

U.S. PATENT DOCUMENTS 3,899,326 A    8/1975   Frost et al.

(Continued)

FOREIGN PATENT DOCUMENTS

JP    4-31613    *  2/1992

OTHER PUBLICATIONS www.dieselnet.com/tech/dpf_regen.html; Diesel Filter Regeneration [subscription], pp. 1-19; DieselNet Technology Guide, Diesel Particulate Filters, 2005.

(Continued)

*Primary Examiner*—Jason M. Greene
(74) *Attorney, Agent, or Firm*—Husch & Eppenberger LLC; H. Frederick Rusche

(57) ABSTRACT

An apparatus and method for filtering particulate from an internal combustion engine by use of monolithic particulate trap systems having porous walls (2c, 24c). The porous walls (2c, 24c) filter the particulate. The filtered particulate on inner surfaces of the porous walls is periodically removed or regenerated via back flow of previously filtered exhaust gas. The back flow is caused by creating a pressure difference across the porous walls. The back flow of the previously filtered exhaust gas is simultaneously or sequentially coupled with high velocity through flow of exhaust gas in the channels. In addition, the particulate trap system can be an adsorber-catalyst particulate trap system for filtering particulate and reducing NOx via an adsorber-catalyst trap systems to achieve the EPA 2007 standards.

14 Claims, 27 Drawing Sheets

U.S. PATENT DOCUMENTS

| | | | |
|---|---|---|---|
| 3,919,384 A | 11/1975 | Cantaloupe et al. |
| 3,954,672 A | 5/1976 | Somers et al. |
| 4,129,429 A | 12/1978 | Humbert, Jr. et al. |
| 4,276,071 A | 6/1981 | Outland |
| 4,343,604 A | 8/1982 | Minjolle et al. |
| 4,390,355 A | 6/1983 | Hammond, Jr. et al. |
| 4,416,676 A | 11/1983 | Montierth |
| 4,419,108 A | 12/1983 | Frost et al. |
| 4,420,316 A | 12/1983 | Frost et al. |
| 4,423,090 A | 12/1983 | Hammond, Jr. et al. |
| 4,427,423 A | 1/1984 | Montierth |
| 4,478,618 A | 10/1984 | Bly et al. |
| 4,544,388 A | 10/1985 | Rao et al. |
| 4,557,682 A | 12/1985 | Montierth |
| 4,622,051 A | 11/1986 | Polach et al. |
| 4,649,703 A | 3/1987 | Dettling et al. |
| 4,731,010 A | 3/1988 | Cunningham |
| 4,741,792 A | 5/1988 | Matsuhisa |
| 4,752,516 A | 6/1988 | Montierth |
| 4,791,792 A | 12/1988 | Naruse et al. |
| 4,812,276 A | 3/1989 | Chao |
| 4,823,549 A | 4/1989 | Moser |
| 4,835,963 A | 6/1989 | Hardy |
| 4,857,089 A | 8/1989 | Kitagawa et al. |
| 4,864,821 A | 9/1989 | Hoch |
| 4,923,487 A | 5/1990 | Bogart et al. |
| 5,009,065 A | 4/1991 | Howe et al. |
| 5,016,437 A | 5/1991 | Huether et al. |
| 5,019,142 A | 5/1991 | Waschkuttis |
| 5,123,243 A | 6/1992 | Baddour |
| 5,174,969 A | 12/1992 | Fischer et al. |
| 5,227,105 A | 7/1993 | Eucker et al. |
| 5,228,892 A | 7/1993 | Akitsu et al. |
| 5,238,472 A | 8/1993 | Pfister et al. |
| 5,240,485 A | 8/1993 | Haerle et al. |
| 5,240,663 A | 8/1993 | Stringaro et al. |
| 5,246,472 A | 9/1993 | Herman et al. |
| 5,253,476 A | 10/1993 | Levendis et al. |
| 5,318,323 A | 6/1994 | Pietz |
| 5,357,755 A | 10/1994 | Gillingham et al. |
| 5,367,889 A | 11/1994 | Lanyon |
| 5,426,936 A | 6/1995 | Levendis et al. |
| 5,487,863 A | 1/1996 | Cunningham et al. |
| 5,489,319 A | 2/1996 | Tokunda et al. |
| 5,497,620 A | 3/1996 | Stobbe |
| 5,552,102 A | 9/1996 | Kragle et al. |
| 5,566,545 A | 10/1996 | Hijkata et al. |
| 5,571,298 A | 11/1996 | Buck |
| 5,606,854 A | 3/1997 | Hoffman |
| 5,702,659 A | 12/1997 | Kragle et al. |
| 5,851,249 A | 12/1998 | Henda |
| 5,853,438 A | 12/1998 | Igarashi |
| 5,930,995 A * | 8/1999 | Watanabe et al. ...... 55/DIG. 30 |
| 6,233,926 B1 * | 5/2001 | Bailey et al. ............... 55/385.3 |
| 6,989,045 B2 * | 1/2006 | Bailey et al. ............... 55/282.3 |

OTHER PUBLICATIONS www.dieselnet.com/tech/dpf_wall-flow.html; Wall-Flow Monolith [subscription], pp. 1-24; DieselNet Technology Guide, Diesel Filter Materials, 2003.

\* cited by examiner

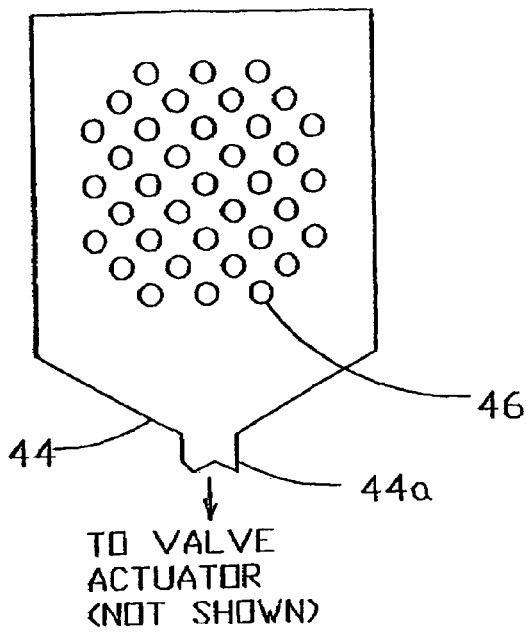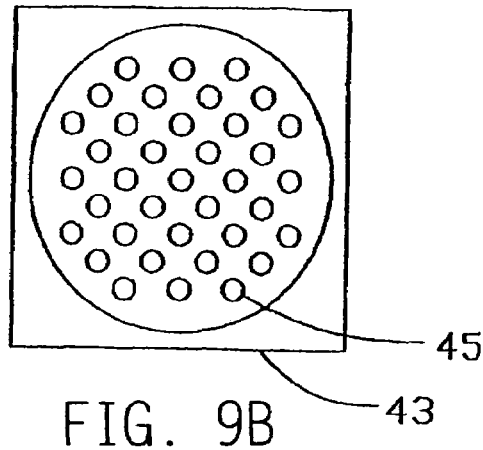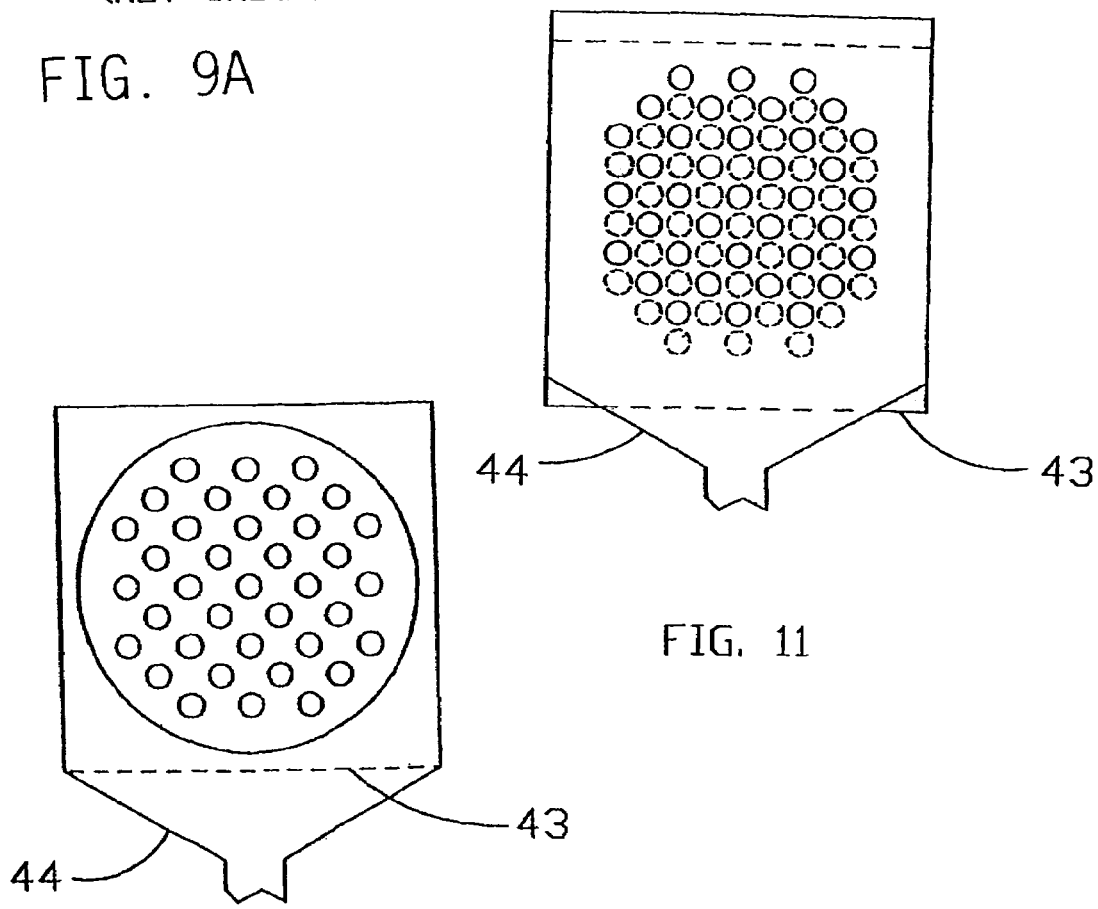
FIG. 9A
FIG. 9B
FIG. 10
FIG. 11

TO ATMOSPHERE OR VENTURI

APPARATUS AND METHOD FOR FILTERING PARTICULATE AND NOX EMISSIONS

CROSS REFERENCE TO RELATED APPLICATIONS

This application is a continuation of U.S. application Ser. No. 10/467,553, filed 1 Aug. 2003 and issued as U.S. Pat. No. 6,989,045 on 24 Jan. 2006, and which claims priority of pending U.S. application Ser. No. 60/372,238, filed 12 Apr. 2002, entitled Particulate Trap and NOx Adsorber-Catalyst Diesel Exhaust Aftertreatment System.

TECHNICAL FIELD OF THE INVENTION

The present invention relates generally to the field of diesel or other internal combustion engine exhaust systems, and more specifically, to an apparatus and method for reducing the release of emissions and particulate in the atmosphere, and to an apparatus and method for regenerating exhaust traps by reverse flow of filtered exhaust gas through porous walls of a plurality of tubular passages. The invention also relates to apparatus and method for using adsorption-catalyst technology to reduce NOx emissions when ultra low sulfur fuel becomes available.

DESCRIPTION OF THE RELATED ART

Diesel and other internal combustion engine manufacturers face increasingly stringent Federal and State regulations which limit the particulate and gaseous emissions that can be released into the atmosphere. For example, the Environmental Protection Agency (EPA) emissions regulations for heavy duty diesel trucks for the years 2002 to 2007 limit the particulate emissions to 0.1 g/Hp-Hr and the NOx emissions to 2.0 g/Hp-Hr. The particulate standards can probably be achieved by most modem diesel engines with the addition of a diesel oxidation catalyst in the exhaust system while the NOx standards can probably be achieved by engine related changes such as state of the art electronically controlled fuel system and exhaust gas recirculation (EGR).

However, in 2007, the EPA emissions regulations for these diesel applications are much more stringent. For example, the particulate emission standards are reduced to 0.01 g/Hp-Hr and the NOx emissions standards are reduced to 0.2 g/Hp-Hr. It is generally agreed that these more restrictive particulate exhaust emissions standards will require high efficiency filtration of the exhaust gas, such as can be attained by monolithic ceramic porus wall flow particulate traps. Achievement of the NOx emission standards for diesel engines may require some type of chemical reduction such as adsorber-catalyst arrangements or selective catalytic reduction (SCR).

To reduce the amount of particulate material being released into the atmosphere, diesel and other internal combustion exhaust gas may be filtered by depth type filters of various materials such as fibrous or metals. The material is usually coated with catalysts and the traps are called diesel oxidation catalysts (DOC). If the temperature of the exhaust is sufficient, this type of trap can effectively reduce gaseous emissions such as hydrocarbons, CO and the like and reduce about 30% of the particulate emissions by burning more of the soluble organic fraction (SOF). However, they are not very efficient in the removal of carbon particles. In addition, the catalysts used are expensive and can generate other undesirable emissions such as sulfates and toxic $NO_2$. This type of trap is being used to assist engine manufacturers in achieving the less stringent EPA 2002 particulate emissions.

Most of the effort has been directed toward trap systems that use porous, ceramic monolith, that have passages similar to a honeycomb as illustrated in Frost et al., U.S. Pat. No. 4,415,344. This type of trap, known generally as the wall flow type, is illustrated in the cross sectional drawing FIG. 1. The honeycomb section monoliths are extruded, relatively inexpensively and provide a large passage surface area for a given size trap. By plugging exit ends of alternate passages and entrance ends of the remaining passages, the flow of exhaust gas is forced through the porous walls of the passages having the exit ends plugged. A layer of soot and ash accumulates on the inner surfaces of the passages. While these traps remove 95-98% of the particulate from the flow of exhaust gas, pressure drop across the trap builds-up due to the accumulation of the soot and ash. While the soot can be burned periodically by heating all, or a portion, of the exhaust gas, loss of energy occurs and, more seriously, the heat of combustion of the soot leads to cracking and melting of the traps. Complicated catalyst means have been used to lower the ignition temperature of the soot to protect the trap with mixed results. Also, burnout does not prevent long term accumulation and pressure drop due to the build-up of incombustible ash.

Oda et al., U.S. Pat. No. 4,483,883, and Igarashi, U.S. Pat. No. 5,966,928, illustrate a cross-flow, monolithic, ceramic trap coupled with reverse flow of high pressure air to remove the soot and ash without combustion within the particulate trap system. The cross flow type of monolithic trap is illustrated in the cross sectional drawing FIG. 2. The through-flow passages of the cross flow trap are used to direct the dislodged soot and ash to an electrical heater outside the trap, to burn the soot and collect the ash. However, this system results in loss of engine efficiency because of the amount of high pressure air required. In addition, the use of high pressure air requires a rather heavy structure to provide adequate strength and also has led to problems with the reliability of trap seals and valves used to control the reverse flow of air.

Igarashi, U.S. Pat. No. 5,853,438 illustrates cross-flow and wall flow, monolithic, ceramic trap systems that are coupled with reverse flow of high pressure air, as shown in FIG. 3 for a wall flow trap, to remove the soot and ash without combustion within the particulate traps. The removed soot and ash are directed to an external chamber wherein the soot is burned and the ash is stored. The patent shows means to control the very brief pulses of reverse high pressure air used in either the cross-flow or wall flow trap systems such that the pressure waves and air flow evenly enter the passages at the trap exit faces. In the case of the wall flow trap, the patent indicates that the resultant even pressure distribution in all passages increases the soot and ash removal efficiency from 78% to about 97%. However, these systems use high pressure air pulses that results in an adverse affect on engine fuel consumption and weight.

Yasushi et al., U.S. Pat. No. 5,941,066, and Yoshimasa et al., U.S. Pat. No. 5,930,995, illustrate depth and honeycomb wall flow particulate trap systems respectively in close proximity to the engine. The soot collected by these traps is burned by the heat of the engine exhaust or by electrical heaters located in each trap. By means of special passages and control valves, the engine exhaust pulses are periodically employed to create back flow through the traps to dislodge and remove accumulated ash. However, the high temperatures employed reduce the reliability of the trap.

Bailey et al., U.S. Pat. No. 6,233,926, illustrates various apparatuses and methods to filter particulate from an engine exhaust through the use of ceramic, cross-flow traps similar to the Oda et. al, U.S. Pat. No. 4,483,883 and Igarashi, U.S. Pat. No. 5,966,928 previously described. The soot and ash are removed from the engine exhaust by directing it through the through flow passages having porous walls. However, after prolonged periods of filtering, a build-up of soot and ash occurs. To remove the build-up, exhaust gas at a velocity sufficient to erode and dislodge the soot and ash is directed through the through-flow passages. The dislodged or eroded soot and ash are moved to a location outside the trap for combustion of the soot and storage of the incombustible ash. The exhaust gas from the engine enters the through-flow passages that, during normal filtration, have a suitable valve arrangement to force the exhaust gas to flow through the porous walls to filter out the soot and ash. After filtering, the filtered exhaust gas passes to the atmosphere through clearances surrounding the through-flow passages. The filtered particulate accumulates on the inside of the porous walls and must be periodically removed to prevent excessive pressure drop and back pressure to the engine. The accumulation of soot and ash is removed by periodically passing a flow of exhaust gas through the length of the through-flow passages at a velocity sufficient to erode and dislodge the accumulated soot and ash and moving it out of the trap to be captured. The soot is burnt and the ash collected. All the exhaust gas entering the trap is filtered prior to release into the atmosphere. This is considered to be a very reliable system because the trap is not subjected to high temperatures and pressures during the regeneration process. However, under some engine operating conditions, the erosion and dislodging of the soot and ash build-up may occur at a slower rate than desired. For example, operation at low ambient temperatures or extended low load operation may result in a less than desirable rate of erosion. Under such conditions, the soluble organic fraction (SOF) of the soot may increase or condensation of liquids may occur, either causing an increase in the density of the soot and ash build-up.

Dou, et al., U.S. Pat. No. 6,391,822 B1 and Ament et al., U.S. Pat. No. 6,293,092 B1 illustrate apparatuses and methods of using a metal oxide to adsorb NOx under lean exhaust conditions and platinum or other precious metal catalyst to reduce the NOx when it is released from the metal oxide under rich exhaust conditions. This general approach is considered a very promising method of achieving the very low NOx EPA 2007 standards (0.2 g/hp-hr) when using ultra low sulfur fuel. However, the systems that have been proposed significantly increase fuel consumption and require changes to the engine.

The present invention is directed to overcoming one or more of the problems set forth above.

BACKGROUND OF THE INVENTION

As noted earlier, most of the effort on high efficiency particulate traps have used monolithic ceramic traps having porous walls through which the exhaust gas passes and is filtered. While these traps remove 95-98% of the particulate, pressure drop across the traps builds up due to the accumulation of soot and ash. While the soot can be burned away by heating all, or a portion, of the exhaust gas, loss of energy occurs and, more seriously, the heat of the combustion of the soot leads to cracking and melting of the traps. In addition, the incombustible ash must be periodically removed by a disruptive and expensive cleaning operation.

In recent years, catalyst coatings have been applied to the wall flow traps to reduce the temperature at which the soot is ignited and to cause the soot to burn more often to reduce the amount of accumulated soot. This approach tends to prevent overheating of the traps during regeneration and reduces engine fuel consumption by igniting the soot all, or most of the time, by the heat of the engine exhaust. This system is called continuous regeneration technology (CRT) and has been used in a number of retrofit applications such as city and school buses. However, these applications must operate at a reasonably high average load factor and the engines must be in a condition that will meet the engine manufacturer's specification. To obtain the most reliable operation, the engines must use very low sulfur fuel to further reduce the light-off temperature of the soot. Finally, these systems are also subject to plugging by incombustible ash.

A more promising approach is to remove the soot and ash by physically removing it from the trap walls and directing the particles to an external chamber where the soot is burned and the ash collected for periodic disposal. As noted earlier, particulate filtration has been accomplished with high efficiency via the use of cross flow monolithic porous wall cross flow traps. When the soot and ash accumulate to unacceptable levels, the traps are regenerated by removing the soot and ash physically by a brief pulse of high pressure air (115 psi), the soot and ash being directed to a small external chamber for burning the soot and storage of the ash. While this system works effectively, the use of high pressure air increases engine fuel consumption and also requires a heavy structure, features that are undesirable for mobile applications.

The subject invention uses monolithic porous wall ceramic traps of either the cross flow or the wall flow type that will collect the soot and ash with an efficiency of 95-98%. The pressure drop across the trap increases as the soot and ash accumulate and the traps must be periodically regenerated. However, in this invention the soot and ash are removed physically by reverse flow of pre-filtered exhaust gas at normally encountered exhaust gas pressures and flow rates and the soot and ash are directed to an external chamber for burning of the soot and storage of the ash. This approach utilizes sequential periods of sustained constant reverse differential pressure that acts equally across the porous walls of all of the passages and throughout their length to dislodge and erode the collected cake of soot and ash and move the particles to the external chamber for burning or storage. Because the engine back pressure is little greater than normal, the system operates without significant increase in engine fuel consumption, the need for low sulfur fuel or increase in weight of the filter structure.

Three-way catalyst technology has been used for a number of years in S.I. automobile engines to reduce NOx emissions to a very low level. This technology uses catalysts of precious metals like platinum, rhodium, etc. to cause reaction between the CO in the exhaust and the NOx to produce N2 and $CO_2$. However, for this process to work there must be an excess of HC(CO) in the exhaust (a lambda of 0.95-1). Because S.I. automotive engines operate at about stoichiometric air/fuel ratios, they can easily be controlled by use of an oxygen sensor to maintain a chemically correct to slightly richer mixture in the exhaust. Thus, the catalyst causes the CO and NOx to react together. This substantially eliminates the NOx from the vehicle.

However, diesel engines (and lean burn S.I. engines) operate with an excess of oxygen in the exhaust at all operating conditions. Reaction of the HC and NOx will not proceed when $O_2$ is present. To overcome this problem, the adsorption/reduction catalyst process has been identified. The catalyst substrate is coated with a wash coat of BaO along with a catalyst of platinum, rhodium, etc., as shown with a conventional wall flow trap in FIG. 4. The trap with its catalytic coatings is operated within a temperature window of about 250-450° C.

During normal diesel lean burn operation, the NOx in the exhaust is adsorbed on the BaO coating by a process called chemisorption. This action is allowed to continue for 1 to 4 minutes. After this time, the BaO coating becomes saturated with NOx stored as $Ba(NO_3)_2$ and additional NOx will begin to pass on through the trap. However, after a time of 1 or 2 minutes, the exhaust gas is temporarily made rich (a lambda of 0.95 to 1) for a few seconds by adding additional fuel to the exhaust stream to react with the free Oxygen. This action almost instantly releases the trapped $NO_2$ from the BaO coating and the $NO_2$ is then immediately reacted with the CO through the action of the adjacent precious metal catalyst sites and exits to the atmosphere as $N_2$ and $CO_2$.

This action is capable of reducing NOx exhaust emissions by 90+%. This method is being promoted to be used in conjunction with a wall flow particulate trap. Two phenomena tend to limit the life of the device.

First, much of the sulfur in the fuel will be exhausted as $SO_2$. This will be further oxidized in the presence of the platinum catalyst to form $SO_3$ and this reacts with the BaO adsorber coating to form $BaSO_4$. This poisons the trap by soon preventing the adsorption of $NO_2$. Consequently, the adsorber-catalyst approach is predicated on the use of ultra low sulfur (10 ppm) diesel fuel. However, even this small amount of sulfur will gradually poison the trap after several thousand miles. The sulfur-poisoned trap can be regenerated by heating the trap in the presence of hydrocarbons at a temperature of about 700° C. for several minutes.

The second phenomena, with a conventional wall flow trap, is gradual plugging with the incombustible ash. After about 50,000 miles the traps must be cleaned by reverse flow, etc., as a maintenance step.

The initial part of the Detail Description/Specification will address the use of the above trap approach that uses reverse flow or reverse flow and through flow for regeneration with either cross flow and wall flow traps. These trap systems will be able to achieve the EPA 2007 particulate standards for both new and retrofit engines without need for a change in current diesel fuels.

The remainder of the Detail Description/Specification will address modifications and additions to the above particulate trap systems to use adsorber-catalyst technology that will permit achievement of the 2007 EPA particulate and the EPA NOx standards when ultra low sulfur becomes available.

SUMMARY OF THE INVENTION

The subject invention uses monolithic porous wall ceramic traps of either the cross flow or the wall flow type that will collect the soot and ash with an efficiency of 95-98%. The pressure drop across the trap increases as the soot and ash accumulate and the traps must be periodically regenerated. However, in this invention the soot and ash are removed physically by reverse flow of pre-filtered exhaust gas at normally encountered exhaust gas pressures and flow rates and the soot and ash are directed to an external chamber for burning of the soot and storage of the ash. The reverse flow of pre-filtered exhaust gas at pressures that will cause little or no additional engine back pressure permits sequential periods of sustained constant reverse differential pressure to dislodge and erode the collected cake of soot and ash without significant increase in engine fuel consumption, the need for low sulfur fuel or a significant increase in weight of the filter structure.

An object of the invention is to provide a trap system to remove engine exhaust particulate that can be automatically regenerated without need for catalysts or complicated sensor systems and in which the soot is burned in a small container and incombustible ash is collected therein for periodic disposal.

Another object of the invention is to provide a reliable and durable trap system that will not require expensive catalysts, can use inexpensive trap materials such as cordierite and will not require any reduction in the sulfur content of current fuels.

Still another object is to provide a reliable and durable particulate trap system that will require substantially no change to the engines and have little or no adverse affect on engine performance.

Yet another object to provide the above characteristics in a system in which the traps and structure do not have to operate at high temperature in either normal engine operation or during regeneration of the traps and which can therefore be located remote from the engine if desired.

Another object is to provide a trap system that can use a multiple of traps or a single, larger trap depending upon the application.

Still another object is to provide a particulate trap system that is well suited to the use of exhaust gas re-circulation for the control of nitrogen oxide emissions.

An aspect of the present invention is to provide an apparatus and method for periodically passing pre-filtered exhaust gas in reverse flow through the porous walls of the through flow passages in a cross flow trap that have an accumulation of soot and ash, either prior to or in conjunction with, high velocity flow of exhaust gas through the through flow passages to enhance the erosion and dislodging of the accumulated soot and ash under certain engine operating conditions and removing it from the trap to be burned outside the trap.

Another aspect of the invention is to provide an apparatus and method for periodically passing pre-filtered exhaust gas in through the porous walls of a wall flow trap monolith in a direction that is reverse to that of normal filtration in order to dislodge and erode the soot and ash layer and carry the dislodged particles out of the passages and into a chamber for separation of the particles of soot and ash wherein the soot is burned and the incombustible ash is stored for periodic disposal prior to permitting the stream of pre-filtered exhaust to escape to the atmosphere.

In another aspect of the invention there is provided an apparatus and method for removing the build-up of soot and ash in low ambient temperatures or during extended low load operation.

In another aspect of the invention there is provided an apparatus and method for removing the build-up of soot and ash by physical or mechanical means under adverse engine operating conditions.

Another aspect of the present invention is to provide an apparatus and method for removing the build-up of soot and ash that is reliable and durable.

Yet another aspect of the present invention is to provide an apparatus and method for removing the build-up of soot and ash using only the flow of exhaust gas at pressures and flow rates commonly encountered in diesel engines.

Still another aspect of the present invention is to provide a compact and quick reacting exhaust flow control valve for providing uniform distribution of the entering exhaust gas across circular, rectangular or other geometric shape trap faces.

Yet another aspect of the present invention is to obtain one or more of the above mentioned aspects when utilizing single traps, preferably large, or multiple traps, preferably small.

Yet another aspect of the present invention is to provide a remote activated relief valve with which to automatically provide a moderate but constant back pressure in the exit chamber of the trap systems to provide the desired reverse flow of pre-filtered exhaust gas.

Still another aspect of the present invention is to provide a fixed or variable venturi tube at the exit of the filtered exhaust to the atmosphere to thereby provide a pressure at its throat that is significantly lower than ambient and to direct the reverse flow during regeneration to the lower pressure throat to thereby increase the total reverse pressure drop across the porous walls of the trap passages and thus enhance the dislodgment and erosion of the soot and ash layer.

Yet another aspect of the present invention is to show how it is well suited to the use of low pressure loop exhaust gas re-circulation and illustrate how it can be used.

Another object of the invention is to provide means for converting the systems utilizing reverse flow or reverse flow and through flow of the subject invention, with minimal change, to particulate trap systems that use the adsorber-catalyst method to achieve the very stringent 2007 EPA NOx standards using ultra low sulfur fuel.

Another object is to provide a substantially steady flow device for controlling the mixture of a small stream of the exhaust at near stoichiometric air fuel ratios in order to provide a rich stream having an excess of CO and/or HC for use in the brief release and reduction of the stored NOx.

Yet another object is to provide a particulate trap and adsorber-catalyst system in which the space velocity of the rich exhaust stream can be varied as desired in order to minimize fuel consumption.

Another object of the invention is to provide particulate traps, adsorber-catalyst systems that provide means to regenerate contamination of the adsorber caused by sulfur and to remove incombustible ash to prevent these from being separate and expensive maintenance operations.

Another aspect of the invention is to use monolithic cross flow or wall flow porous wall particulate traps that have been treated with adsorber—catalyst coatings and to provide means to cause a majority of the normally lean exhaust from the engine to flow through a majority of the traps or discrete portions of a single trap and to provide means to cause a minority of the normally lean exhaust gas from the engine to be enriched by a fuel burner to an approximately stoichiometric mixture and to periodically pass this enriched flow through a minority of the traps or portions of a single trap for a brief period, this brief (1-5 seconds) enriched flow being sequentially changed to pass through different traps or portions of a single trap, in turn, as long as the engine is in normal operation.

Yet another aspect of the invention is to provide a device to split the exhaust flow into a majority exhaust stream and a minority exhaust stream and to use an injector, igniter/burner and oxygen sensor along with suitable controls to maintain in the minority stream a normally steady flow of enriched, approximately stoichiometric mixture rich in CO and/or HC exhaust gas and to direct these two streams to appropriate ducts in the particulate trap system.

Yet another aspect is to provide apparatus in the flow divider/enrichment device to maintain a temperature of 250-450° C. during normal operation of the engine.

Still another aspect of the invention is to provide means to increase the trap(s) temperatures to approximately 700° C. while maintaining the aforementioned minority rich exhaust flow and the majority lean exhaust flow and to provide means to increase the time of the periodic flows of enriched exhaust gas to 3-10 minutes in order to regenerate sulfur contamination.

The above aspects are merely illustrative and should not be construed as all-inclusive. The aspects should not be construed as limiting the scope of the invention.

BRIEF DESCRIPTION OF THE DRAWINGS

Reference is now made to the drawings which illustrate the best known mode for practicing the steps of the method and apparatus which performs the method; and wherein similar reference characters indicate the same parts throughout the several views.

FIG. 9A is a plan view of a moveable part of a perforated plate slide valve.

FIG. 9B is a plan view of a stationary part of a perforated plate slide valve.

FIG. 10 is a plan view of the stationary and moveable parts of the perforated plate slide valve with the parts superimposed to illustrate the "open" position.

FIG. 11 is plan view of the stationary and moveable parts of the perforated plate slide valve with the parts (and holes) slightly misaligned to illustrate the "closed" position.

FIG. 28B is a cross sectional illustration of the faceplate having an aperture therein of the cross flow single trap version of the adsorber-catalyst particulate trap and NOx reducer system according to FIG. 28a.

DETAILED DESCRIPTION

The current invention relates to a particulate trap system that uses either cross flow or wall flow traps and has means for accomplishing reverse flow of the exhaust gas as well as through flow of the exhaust gas to dislodge, erode and remove the soot and ash build-up at temperatures below the ignition point of soot and at pressures and flow rates normally encountered in internal combustion engines, thereby resulting in minimal adverse effects on engine performance. The particulate trap system accomplishes the regeneration or removal of the soot and ash build-up by reverse flow or a combination of reverse flow and through flow to dislodge and erode the soot and ash build-up through a physical or mechanical mechanism, without the addition of heat to burn the soot. The invention eliminates the need for high temperatures and/or the use of expensive catalysts. The ignition of the soot and subsequent combustion of the ash take place in a separate, small and robust chamber. An advantage of lower temperature is the elimination of melting or cracking of the particulate trap system, thereby increasing the reliability and life of the particulate trap system, and permitting the particulate trap system to be constructed of low cost cordierite. Additional advantages include elimination of the cost of a heater, the associated energy requirements, and the freedom to locate the particulate trap system remote from the engine, such as in an exhaust stack. The invention also includes means to employ, with minimal modification, adsorber-catalyst technology to permit diesel engines to achieve the EPA 2007 Nox emissions standards when ultra low sulfur fuel becomes available.

Figure 1:
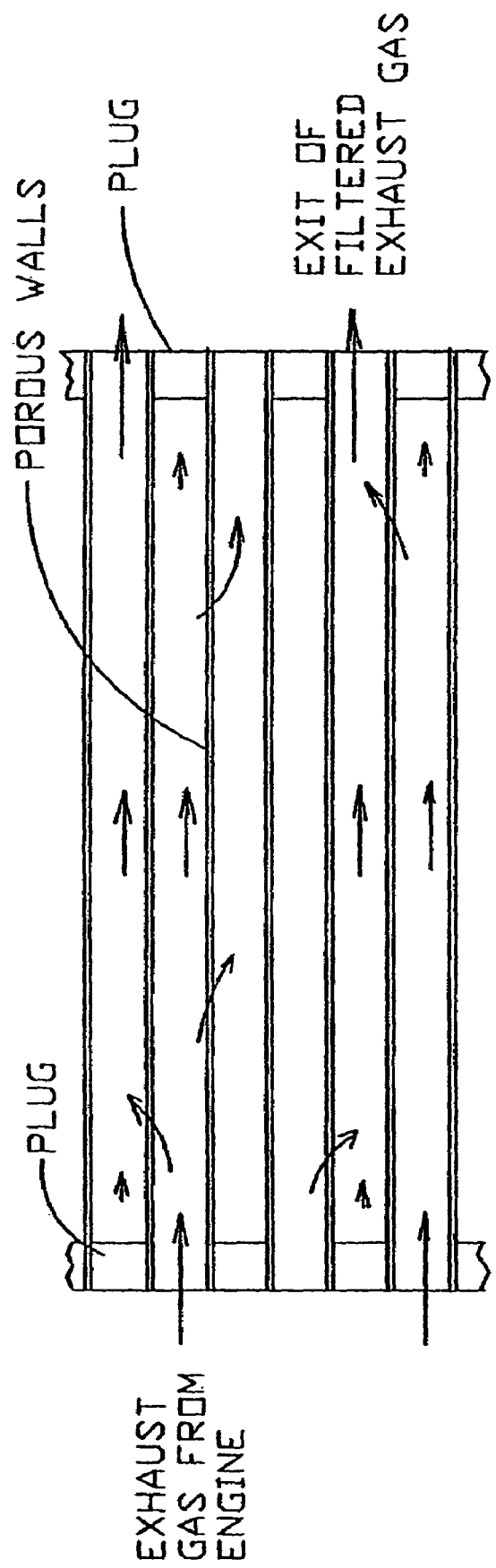
FIG. 1 is a sectional illustration of a wall flow type of trap monolith.
Figure 2:
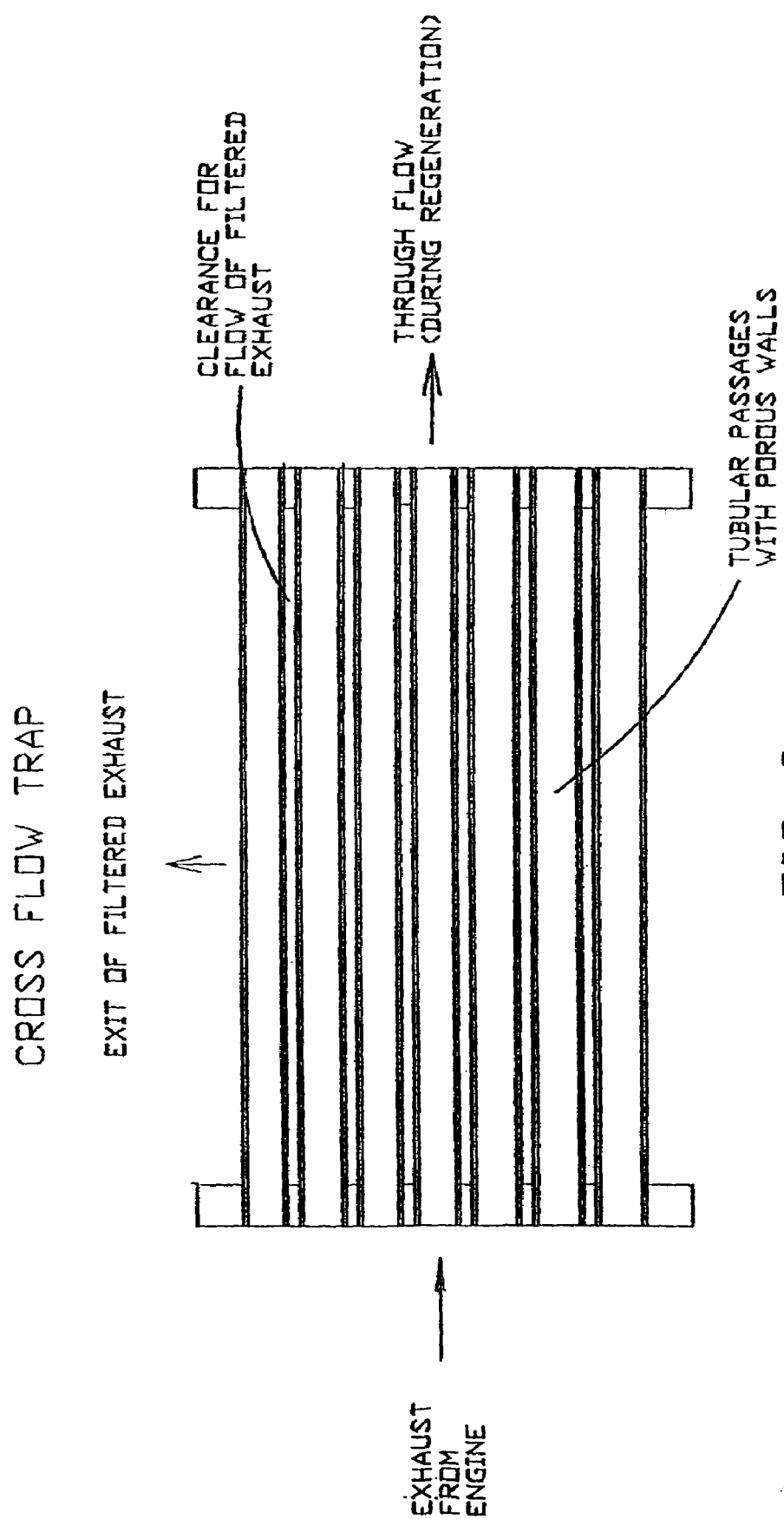
FIG. 2 is a sectional illustration of a cross flow type of trap monolith.
Figure 3:
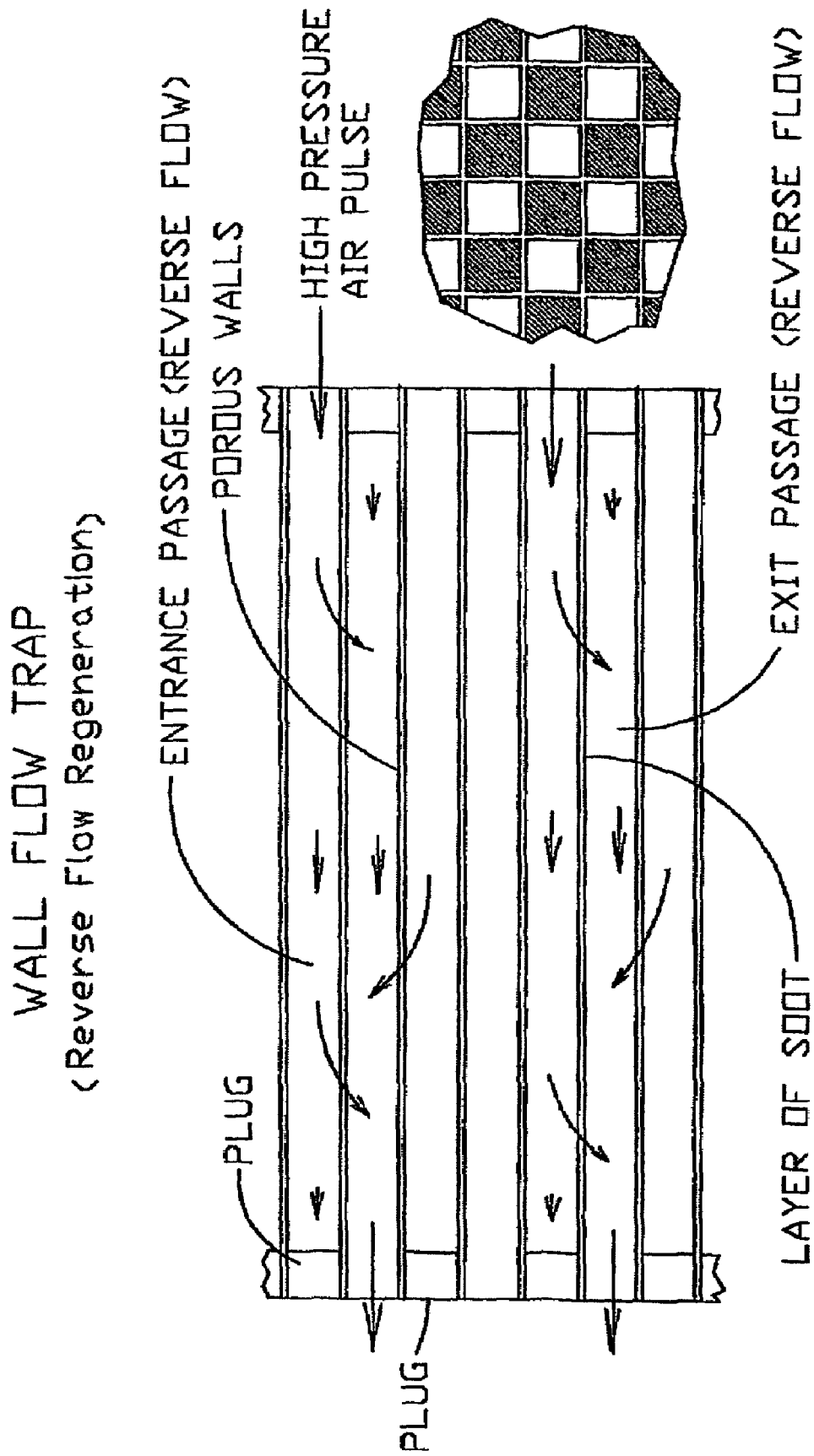
FIG. 3 is a sectional illustration of a wall flow type trap being regenerated.
Figure 4:
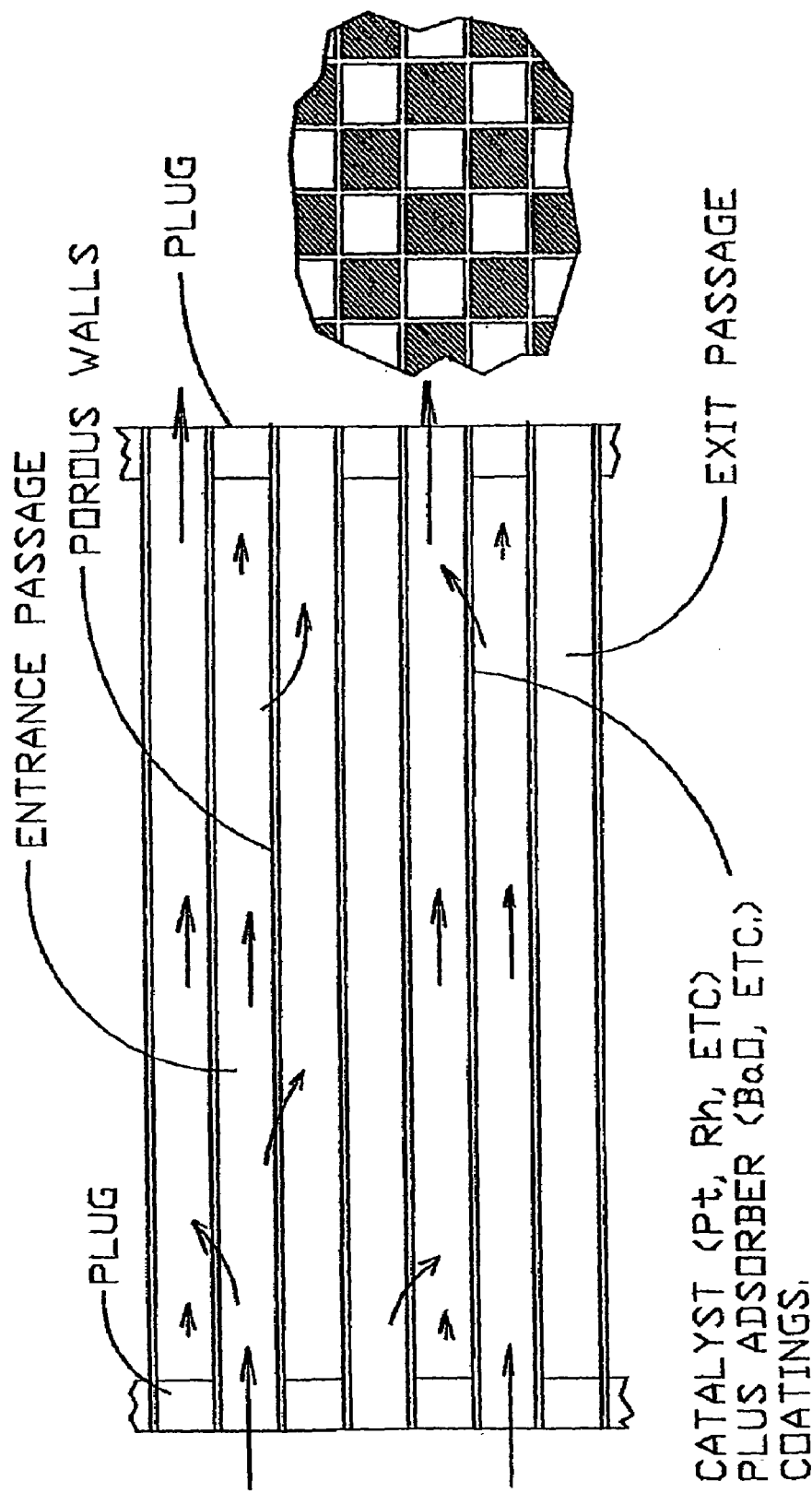
FIG. 4 is a cross section of a wall flow trap indicating the BaO wash coat and Pt, etc., catalysts that are used in the adsorber-catalyst method for reducing NOx in diesel engines and lean-burn S.I. engines.
Figure 5A:
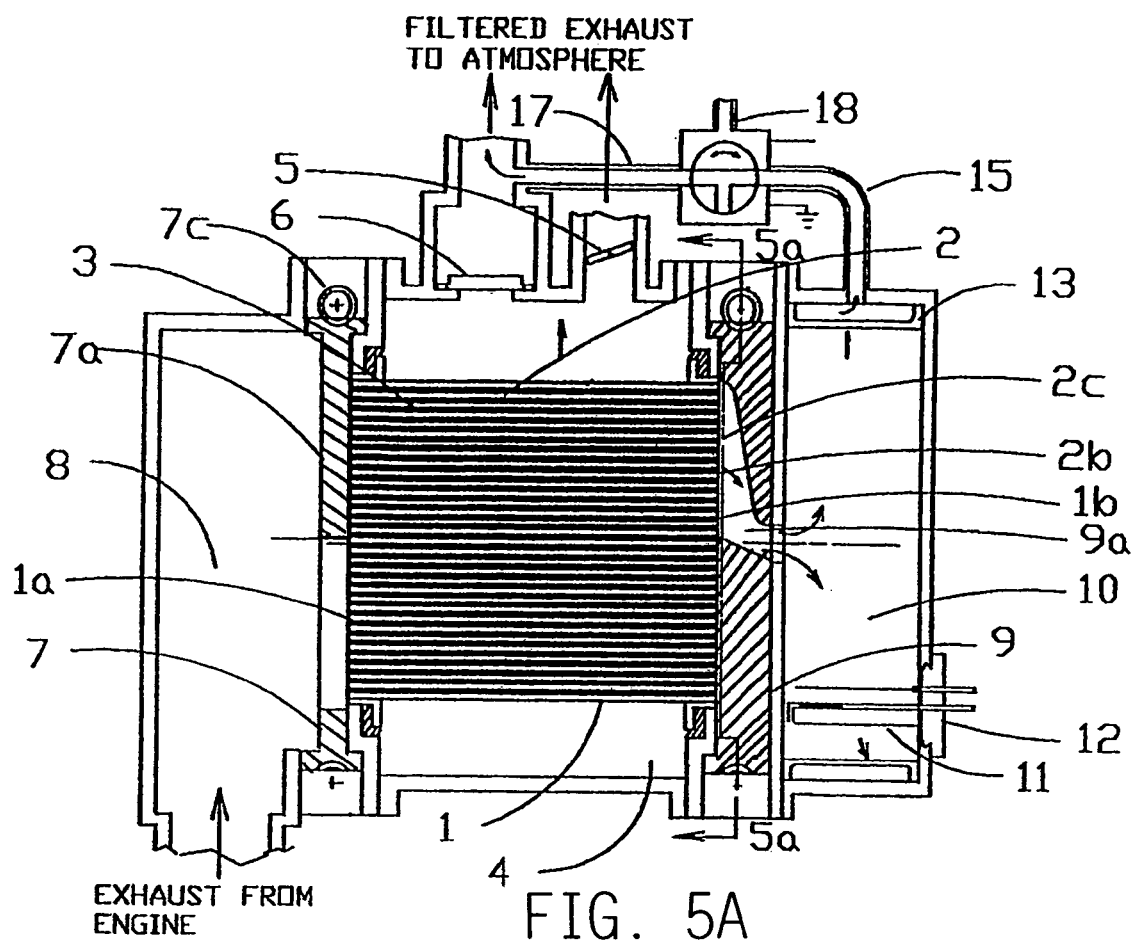
FIG. 5A is a cross sectional view of a single cross flow trap that is regenerated by reverse flow of filtered exhaust gas followed by through flow of unfiltered exhaust gas.
Figure 5B:
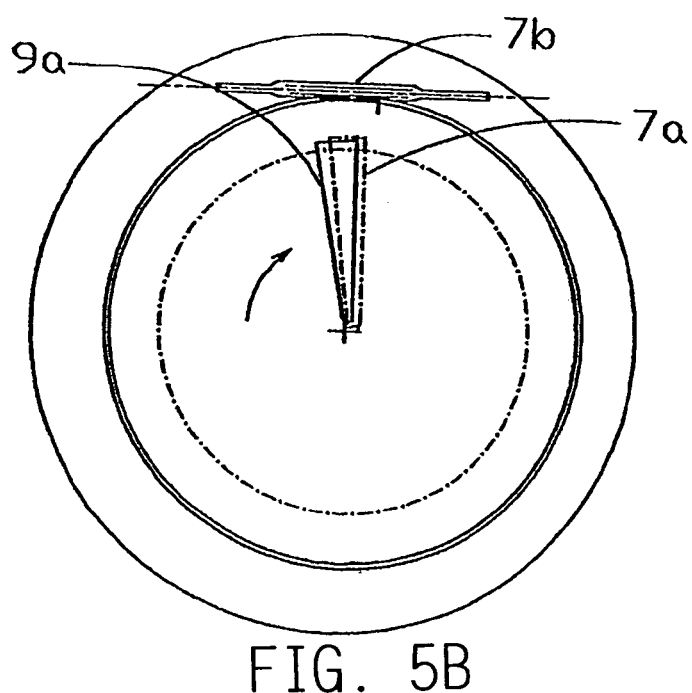
FIG. 5B is an end view of the single cross flow trap of FIG. 4 to illustrate the rotary valves used to control the flow of exhaust gas for regeneration.

FIG. 5 illustrates a cross-flow trap 1 having a plurality of tubular passages 2. In this embodiment, the cross-flow trap 1 is a single, cylindrical-shaped monolithic cross-flow trap. The plurality of tubular passages 2 have porous walls 2c. The plurality of tubular passages 2 and the cross-flow trap 1 have an inlet end 1a and an outlet end 1b. The plurality of tubular passages 2 have clearances 3 between outside diameters of the plurality of tubular passages 2. The porous walls 2c of the plurality of tubular passages 2 permit the filtered exhaust gas to pass out of the cross-flow trap 1, enter an exit chamber 4 and then pass to the atmosphere through a by-pass valve 5 or a relief valve 6. A rotary valve 7 is located in close proximity to the inlet end 1a of the cross-flow trap 1 and periodically blocks the entry of exhaust gas into the plurality of tubular passages 2 from an inlet chamber 8. In the preferred embodiment, the rotary valve 7 continually rotates and has a strut 7a, preferably a single strut, that moves in proximity to the face of the cross-flow trap 1 to briefly block the entrance to some of the plurality of tubular passages 2a, as the rotary valve 7 rotates. As the rotary valve 7 rotates a complete revolution, all of the plurality of tubular passages 2 will at one time or another have been blocked. A second rotary valve 9 is located proximate to the outlet end 1b of the cross-flow trap 1 and blocks the outlet end 2b of some of the plurality of tubular passages 2 for substantially all of its rotation. The second rotary valve 9 continuously rotates at the same speed as that of the rotary valve 7. The rotation of the rotary valve 7 and second rotary valve 9 is synchronized. The second rotary valve 9 has an aperture 9a that briefly unblocks the outlet end 2b of each of the plurality of the tubular passages 2, in turn, to permit exhaust gas to exit from the plurality of tubular passages 2. As explained hereinafter, the blocking by the strut 7a of the inlet end 2a of the plurality of tubular passages 2 and the unblocking of the outlet ends 1b of the plurality of tubular passages 2 by the aperture 9a operate in a phased relationship as illustrated in FIG. 5a. In normal operation the periodic flow that exits from each of the plurality of tubular passages 2 contains eroded or dislodged soot and ash that are directed to a separation chamber 10. The soot and ash settle in the separation chamber 10 and out of the flow of the exhaust gas, wherein the soot is ignited and burned by an igniter coil 11 and the incombustible ash settles in the separation chamber 10. The incombustible ash is removed via a cap 12 and discarded. A secondary filter 13 removes the particulate from the unfiltered exhaust gas that flows into the separation chamber 10 prior to exiting through a passage 15, a three-way valve 14 and a second passage 17 to the atmosphere. The size of the secondary filter 13 is selected as a function of the maximum flow that is expected to enter the separation chamber 10 while maintaining a maximum pressure in the separation chamber 10 that is near ambient. The three-way valve 14 is used to periodically block the passage 15 and introduce a brief pulse of high pressure air from a third passage 18 to remove any soot or ash layer accumulating on the secondary filter 13.

In operation during normal filtering mode, the exhaust gas from the engine enters the inlet chamber 8, and then enters the plurality of tubular passages 2 that are not blocked by the strut 7a. The exhaust gas entering the plurality of tubular passages 2 either exits into the separation chamber 10 or is blocked by the second rotary valve 9 and therefore must pass through the porous walls 2c of the plurality of tubular passages 2. There are a plurality of tubular passages 2 at any one moment that are not blocked or plugged by the strut 7a and the second rotary valve 9, respectively, as shown in FIG. 5a and explained hereinafter. Hence, the exhaust gas entering the plurality of tubular passages 2 exits into the separation chamber 10 via an opening 9a. The exhaust gas passing through the porous walls 2c because the outlet ends 2b of the plurality of tubular passages 2 are blocked by the second rotary valve 9 is filtered and will then pass through the clearances 3 between the plurality of tubular passages 2 into the exit chamber 4 and then through the open by-pass valve 5 into the atmosphere. The soot and ash filtered via the porous walls 2c of the cross-flow trap 1 will result in the build-up of soot and ash on the porous walls 2c of the plurality of tubular passages 2. As the rotary valve 7 and the second rotary valve 9 rotate, a small amount of exhaust gas will pass through the plurality of tubular passages 2 during a brief phase period in which both the inlet ends 2a and outlet ends 2b of the plurality of tubular passages 2 are open. This small amount of flow through passages that are open at both ends, is in effect, regeneration flow and may keep the trap system functioning with acceptable backpressure for long periods of time.

However, soot and ash may eventually build-up on the porous walls 2c of the plurality of tubular passages 2 during the filtration process and increase the pressure drop across the walls to a level that will result in excessive backpressure on the engine causing deterioration in engine performance. When a point is reached, as determined by an engine parameter, such as backpressure, the engine control will automatically initiate the regeneration mode.

When the cross-flow trap 1 enters the regeneration mode, the control system (not shown) will close the by-pass valve 5 and the continuing flow of filtered exhaust gas will cause pressure to build-up in the exit chamber 4 until it reaches a pressure that will open the relief valve 6 prior to exiting into the atmosphere. In the preferred embodiment, the relief valve 6 is set at a moderately increased pressure, such as 30 in. wg. The pressure in the inlet chamber 8 will increase from approximately 15 in. wg. to 45 in. wg. The elevated pressure in the exit chamber 4 will be maintained during the regeneration period that will include at least one complete revolution of the rotary valve 7 and the second rotary valve 9. In addition, to the increased pressure in the exit chamber 4, the filtered exhaust gas in the exit chamber 4 will reverse flow through the plurality of tubular passages 2. The reverse flow will blow out most of the soot and ash build-up.

Referring now to FIG. 5a, the process for removing the soot and ash from each of the plurality of the tubular passages 2 is as follows. At any one time, there are four conditions. First, some of the plurality of tubular passages 2 are neither blocked nor plugged by the rotary valve 7 or the second rotary valve 9. Second, some of the plurality of tubular passages 2 are blocked by the rotary valve 7 but not plugged by the second rotary valve 9. Third, some of the plurality of tubular passages 2 are not blocked by the rotary valve 7 but are plugged by the second rotary valve 9. Fourth, some of the plurality of tubular passages 2 are both blocked and plugged by the rotary valve 7 and the second rotary valve 9, respectively. As the rotary valve 7 and the second rotary valve 9 rotate, the inlet end 2a of some of the plurality of tubular passages 2 will be blocked by the strut 7a. A short time later, the slit 9a in the second rotary valve 9 will open the outlet end 2b of these plurality of tubular passages 2. This action will result in a strong flow of previously filtered exhaust gas back through the porous walls 2c of the plurality of tubular passages 2 and then through the plurality of tubular passages 2 itself and exit into the separation chamber 10. The relatively high reverse pressure, preferably 30 in. wg, difference across the porous walls 2c and the soot and ash build-up will serve to break off or dislodge the soot or ash and carry most of the particles out of the plurality of tubular passages 2 and into the separation chamber 10.

After the reverse flow action has continued for a predetermined length of time, the rotary valve 7 and the second rotary valve 9 move such that the strut 7a uncovers the inlet end 2a of the plurality of tubular passages 2 previously covered permitting exhaust gas to pass completely through the plurality of tubular passages 2 from the inlet chamber 8. The higher differential pressure, approximately 45 in. w.g, between the inlet chamber 8 and the separation chamber 10 will result in a very high velocity, in excess of 100 fps to flow through the plurality of tubular passages 2 further removing soot and ash and effectively eroding and dislodging any soot and ash layer that was not previously removed. Following a predetermined period of through flow, the second rotary valve 9 will close the outlet end 2b of the plurality of tubular passages 2, returning the cross-flow trap 1 to the porous wall filtration flow process. The above described action will be repeated for each of the plurality of tubular passages 2, in turn, until the rotary valve 7 and the second rotary valve 9 have made at least one full revolution and all of the plurality of tubular passages 2 have been regenerated. While the regeneration takes place, the majority of the plurality of tubular passages 2 will continue filtering the exhaust gas released from the engine. Although the engine back pressure during the regeneration period will be slightly greater than would normally be desired, it will have minimal adverse affect on engine performance.

In the preferred embodiment, following the regeneration period determined by elapsed time because the rotary valve 7 and the second rotary valve 9 will be electrically driven at constant speed, the control system (not shown) will automatically open the by-pass valve 5, allowing the filtered exhaust gas to exit from the exit chamber 4, returning the cross-flow trap 1 to normal filtering mode. In alternative embodiments, the regeneration period can be determined by other factors, such as pressure.

The dislodged and removed soot and ash from the plurality of tubular passages 2 is passed into the separation chamber 10. In the separation chamber 10, the soot and ash will settle and drop to the bottom, wherein the soot is ignited and burned by the igniter coil 11 and the incombustible ash is collected for removal through the cap 12. The exhaust gas that contains particulate in the form of smoke will be filtered by the secondary filter 13 prior to the exhaust gas being released into the atmosphere through the passage 15, the three-way valve 14 and the second passage 17. The three-way valve 14 and the third passage 18 are used to periodically provide a small stream of high pressure air in reverse flow through the secondary filter 13 to dislodge any excessive collection of soot and ash and aid in its settling toward the igniter coil 11.

Figure 6:
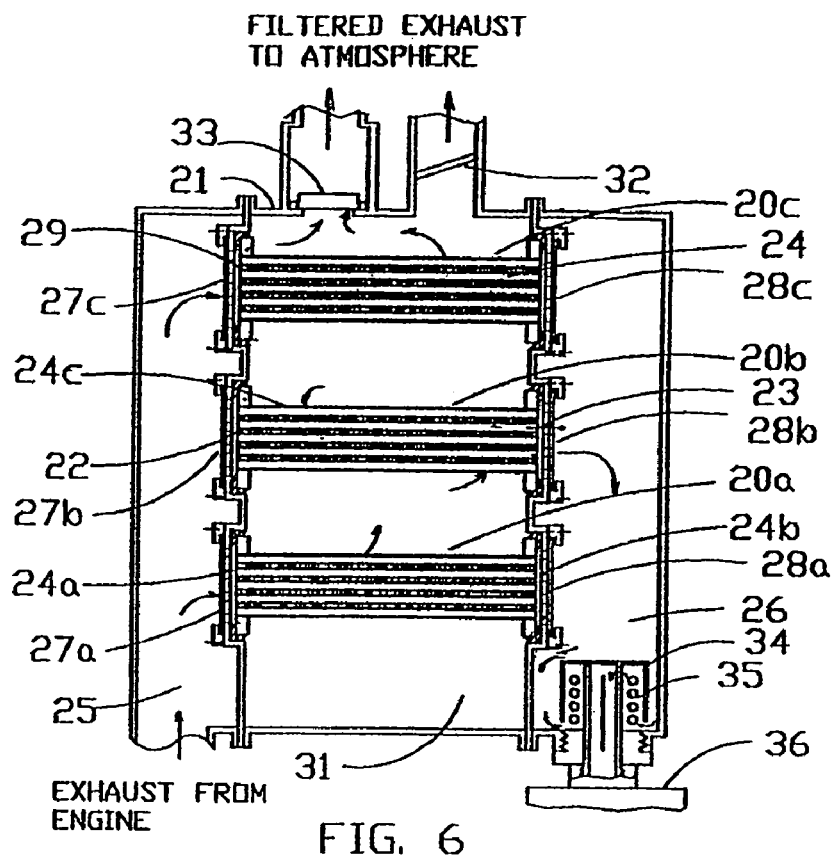
FIG. 6 is a cross sectional view of a cross flow multi-trap system in which regeneration is accomplished by reverse flow of filtered exhaust gas followed by through flow of unfiltered exhaust.

FIG. 6 illustrates a second embodiment of the present invention that utilizes a plurality of monolithic cross-flow traps 20a, 20b, 20c that are mounted in a structure 21. The plurality of cross-flow traps 20a, 20b, 20c can be manufactured to various sizes and number, depending upon the application, and the plurality of cross-flow traps 20a, 20b, 20c can be of any shape, such as circular or rectangular in cross section. The plurality of cross-flow traps 20a, 20b, 20c have entrance ends 22 and exit ends 23. The number of the plurality of cross-flow traps 20a, 20b, 20c can be increased or decreased. The plurality of cross-flow traps 20a, 20b, 20c have a plurality of tubular passages 24 having porous walls 24c through which exhaust gas is passed for filtering. The plurality of tubular passages 24 have an entrance end 24a and an exit end 24b. The structure 21 has an inlet chamber 25 and a separation chamber 26. The plurality of cross-flow traps 20a, 20b, 20c have clearances 29 between the outside diameters of the plurality of tubular passages 24 to permit the filtered exhaust gas to exit the plurality of cross-flow traps 20a, 20b, 20c. The plurality of cross-flow traps 20a, 20b, 20c are mounted in the structure 21 using sealing material, such as INTERAM®, at each end to prevent any leakage of unfiltered exhaust gas from the inlet chamber 25 or the separation chamber 26 from passing into an exit chamber 31 without first having to pass through the porous walls 24c. INTERAM® is the federally registered trademark of the Minnesota Mining and Manufacturing Company, located at 3M Center, St. Paul, Minn. After the filtered exhaust gas exits the plurality of cross-flow traps 20a, 20b, 20c, it passes up the exit chamber 31 and then through either a by-pass valve 32 or a relief valve 33.

The plurality of cross-flow traps 20a, 20b, 20c have a plurality of inlet valves 27a, 27b, 27c and a plurality of outlet valves 28a, 28b, 28c. The plurality of inlet valves 27a, 27b, 27c are located at the entrance ends 22 of the plurality of cross-flow traps 20a, 20b, 20c. The plurality of inlet valves 27a, 27b, 27c either permit or block the flow of exhaust gas into the entrance ends 24a of the plurality of tubular passages 24. The plurality of outlet valves 28a, 28b, 28c are located at the exit ends 23 of the plurality of cross-flow traps 20a, 20b, 20c. The plurality of outlet valves 28a, 28b, 28c either permit or block exhaust gas from the exit ends 24b of the plurality of tubular passages 24. The plurality of inlet valves 27a, 27b, 27c and the plurality of outlet valves 28a, 28b, 28c are perforated plate slide valves which will be discussed in more detail later in the specification; however, other types of devices capable of substitution are known to those skilled in the art. Located at a bottom of the separation chamber 30 is an electrically heated element 35 to ignite and burn the dislodged soot and a secondary filter and storage chamber 36 to remove any remaining particulate from the flow of exhaust gas that is used to regenerate the plurality of cross-flow traps 20a, 20b, 20c and to store the incombustible ash. The size of the secondary filter of the secondary filter or storage chamber 35 is selected based on the expected exhaust gas flow rate through the secondary filter to keep a near ambient pressure level in the separation chamber 26.

During filtration, the plurality of inlet valves 27a, 27b, 27c are kept open while the plurality of outlet valves 28a, 28b, 28c are closed. Exhaust gas from the engine enters the inlet chamber 25 and then passes through the plurality of inlet valves 27a, 27b, 27c to the plurality of tubular passages 24 in each of the plurality of the cross-flow traps. Because the plurality of outlet valves 28a, 28b, 28c are closed, the exhaust gas is forced through the porous walls 24c of the plurality of tubular passages 24 whereby the soot and ash are filtered. The filtered exhaust gas then passes through the clearances 29 between the plurality of tubular passages 24 and enters the exit chamber 31. The filtered exhaust gas then passes up through the exit chamber 31 and exits through the open by-pass valve 32. Soot and ash will eventually build-up in the plurality of tubular passages 24, resulting in an excessive pressure drop across the plurality of cross-flow traps 20a, 20b, 20c causing an excessive back pressure that would adversely effect engine performance. At this point, it is desirable to regenerate the plurality of cross-flow traps 20a, 20b, 20c to remove the build-up of soot and ash.

When an engine parameter, such as back pressure, is monitored and reaches a pre-designated level, the engine control system will initiate the regeneration mode. A trap control system (not shown) controls the regeneration process. The regeneration process results in the by-pass valve 32 being closed, which blocks escape of the filtered exhaust gas from the exit chamber 31, causing the pressure to rise thereby opening the relief valve 33. In the preferred embodiment, the relief valve 33 is set at 30 in. wg. This pressure is maintained in the exit chamber 31 throughout regeneration process. Depending upon the engine operating conditions and the degree of plugging of the plurality of cross-flow traps, the pressure in the inlet chamber 25 will rise to approximately 45 in. wg. The control system also energizes an electrically heated element 34 to a temperature greater than 550° C., which is the ignition temperature of the soot. After a brief period, the control system electrically or pneumatically closes one of the plurality of inlet valves 27a, 27b, 27c. For example, one of the plurality of inlet valves 27b closes, preventing exhaust gas from entering one of the plurality of cross-flow traps 20b. One of the plurality of outlet valves 28b is then quickly opened permitting exhaust gas to flow from the plurality of tubular passages 24 of one of the plurality of cross-flow traps 20b into the separation chamber 30. This reduces the pressure in the plurality of tubular passages 24 to the same level of pressure as in the separation chamber 30, which is close to ambient. This results in a strong back flow of previously filtered exhaust gas from the exit chamber 31 that is at a pressure of 30 in. wg. through the porous walls 24c of the plurality of tubular passages 24 thereby blowing out the soot and ash build-up on the inner surface of the porous walls 24c of the one of the plurality of cross-flow traps 20b. Because filtered exhaust gas at 30 in. wg is continuously supplied by the plurality of the cross-flow traps 20a, 20c that are not being regenerated, the reverse flow will continue as long as one of the plurality of inlet valves 27b is kept closed and one of the plurality of outlet valves 28b is kept open. After a predetermined time period, one of the plurality of inlet valves 27b will open. Because one of the plurality of outlet valves 28b is still open, a very high velocity flow of exhaust gas will pass through the plurality of tubular passages 24 of the one of the plurality of cross-flow traps 20b due to the 45 in. wg that exists in the inlet chamber 25 and the very low pressure, near 0 in. wg, that exists at the exit end 24b to the separation chamber 30. This high velocity will quickly blow out any soot and ash that were dislodged by the reverse flow and erode and dislodge additional soot and ash build-up, including the soot and ash on the porous walls 24c that was partially separated or partially dislodged by the reverse flow. During this high velocity through flow, reverse flow will continue through the porous walls 24c of the plurality of tubular passages 24 near their exit ends 24b. However, pipe flow pressure losses will cause a pressure inside the plurality of tubular passages 24 near the entrance ends 24a that will exceed the 30 in. wg pressure in the exit chamber 31.

After this flow continues for a predetermined time, one of the plurality of outlet valves 28b will close and the plurality of cross-flow trap 20b will return to its normal forward flow filtering. Immediately following this action, either of the plurality of cross-flow traps 20a or 20c, such as 20c, will undergo regeneration as was described for the plurality of cross-flow trap 20b. This process will continue until each of the plurality of cross-flow traps 20a, 20b, 20c has been regenerated in a predetermined sequence. The plurality of inlet valves 27a, 27b, 27c and the plurality of outlet valves 28a, 28b, 28c sequentially open and close as described with respect to the plurality of cross-flow trap 20b. After regeneration, the trap control system will return the trap system to the normal filtration mode by again opening the by-pass valve 32, reducing the pressure in the exit chamber 31 to substantially ambient pressure. This will, in turn, result in the pressure in the inlet chamber 25 dropping to less than 15 in. wg because the plurality of cross-flow traps 20 will have been cleaned of the soot and ash build-up. This reduces the engine back pressure and improves engine performance until regeneration is again required. Although the regeneration period of approximately twenty minutes will reduce engine performance because of the slightly increased back pressure, the level of pressure is still quite moderate and the effect on engine performance is not very great. Also, during the normal filtration mode, the electrically heated element 35 may be automatically turned off to save energy because it is only used during the regeneration mode.

In the preferred embodiment, the closing of the inlet valves 27a, 27b, 27c, and opening of closing the plurality of outlet valves 28a, 28b, 28c, are arranged to be carried out in just a few seconds of total elapsed time. While this sequence may be repeated several times, the total period the exhaust gas flows during these bursts is minimal. Consequently, the average mass flow rate of the exhaust gas with the dislodged soot and ash is low. Thus, it becomes possible to pass the flow of this exhaust gas through the electrically heated element 35 and heat it to the ignition temperature with a relatively small amount of energy input of approximately 1500 watts.

In another embodiment, the separation of the soot and ash from the exhaust gas, the burning of the soot and the collecting of the ash may use elements similar to those of FIG. 5, wherein these elements (not shown) include, but are not limited to, a separation chamber, an igniter coil, a cap, a secondary filter, a three-way valve, a passage, a second passage, and a third passage. During regeneration mode, the dislodged and removed soot and ash from the plurality of tubular passages 24 is passed into the separation chamber. In the separation chamber, the soot and ash will settle and drop to the bottom, wherein the soot is ignited and burned by the igniter coil and the incombustible ash is collected for removal through the cap. The exhaust gas that contains particulate in the form of smoke will be filtered by the secondary filter prior to the exhaust gas being released into the atmosphere through the passage, the three-way valve and the second passage. The three-way valve 14 (FIG. 5) and the third passage 18 (FIG. 5) are used to periodically provide a small stream of high pressure air in reverse flow through the secondary filter to dislodge any excessive collection of soot and ash and aid in its settling toward the igniter coil.

As the flow of exhaust gas containing the soot and ash passes through and is heated to the ignition temperature of the soot by the electrically heated element 35, the soot burns and only the exhaust gas with some smoke content and the ash exits. FIG. 6 illustrates the electrically heated element 35 having a shield 34 surrounding it which forces the flow of the exhaust smoke with the soot and ash to move in close proximity to the electrically heated element 35, assuring that the soot completely burns while passing through this area. The flow of exhaust gas continues to the secondary filter and storage chamber 30 as illustrated. The secondary filter and storage chamber 36 removes the particulate from the smoke from the flow of exhaust gas and also catches and stores the incombustible ash.

An alternative method of regenerating the trap system very similar to that of FIG. 5 includes only partially closing one of the plurality of inlet valves 27 by using stops (not shown). This restricts the flow of exhaust gas passing through the plurality of tubular passages 24 thereby resulting in velocity that is sufficient to erode and dislodge the soot and carry out any dislodged particles but low enough to assure that a reverse flow will pass into the plurality of passages 24 through the porous walls 24c through out the entire length of the plurality of tubular passages 24. This is accomplished because the pressure drop through the plurality of tubular passages 24, due to pipe loss, is reasonable at the lower flow velocities. This combined through flow and reverse flow through the porous walls 24c enhances the erosion and dislodging of the soot and ash build-up. The flow of exhaust gas is controlled in short bursts by opening and closing of the corresponding of the plurality of outlet valves 28b to reduce mass flow rate as previously discussed.

Figure 7A:
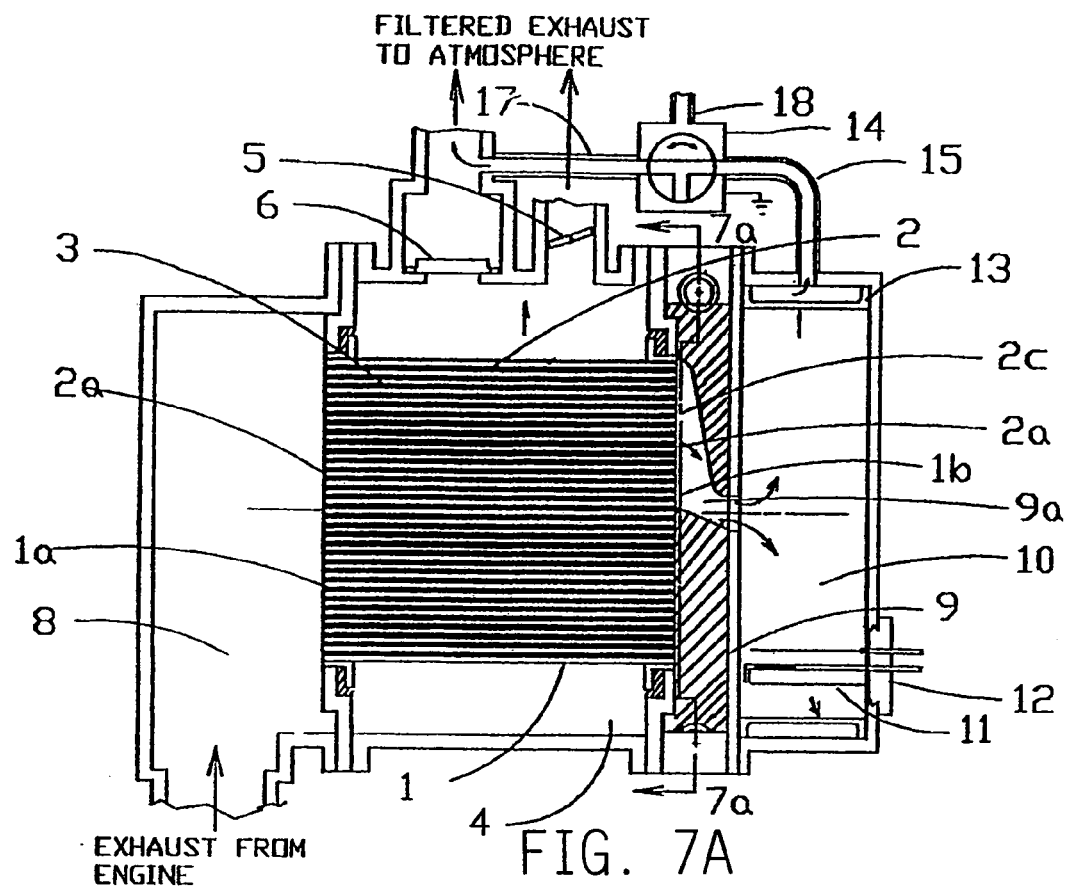
FIG. 7A is a cross sectional view of single cross flow trap system in which regeneration is accomplished by simultaneous reverse flow of filtered exhaust gas and through flow of unfiltered exhaust gas.
Figure 7B:
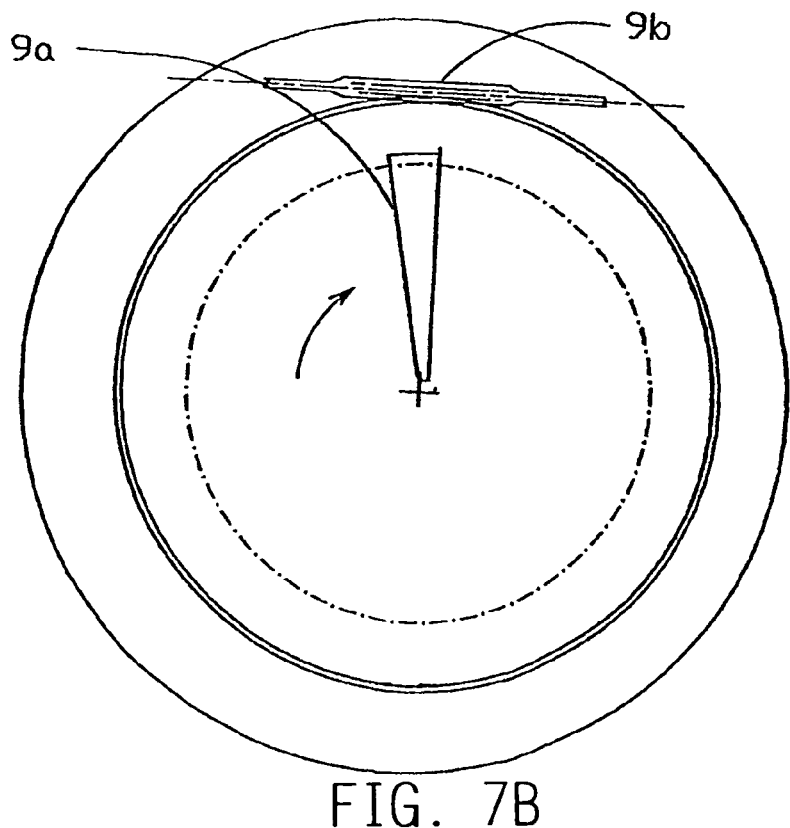
FIG. 7B is an end view of the single cross flow trap system of FIG. 6 to illustrate the rotary valve used to control the flow of exhaust gas for regeneration.

FIGS. 7 and 7a illustrates a single trap system that is very similar to that of FIG. 5 except that it has only one rotary valve and is therefore somewhat simpler. For this reason, all of the numbers of the remaining parts are the same as those used in FIG. 5. The major difference is that the cross flow trap through flow passages 2 are only blocked at their exit ends 2b until they are briefly opened by slot 9a as rotor 9 rotates. The passages 2 are always open to admit exhaust gas at their entrance ends 2a. All other parts remain the same as the system of FIG. 5 in both design and function.

In operation, exhaust from the engine enters chamber 8 and passes into the entrance ends 2a of all of the trap passages. In those passages 2 that are blocked at their exit ends 2b, the exhaust gas cannot escape and must pass through the porous walls 2c where the particulate is removed and from which it passes through the clearance 3 between the tubular passages 2 and thence into chamber 4. During normal operation the exhaust in chamber 4 passes through the open by-pass valve 5. The resistance to exhaust gas flow through the porous walls 2c will result in pressure drop across the trap between its entrance end 1a and its exit end 1b that will gradually increase to about 15 in. wg. as the filtered soot and ash collect. In normal operation, exhaust gas that enters the passages 2 in which their exit ends 2b are open will blow through the passages into chamber 10 in which the pressure is only a few in. wg. The aforementioned pressure drop results in an exhaust flow velocity through the passages 2 of about 40-50 feet per second. Because the rotary valve 9 is continuously rotated, each passage will be subjected to this moderate through flow velocity during normal operation and this may remove some of the soot and ash accumulation.

It is expected that under most engine operating conditions, soot and ash will continue to build up on the inner surfaces of the porous walls 2c of the passages 2. This will increase the pressure drop across the trap module and increase the pressure in chamber and 8 and thus increase engine backpressure with adverse affect on engine performance. It should be noted that the increased pressure across the trap will also increase the velocity of the exhaust gas through the passages 2 when their exits 2b are uncovered by slot 9a. This increased velocity will erode and dislodge much more of the soot/ash layer and remove it to the separation chamber 10 for combustion and storage. Thus, the system is to a large extent self regulating in the event of control failure and the like. However, it will probably be desirable to limit the increase in trap pressure drop to 15 to 20 in. wg. during most normal operation in order to have little or no adverse affect on engine performance. Increases above that will require that the trap system enter a regeneration mode.

When the control system determines that trap regeneration is necessary, based on backpressure or some other engine parameter, the by-pass valve 5 will close thus blocking the exiting filtered exhaust until the pressure in chamber 10 increases to the setting of the relief valve 6 such as 30 in. wg. At this point the filtered exhaust will flow through the relief valve and the pressure in chamber 10 will remain at a substantially constant 30 in. wg. Under these conditions, the pressure in inlet chamber 8 will be about 45 in. wg. Consequently, when the slot 9a uncovers the exit ends 2b of the slots, engine exhaust gas will flow through the affected passages 2 at a velocity greater than 100 feet per second. This will erode and dislodge much of the soot/ash accumulation within the passages. In addition, there will also be a large flow of previously filtered exhaust gas back through the porous walls 2c of the passages 2 over much of their length. As mentioned in connection with the system of FIG. 5, because of flow friction in the passages 2, there will be a reverse flow through the walls only along about half to two thirds of their length from the exit end. However, there will be a very high reverse flow toward the exit ends where the accumulated soot/ash cake is said to be the thickest. The strong reverse flow will either dislodge or break up the soot layer and make it more amenable to removal by the high velocity through flow exhaust gas. As in the case of the system of FIG. 5, the soot/ash particles blown out of the trap and the smoke contained in the through flow exhaust gas will be prevented from escaping to the atmosphere by the secondary filter 13 and the soot will be burned and the ash stored in chamber 10. Following the regeneration period that will involve at least one complete revolution of rotary valve 9, the by pass valve 5 will again be opened. This will return the pressure in chamber 4 to substantially zero for normal operation.

Figure 8:
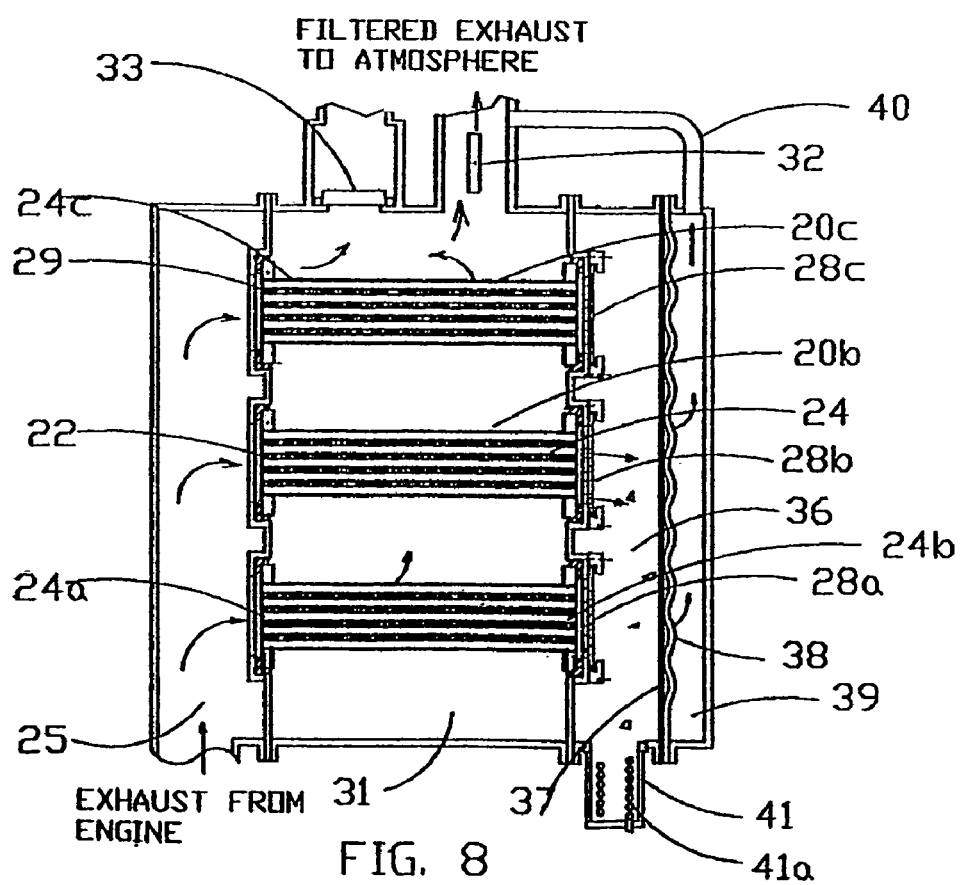
FIG. 8 is a cross sectional view of a multi-traps system in which regeneration is accomplished by simultaneous reverse flow of filtered exhaust gas and through flow of unfiltered exhaust gas.

FIG. 8 illustrates a multi-trap particulate trap system that is similar to the system shown in FIG. 6 except that it uses only one valve per trap and also incorporates a different type of secondary filter. Again, because of the similarity of design and operation, drawing numbers used are the same as were used in FIG. 6 except for the parts or components that are different. The major difference is that the system has no valves at the entrance to the traps and therefore the entrance to the passages 24 is never blocked. This simplifies the system because a second set of valves and their actuators is not required. The exit end of the passages 24b are blocked by valves 28a, 28b and 28c until one of these valves is briefly opened during the regeneration process. The other principal difference between this system and the one shown in FIG. 6, is a different type of secondary filter and associated soot igniter and ash canister. The secondary filter consists of a refractory fabric 37 that is capable of removing 90-95% of the soot from exhaust smoke and which is located across the structure at the exit of the traps. This is backed up by a convoluted porous or perforated metal plate 38. Chamber 36 is connected at the lower end to the igniter/storage chamber 41 that contains the soot igniter 41a. Chamber 39 is located behind the porous metal plate 38 to receive the filtered exhaust gas leaving the secondary filter 37 and porous plate 38 and conduct it to the atmosphere by means of duct 40.

In normal operation, exhaust from the engine enters chamber 25 and thence into passages 24. Because these passages are usually blocked by valves 28a, 28b and 28c, the exhaust gas must pass through the porous walls 24c of passages 24 whereby the particulate is removed. The filtered exhaust gas then passes through the clearance 29 between the passages 24 and then through open by-pass valve 32 to the atmosphere. During normal operation, valves 28a, 28b and 28c will each open sequentially for a brief period. Because the pressure in chamber 25 with clean traps will be 10 to 15 in. wg., there will be a brief moderate velocity (20-40 ft. per sec.) through flow in passages 24 because the secondary filter will be designed to limit the pressure in chamber 36 to no more than 2-4 in. wg. This through flow may result in some of the soot/ash cake being dislodged or eroded and it will pass into the separation chamber 36 to eventually be burned/stored. Another reason for sequentially actuating the valves 28 is to exercise them to prevent them from sticking.

As operation continues, the filtered soot and ash will buildup a layer on the inside of the porous walls 24c which will result in the pressure drop across the trap rising from say 10 in. wg. to perhaps 15-20 in. wg. As this pressure increases, it will increase the engine backpressure and there will be some point at which regeneration will be desirable. However, it should be noted that if no steps are taken the resultant eventual large pressure drop across the trap will rise to 40-50 in. wg. or even greater. This will cause exhaust gas to flow at very high velocity (>100 ft./sec.) through the trap passages and this will dislodge and erode the soot/ash layer at a much greater rate and will probably result in an equilibrium in which the soot/ash layer is removed at the same rate at which it is deposited. However, this may result in greater than desired engine fuel consumption because of the higher engine backpressure, making periodic brief but effective regeneration of the trap preferable.

When the control system indicates that regeneration is required, based on sensed engine backpressure or other parameters, the control first closes the by-pass valve 32. This blocks the passage of filtered exhaust gas to the atmosphere and causes the pressure in chamber 31 to increase until it opens relief valve 33 which is preferably set at 30 in. wg. This pressure in chamber 31 will exist around the periphery of all of tubes 24. When, say, valve 28*b* is then opened in its normal sequence as described above, filtered exhaust gas will flow in reverse through the porous walls 24*c* along the trap length from one third to two thirds of the distance from the tube exits 22*b*. The reverse flow will be maximum near the exit of each tube 24 and will then flow through the tubes 24 to exit into chamber 36. There will also be a simultaneous very high velocity (>100 ft. per sec.) flow of raw engine exhaust gas from chamber 25 entering tubes 24 at their entrance end 24*a* passing through the length of the tube and exiting into chamber 36. This very high velocity will result from the high pressure (45 in. wg.) in chamber 25 caused by the pressure drop across the porous walls of 15 in. wg. added to the 30 in. wg. backpressure caused by the relief valve. This very high velocity through flow of engine exhaust gas will dislodge and erode any soot/ash cake abetted by the reverse flow of filtered exhaust gas back through the soot/ash cake. The through flow will very effectively carry dislodged soot/ash particles out of the trap where some will fall by gravity to the igniter/storage chamber 41 and some will be caught by the fabric secondary filter material 37 along with the smoke that was contained in the raw exhaust gas. Following a brief opening of valve 28*b* to regenerate trap 20*b*, the valve 28*b* will close. This action will be followed a short time later by valve 28*c* opening to cause the same regeneration action in trap 20*c*. This sequential action will continue until all of the traps have been regenerated. At this time by-pass valve 32 will again open, dropping the pressure in chamber 31 to substantially ambient and normal operation will then continue with clean traps until regeneration is again required.

As operation continues, a layer of soot/ash will build up on fabric filter 37. However, the collected cake will be more or less continuously broken off by the impinging velocity of the exhaust gases leaving the traps which may erode the layer. In addition, the stagnation pressure due to the impinging flow as each valve 28 opens will cause the fabric to flex in a manner similar to bag house technology and this will mechanically crack and break off the soot/ash cake. In order to prevent fabric filter durability problems due to the flexing action, the convolutions in the perforated back-up plate 38 will be designed to limit flexing to no more than is required to break and remove the soot/ash cake.

The soot/ash particles that fall in chamber 36 will enter the igniter/storage container contact the very hot (>550° C.) igniter coils whereby the soot will be ignited and burned. The incombustible ash will pass on through the igniter coils and be stored in the igniter/storage container for periodic disposal.

FIGS. 9*a*, 9*b*, 10, 11 and 12 illustrate the perforated plate slide valves that are shown in the preceding multi-trap systems of FIG. 6 and FIG. 8; however, other suitable valves, such as poppet valves, can be used. The perforated plate slide valves have advantages, especially for valves used in the particulate trap systems in which the pressures are very low and in which a small amount of leakage can be tolerated. Advantages include flexibility of adapting to different cross sectional shapes of the trap, such as round, rectangular, etc., while maintaining a uniform distribution of the fluid to the trap regardless of the degree of opening. In addition, the stroke is very short and the inertia is minimal permitting very fast actuation by electrical solenoid or pneumatics. Finally the valves are very compact and should be relatively inexpensive.

Referring initially to FIGS. 9*a* and 9*b*, the perforated plate slide valve has a moveable perforated plate 44 and a stationary perforated plate 43, each containing an identical hole, slot or other aperture pattern. In the preferred embodiment, a series of approximately 0.25 inch diameter holes are spaced apart substantially as illustrated. The stationary perforated plate 43 may be part of the trap structure material. The moveable perforated plate 44 is a relatively thin and accurately guided plate having a suitable member 44*a* to attach it to an actuation device, not shown. A plurality of accurate stops (not shown) in conjunction with a guidance device (not shown) are used to assure that the moveable perforated plate 44 and the stationary perforated plate 43 are accurately aligned. The moveable perforated plate 44 and the stationary perforated plate 43 are constructed of a refractory material and are in close proximity to each other for satisfactory sealing.

FIG. 10 illustrates the moveable perforated plate 44 and the stationary perforated plate 43 assembled together with the holes aligned with each other in the "open" position. This provides at least a 25% open area in the face of the perforated plate slide valve that is satisfactory for controlling flow to the particulate traps at minimal pressure loss.

FIG. 11 illustrates the moveable perforated plate 44 and the stationary perforated plate 43 assembled together with the holes out of alignment in the "closed" position. The distance plate 44 moves from the open position to the closed position is approximately 0.3 inch.

Figure 12:
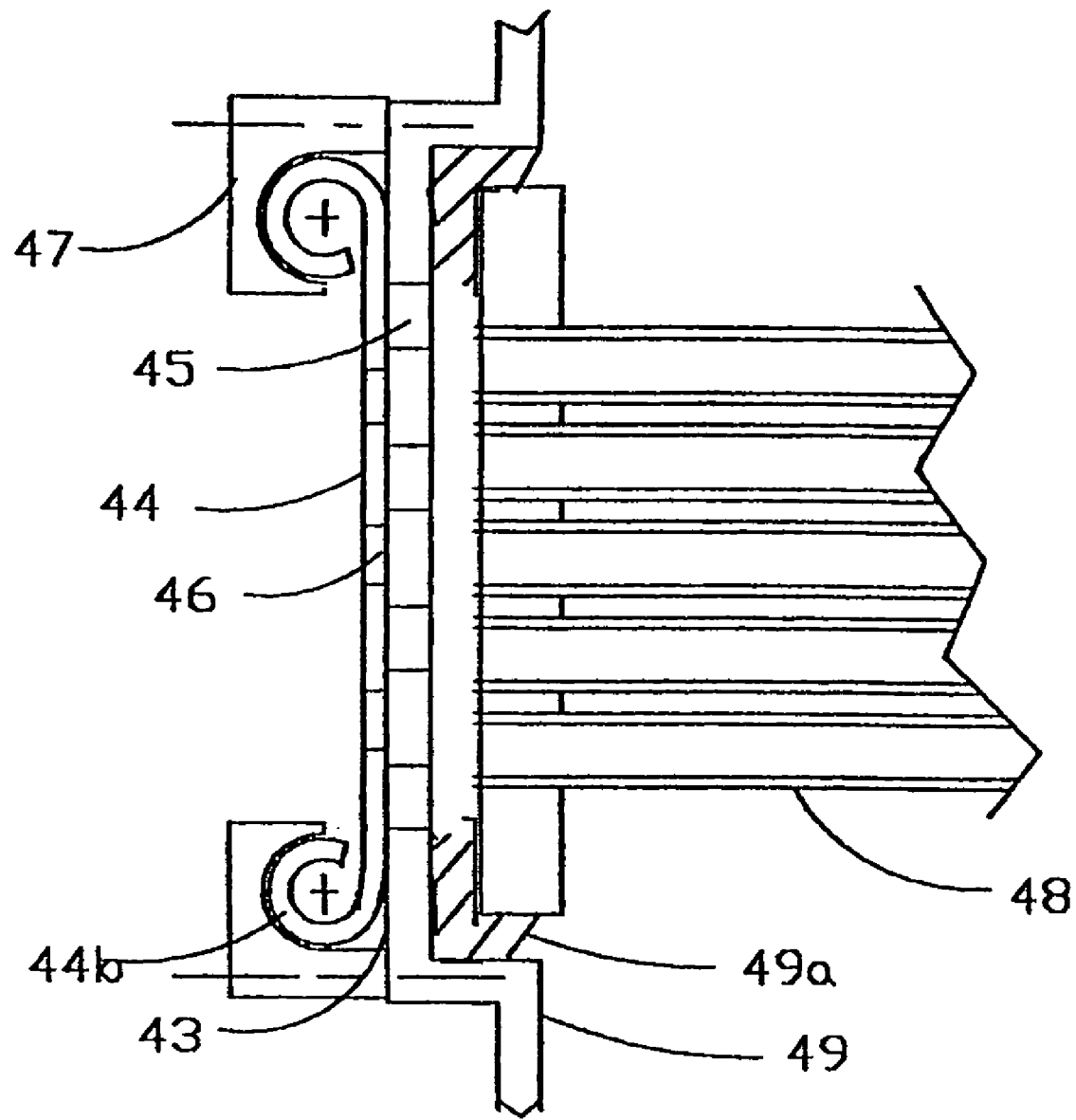
FIG. 12 is a cross sectional view of a complete perforated plate slide valve shown in the "closed" position.

FIG. 12 is a cross sectional view of the preferred design of the perforated plate valve for use with the aforementioned multi-trap particulate trap systems. The trap 48 is shown sealed in bulkhead 49 by a layer of Interam 49*a*. The stationary perforated plate 43 is manufactured as part of trap structure bulkhead 49 as shown, the perforated hole pattern probably being stamped in during the manufacture of the bulkhead 49. Moveable perforated plate 44 has a matching hole pattern to that of stationary perforated member 43, and is coupled by an appropriate member (not shown) to an actuator (also not shown). The moveable perforated plate 44 has an integral formed section 44*b* to provide a reliable and durable guide with bolted-on guide member 47. The moveable perforated plate is bent in a shallow arc (in the plane of the paper of FIG. 12) following its stamped forming and its high temperature grade material is then heat treated. During assembly, the guide member, with the moveable perforated plate in place, is bolted against the bulkhead 49. This action forces the arc of the heat treated plate into a flat configuration and this spring action effects a tight fit between the two plates, assuring a good seal when the valve is in its "closed" position.

Figure 13:
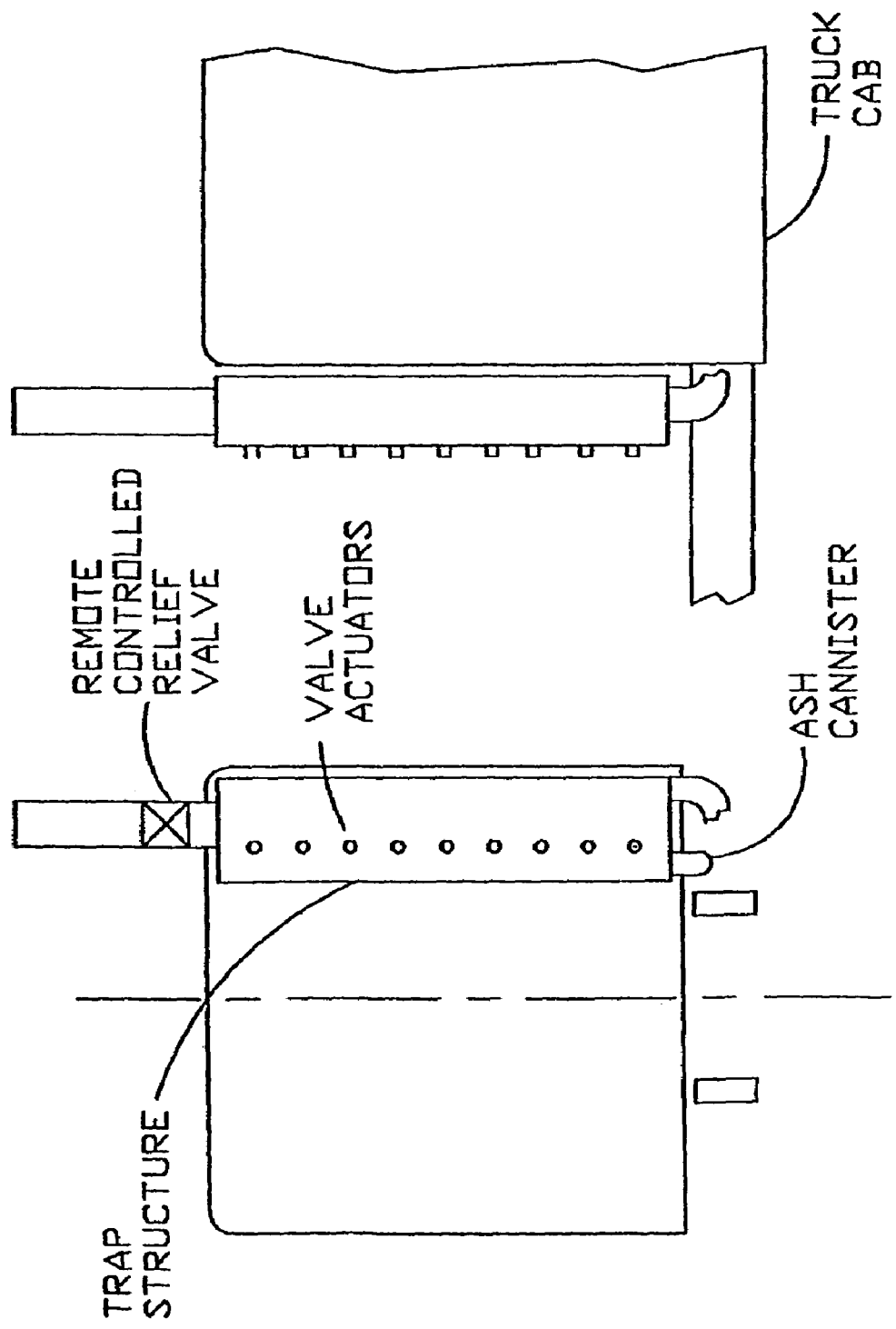
FIG. 13 is a view of the multi-trap particulate trap system as it might be applied to a tractor of a highway truck.

FIG. 13 illustrates how the particulate trap system of FIG. 8 might look like when mounted on the tractor of a highway truck. In this design, cross flow traps of the type manufactured by Asahi Glass Company of Japan are used. The nine trap modules (4"×5.6"×8") used would provide particulate control for a truck of about 300 hp. The traps can be located remote from the engine because no attempt is made to keep the traps hot in normal operation and they do not have to be heated for regeneration. As can be seen, the actuators for the perforated slide valves (as shown) can be located on the external surface of the trap structure and consequently operate cool. Because of the cool location, the short 0.3 in. stroke and low force required and the simple on-off valve function, it is expected that the valves actuators can use direct electromagnetic control.

Figure 14:
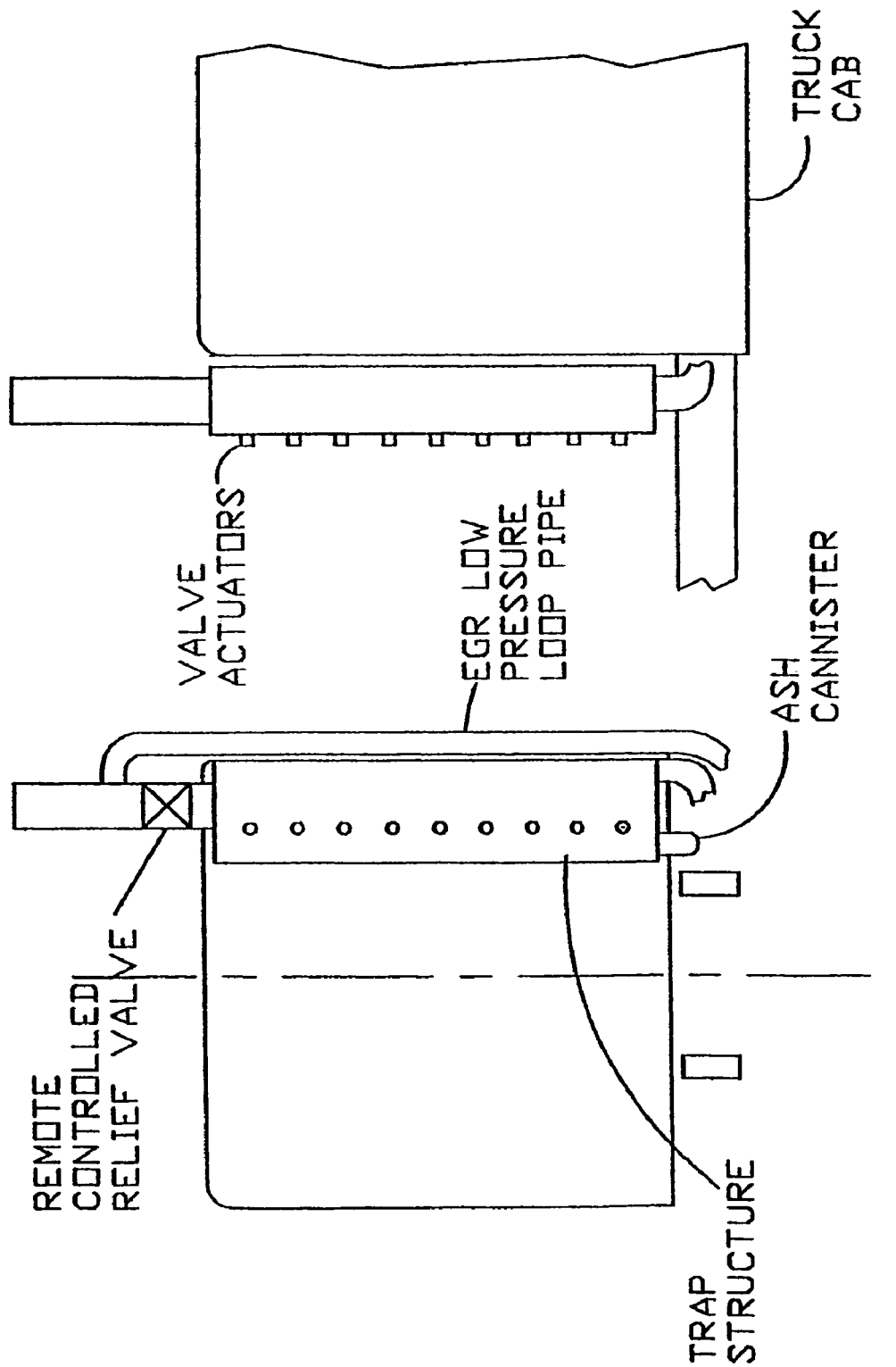
FIG. 14 is a view of the multi-trap particulate trap system to illustrate how it might look with the use of a low pressure loop exhaust gas re-circulation arrangement.

FIG. 14 illustrates how the particulate trap system of FIG. 8 coupled with low pressure loop (LPL) exhaust gas re-circulation EGR might look when mounted on a tractor of a highway truck. Low pressure loop EGR is considered to be well matched with this type of particulate control system with no sulfur reduction from current (2002) diesel fuel because of its excellent filtration efficiency, cool operating temperature, and lack of catalysts which can generate sulfates that can damage the engine. The cool location minimizes the amount of cooling that might be required prior to admitting the filtered re-circulated exhaust into the engine ahead of the turbocharger. The drawing shows the relief valve as a symbol; the design of this remote controlled component will be further discussed later.

Figure 15:
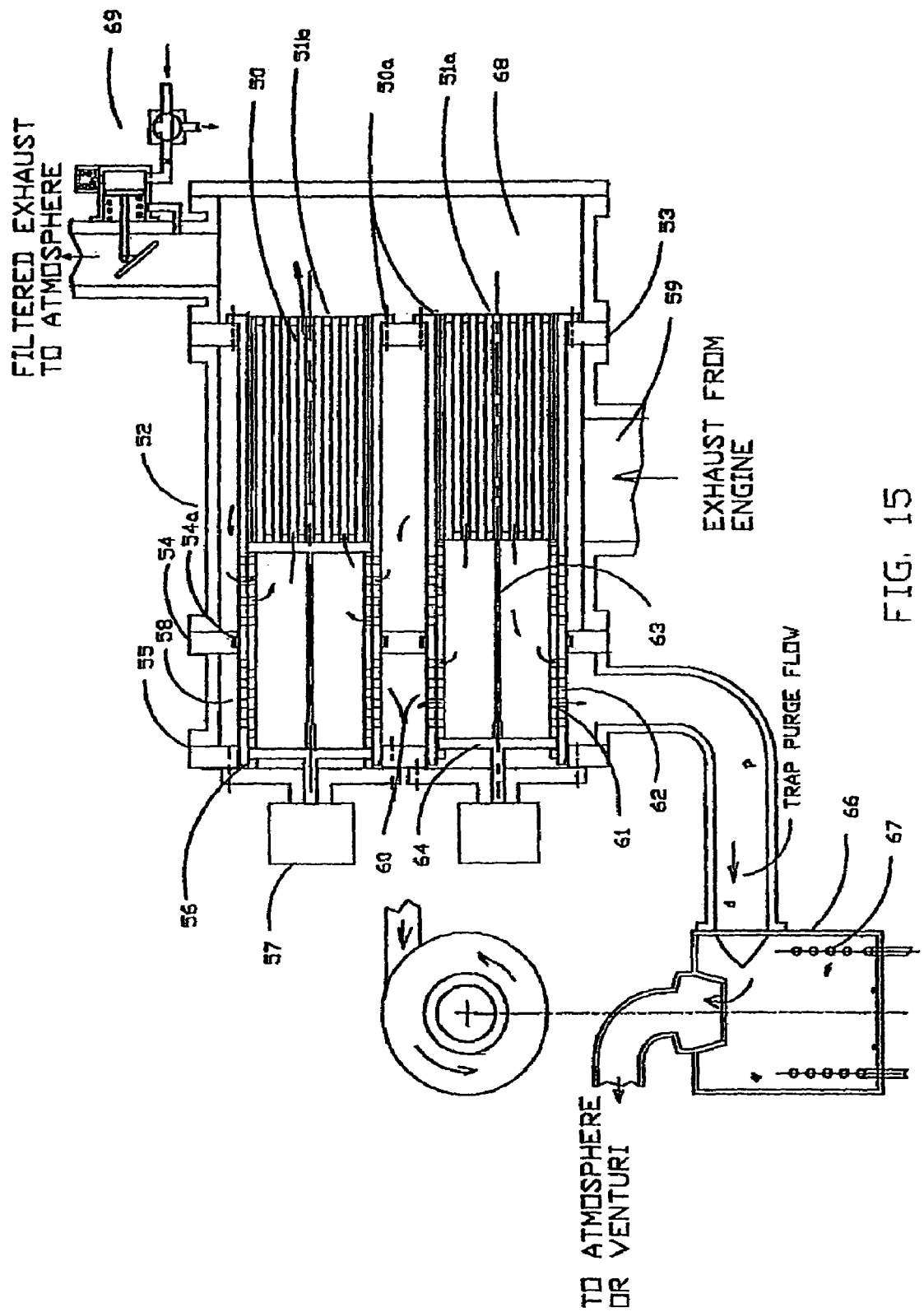
FIG. 15 is a cross sectional view of a multi-trap wall flow trap system having a remote controlled relief valve to increase the pressure in the filtered exhaust gas exit channel to provide pressure across the trap in the reverse direction.

FIG. 15 is a cross section of a multi-trap system that uses wall flow traps that are regenerated by reverse flow of pre-filtered exhaust gas. The wall flow traps 50, are contained in cylindrical tubes 50a, as assemblies 51a and 51b that have a layer of Interam (not shown) between the tubes 50a, and traps 50 to provide a seal and to hold the traps in place. The trap assemblies 51a and 51b are mounted in a structure that is shown generally as 52. Each trap assembly with its contained trap is slid into bulkhead 53, passed through the circumferential seal 54a in bulkhead 54, and thence into the bulkhead 55. The tube is then bolted to bulkhead 53, an "O" ring of Interam 56, is placed over the head of the tube, and the valve actuator/cover plate 57 is bolted in place. As can be seen, the bulkheads form separate channels 58 and 59 in the volume surrounding the trap assemblies 51a and 51b. Exhaust from the engine enters channel 59, passes around the trap assemblies 51a and 51b and is either permitted to pass through the traps, as shown in the case of trap assembly 51b, or is blocked from entering the traps as shown for trap assembly 51a. Channel 58, registers with the left end of the trap assemblies and is also connected with the centrifugal separator 66, which is used to remove and burn the dislodged soot and store the incombustible ash. Channel 58, is either open to permit flow to either exit or enter the traps, as shown in the case of 51a, or to block this flow as shown for the trap assembly 51b.

The above action is carried our by the cylindrical slide valves, shown generally at 60. A valve 60 consists of a pattern of small holes 62, (apprx. 0.25 in. dia.) arranged about a portion of the periphery of the tubes 50a, and a matching set of holes arranged about the periphery of an axially moveable cylinder 61, closely fitted within tubes 50a. As can be seen in the drawing, in the trap assembly 51a the moveable and stationary holes adjacent to channel 58, are aligned and thus can permit flow, while those adjacent to duct 59, are out of alignment and thus will not permit flow to take place. However, in the trap assembly 51b, the inner cylinder 61 of the valve has been moved axially to the left about 0.3 in. by the actuator 57. This results in the holes adjacent to duct 58, being out of alignment and are thus open to permit flow to occur. The outside diameter of the inner perforated cylinder 61, is made slightly larger than the inside diameter of the outer stationary tube 50a and the cylinder 61, and includes a longitudinal slit 63, in the cylinder wall. This permits the cylinder 61, to be squeezed slightly to permit installation in stationary tube 50a and, upon release, will result in a small outward pressure, due to the spring rate of the cylinder, to prevent leakage in the vicinity of the holes. The inner cylinder 61 will be made of a high temperature material to retain its physical properties in the hot environment. The actuators 57, move the inner cylinders by means of the tee shaped member 64, in which ends of the tee are loosely slipped into additional holes in the inner cylinders 61, prior to their installation in the stationary cylinders 50a.

Referring to FIG. 15, in normal engine operation the exhaust gas flow from the engine will enter channel 59, and then will enter all of the traps because the slide valves will all be positioned as shown in the case of trap assembly 51b. After passing through the aligned holes, the exhaust will enter into the small chamber formed within the slide valves 60, and then flow into the wall flow traps to be filtered. The filtered exhaust gas from all of the traps will then pass through the open relief valve, shown generally at 69, and thence to the atmosphere. The removed particulate matter will build up in a layer or cake on the inside of the trap entrance passages and this will result in an increase in trap pressure drop that will increase the engine back pressure and adversely affect engine performance. Consequently, after a few hours of normal operation the traps must be regenerated to remove the accumulated cake of soot and ash.

When the electronic engine control (EEC) senses exhaust backpressure or other parameters that indicate regeneration is required, the remote controlled pressure relief valve 69, in the exhaust channel 68, is activated to restrict any filtered exhaust gas from leaving duct 68, until its pressure has increased to approximately 30 in. w.g. This increased pressure is equally distributed in the clean exit channels of all of the traps and throughout the entire length of each channel. After a brief period, the EEC will cause one of the valve actuators 57, to move the slide valve 60 to the position as it is shown in trap assembly 51a. This action will block further engine exhaust from entering this trap and, at the same time, open the normal entrance of this trap to channel 58. Because channel 58 is at, or below, ambient pressure, a very significant reverse pressure differential will exist across the porous walls of the wall flow trap channels throughout their length. It is emphasized that this very significant reverse pressure drop will remain constant during the regeneration period. This is because the other traps in the system will continue to filter and supply clean exhaust into channel 68, which must exit through the pressure relief valve. This constant reverse pressure will break off and dislodge the accumulated soot/ash cake and will also result in a strong reverse flow of pre-filtered exhaust gas through the porous trap walls. This flow will further erode any remaining soot/ash cake and carry the dislodged particles out through channel 58 and thence into the centrifugal separator 66, in which the soot will be burned by high temperature electrical heater coils 67, and the incombustible ash stored for periodic disposal. It is emphasized that the reverse flow used to remove the soot and ash cake and carry the particles to the centrifugal separator consists of pre-filtered clean exhaust gas, except for an insignificant amount of raw exhaust that is trapped in the valves at the time of their actuation. Thus, most of the soot and ash particles will be removed from clean exhaust gas by the centrifugal separator and burned or stored.

Because there is only a moderate increase in pressure in Channel 68, and thus in engine backpressure, during the regeneration period, this reverse flow clean-out of a trap can be maintained for several minutes without significant adverse affect on engine performance. After this reverse flow clean-out has been completed, the EEC will proceed to return this valve to its original position as in the case of 51*b* and the EEC will move the valve of the next trap to the position as illustrated by 51*a*. This sequential action will continue until all traps have been regenerated. At this time all valves will be returned to the position as shown for 51*b* to permit all traps to again begin filtering the engine exhaust and the relief valve 69, will again move to a fully open position, thus returning engine exhaust pressure back to normal.

Figure 16:
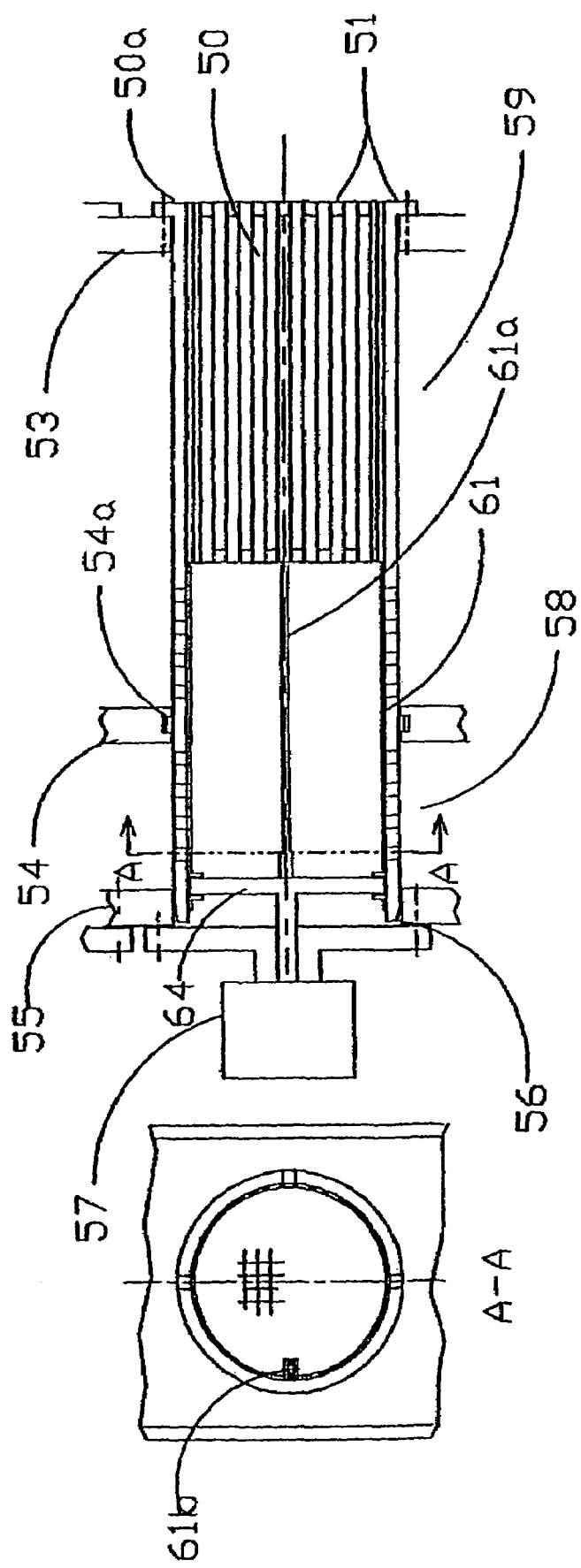
FIG. 16 is a cross sectional view of a cylindrical perforated plate slide valve used with a wall flow trap system to control the normal flow of exhaust gas for filtration and for periodic reverse flow of filtered exhaust gas for regeneration.

FIG. 16 illustrates an enlarged cross sectional view of the cylindrical perforated plate slide valves. These were described earlier as used in flat plate form for simple on-off control of flow. The cylindrical form is used, as mentioned in regard to FIG. 15, to provide a three-way type of valve. Numbers used in FIG. 16 are the same as used in FIG. 15 for functionally similar parts. The tube 50*a* is used to contain the trap 50*a* and is also a functional part of the cylindrical perforated valve as will be explained. The trap assemblies 51 are slid into the structure through bulkhead 53. The tube 50*a* is then pushed through the internal seal ring 54*a* located in bulkhead 54 and then finally is pushed into the aperture in bulkhead 55. The tube 50*a* contains the perforations or holes (apprx. 0.250 in. dia.) and is the stationary part of the slide valve. The inner, moveable cylinder 61 is made of thinner (apprx. 0.030 in. thick) refractory metal such as stainless steel and is formed into a partial cylinder that is slightly larger in diameter than the inside diameter of tube 50*a* and has a small gap 61*a*. The tube 51 and inner cylinder 61 would probably be manufactured by stamping flat prior to rolling into cylinders, at which time the small perforations or holes would be stamped. The hole pattern is such that with the inner cylinder in one axial position, the holes in the two cylinders at the left (as shown) line up exactly with each other and are "open" while the holes in the two cylinders at the right (as shown) are misaligned. and are thus "closed". Actuation of the valve inner cylinder to move it to the left stop (in the drawing) will change the "open" holes to "closed" holes and vice versa. The inner cylinder 61 is sprung to a slightly smaller diameter with a device like a piston ring compressor and then it is slid into the larger tube 50*a* and then a pin (not shown) is placed in the outside tube in a hole made in the original stamping operation to locate and keep the two cylinders in correct positions with each other. When the inner cylinder 61 is being prepared to be pushed into place, actuation member 64 is loosely slipped into the punched orifices shown and moves in with the inner cylinder, along with the actuator mechanism 57. It is assumed that a suitable material can be found for the inner cylinder to be able to retain much of its spring-like properties when located in the heated exhaust. An alternative is the addition of Belleville springs made of a material like Hastelloy X to provide a nearly constant pressure between the inner and outer cylinders to assure good sealing. The method of operation of the cylindrical perforated slide valves was described in regard to FIG. 15.

Figure 17:
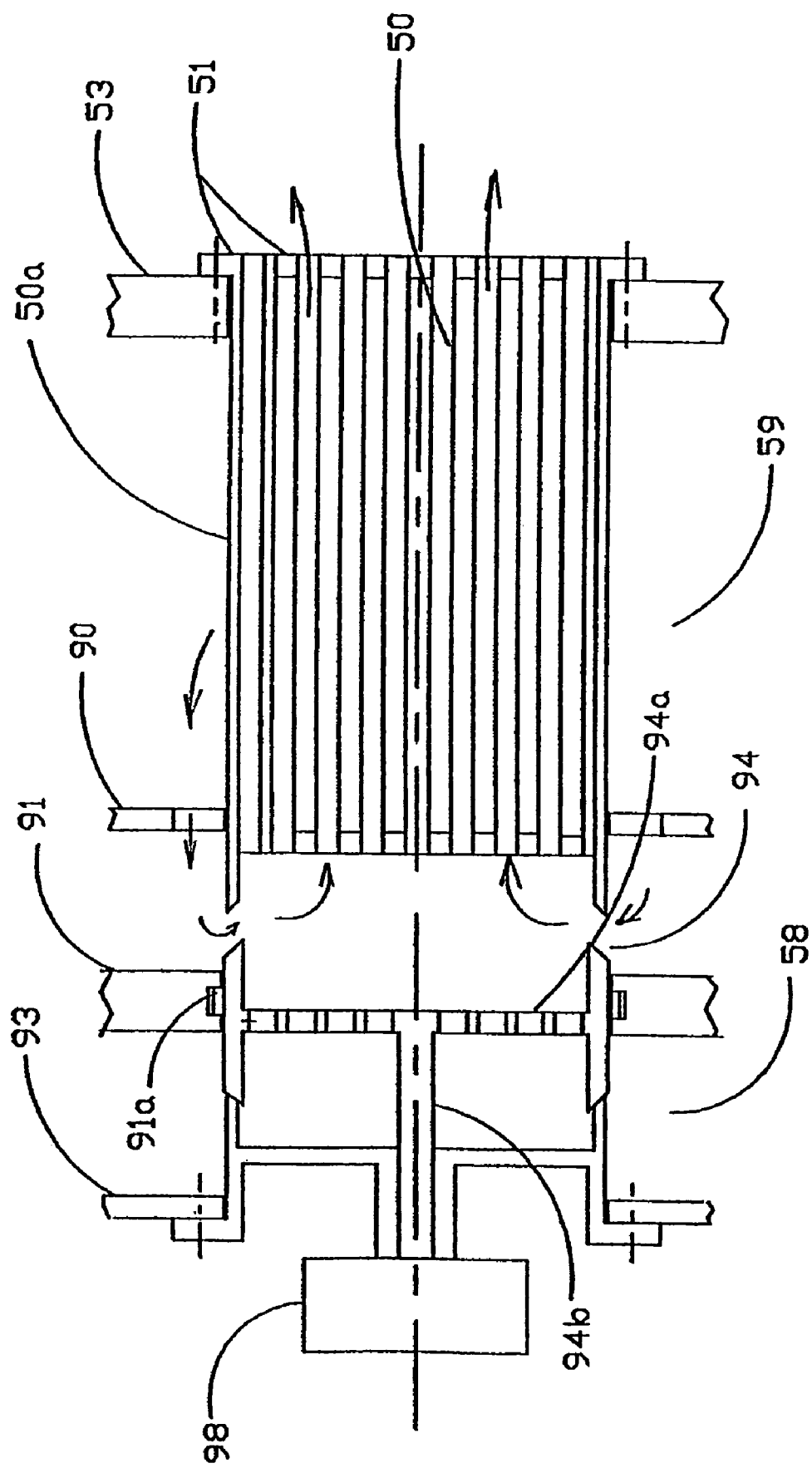
FIG. 17 is a cross sectional view of a two-position poppet valve used as an alternative means to control the normal flow of exhaust gas for filtration and for periodic reverse flow of filtered exhaust gas for regeneration.

FIG. 17 is an alternative means of controlling the flow as required for the particulate trap system shown in FIG. 15. Again, the part numbers used in FIG. 15 will be used for this device for functionally similar parts. Tube 50*a* contains a wall flow particulate trap 50 with the space between them sealed with Interam (not shown). The trap assembly 51 is slid in through bulkhead 53, then through bulkhead 90 whose sole function is to maintain lateral position of the left end (in the drawing) of the trap assembly 51 by means of the stamped fingers and slots in bulkhead 90. Bulkhead 91 contains an inner ring seal 91*a* through which tee shaped (in cross section) poppet valve 94 is slid. The seal at the outside surface of the poppet valve 94 effects a seal to prevent any exhaust gas from passing from chamber 58 to 54 when the valve is seated in either direction. The poppet valve contains large perforations 95 to permit flow of exhaust to pass freely between chambers 59 and 58 within the confines the outer cylinder.

During normal filtration, the exhaust gas from the engine passes through channel 59 and thence around each of the particulate traps. Flow from this channel then passes through the slots in bulkhead 90 and then through the opened poppet valve 94 and enters the trap 50 as indicated by the arrows. The exhaust gas then passes through the trap wherein it is filtered before entering the exit duct as it leaves the trap.

During regeneration of the trap, the poppet valve 94 moves to the right (in the drawing) about 0.7 inches and seats against the trap can 50*a*. This action prevents any further exhaust gas from passing from channel 59 into the valve chamber. The valve action also unseats the poppet valve 94 from the valve actuator structure and permits exhaust gas from the exit duct to flow in reverse through the trap 50 into the valve chamber, through the apertures 94*a* and then out through the opened valve and into channel 58. This reverse flow dislodges and erodes the soot/ash cake on the trap inner surfaces and carries them through channel 58 to the separation chamber (not show) wherein the soot is burned and the incombustible ash is stored for periodic disposal.

Figure 18A:
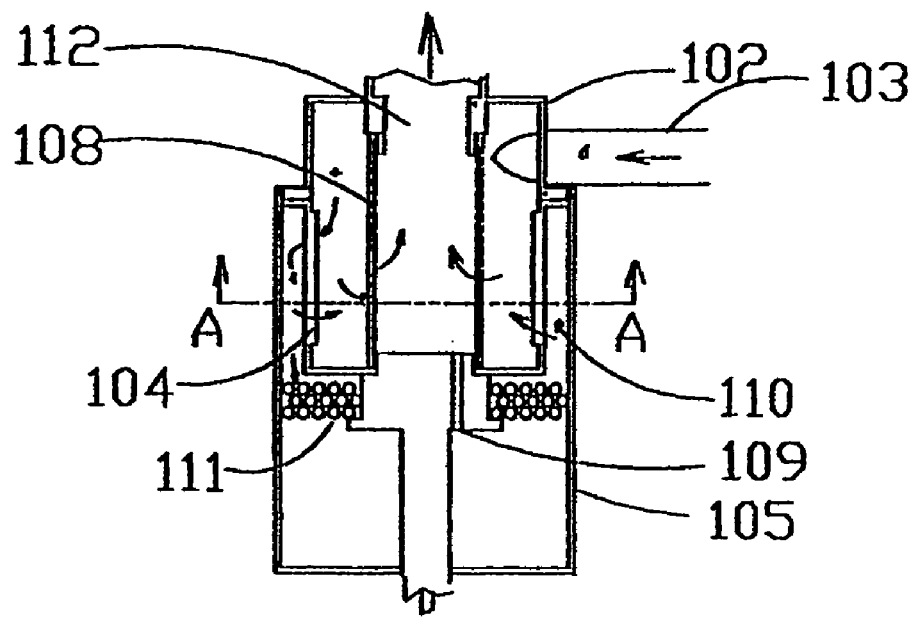
FIG. 18A is a cross sectional view of a device for separating the soot and ash particles from the regeneration reverse flow of filtered exhaust gas, and igniting the soot and storing the incombustible ash prior to allowing the flow stream to enter the atmosphere.
Figure 18B:
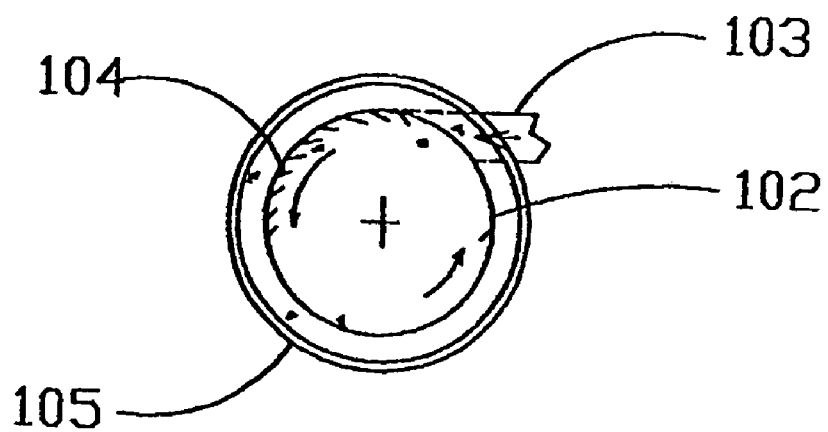
FIG. 18B is a cross sectional view of a device for separating the soot and ash particles from the regeneration reverse flow of filtered exhaust gas, and igniting the soot and storing the incombustible ash prior to allowing the flow stream to enter the atmosphere, taken along line a-a.

FIG. 18 illustrates the separator and igniter/storage device used to remove the soot/ash particles from the reverse flow stream of pre-filtered exhaust gas by which the soot/ash was removed from the trap(s) during regeneration. The reverse flow pre-filtered exhaust gas is itself clean and free of exhaust smoke. However, the particles must be separated from this stream and the soot ignited and burned and the incombustible ash stored before the stream can be discharged to the atmosphere. While a simple centrifugal separator as shown with the system in FIG. 15 may suffice, a somewhat more extensive device may be required. Pre-filtered with its content of dislodged soot/ash particles enters the separator from duct 103 off-set as shown in view A-A such that the gas spins at a high rate of rotation within casing 102. This rotational motion will tend to move the particles, which have relatively high mass, out toward the periphery of casing 102. As the spinning flow stream moves down in casing 102, the particles will be caught by small louvers 104 and directed into the annular volume 10 between the casing 102 and the ash storage canister 105. These particles fall down by gravity abetted by a small flow of exhaust through orifice 109. Upon contacting the high temperature (>550° C.) igniter coils 111, the soot is ignited and burned and the incombustible ash continues to fall down and be deposited in the ash storage canister 105 for periodic disposal. The majority of the pre-filtered exhaust gas, devoid of most of the particles passes into the exit duct 112 after passing through a final refractory fabric filter 108. The final filter will probably not be required but can be optionally included to assure that no particles are emitted to the atmosphere. Alternatively, a separate larger secondary filter of any suitable design can be used for this latter purpose. It would be expected that the soot igniter coils would require about 200 watts of energy when energized to ignite the soot.

Figure 19:
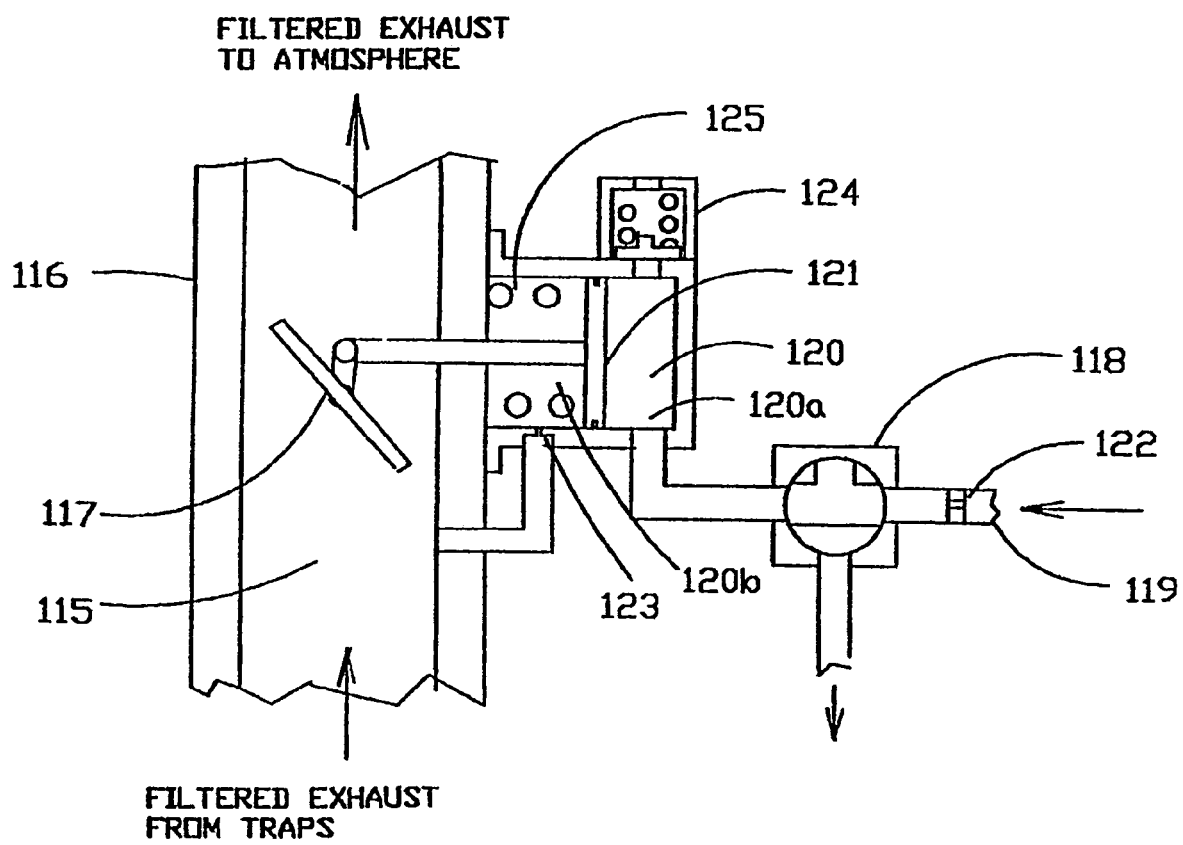
FIG. 19 is a cross sectional view of a remote controlled relief valve for maintaining a desired pressure in the filtered exhaust duct.

FIG. 19 is a drawing of a remote controlled straight relief valve. Referring to the drawing, the filtered exhaust passes up from channel 68 (FIG. 15) and enters the duct 115 in the relief valve body 166. It then passes butterfly valve 117 that is open during normal trap filtering, and then passes on to the atmosphere as indicated. When the EEC detects that regeneration is required, three-way valve 118 is opened to the position shown. This permits air from the air brake reservoir to flow through pipe 119 and thence into the actuator cylinder 120 and builds up a pressure in end 120*a* of the cylinder until it reaches the 30 in. wg. setting of the small relief valve 124. This forces piston 121 to move to the left and, through a suitable linkage, rotate the butterfly valve toward the closed position. The speed at which this occurs is controlled by the small choked orifice 122 in the air supply line. As the butterfly valve begins to close, pressure will build up in passage 115 and channel 68 (FIG. 15). As this pressure builds up, exhaust gas will flow through the tube and damping orifice 123 and build up an opposing pressure in end 120*b* of the cylinder. When the pressure in 120*b* equals the 30 in. wg. pressure in 120*a* maintained by the small relief valve 124, the buttterfly valve will stop closing with 30 in. wg. pressure existing in passage 115, as desired. If the engine speed decreases, the pressure in passage 115 will decrease, air will flow out of 120*b* and the constant small flow of air into 120*a* will cause the piston to move the butterfly toward closed until once again the pressure in passage 115 just balances the 30 in. W.G. pressure in 120*a*. If engine speed increases, a similar but opposite action will occur. When it is desired to deactivate the relief valve assembly 116, the EEC will rotate the three-way valve to close off the air supply and dump the air contained in the system, thus letting the air pressure in passage 115 and the force of the small spring 125 to rotate the butterfly valve to the fully open position at which setting there is little no pressure in channel 68 (FIG. 15).

Figure 20:
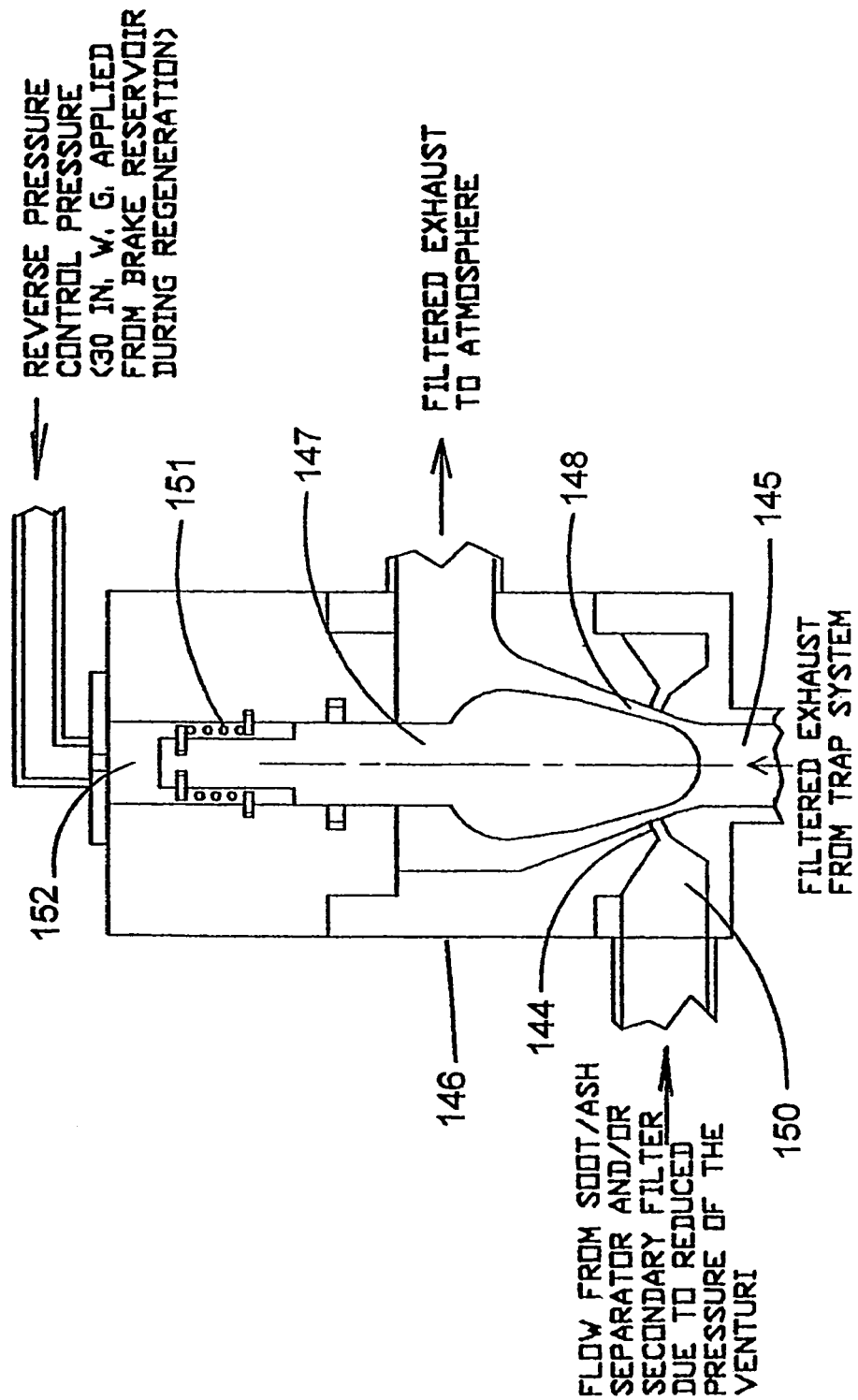
FIG. 20 is a cross section of a remote activated relief valve/venturi arrangement for maintaining an increased pressure on the exit of each trap and for providing reduced pressure at the inlet of each trap and thereby increasing the reverse flow pressure drop across the trap.

FIG. 20 shows a cross section of the combined relief valve/venturi. The object of this design is to increase the reverse pressure drop that can be imposed across the trap for a given engine back pressure. With a simple relief valve, we can, for example, impose a 30 in. wg. back pressure in channel 68 (FIG. 15). If we assume a 15 in. wg. pressure drop across the trap walls at the time of regeneration, we will then have an engine backpressure of 45 in. wg. which is within the engine manufacturers recommended limit. However, if we place a venturi in the exhaust stack with this same 30 in. wg pressure drop as it flows to ambient pressure, we can obtain a vacuum at the venturi throat of about 20 to 60 in. wg. Because this will be in series with the 30 in. wg back pressure we will have, neglecting pipe flow losses, a reverse pressure across the trap walls of 50 to 90 in. wg. Thus, we will have greatly increased the aggressiveness of the reverse flow cleaning process or, if not required, we can achieve the same reverse flow with less back pressure on the engine.

Referring to FIG. 20, the filtered exhaust passes up from channel 68 (FIG. 15) and into the main passage 145 of body 146. The flow then is split by valve member 147, and thence passes up through the annular channel 148 and then out to the atmosphere, as indicated. As the flow splits and enters the annular channel, in which the minimum cross sectional area is much less than that of passage 145, the velocity is greatly increased and consequently the static pressure is significantly reduced. This low pressure is connected by annular slots 149, to passage 150 and this, in turn, is connected to the outlet of the centrifugal separator and thence to channel 58 and the trap passages.

It will be noted that the valve member comprises a piston which tends to be pushed upward by the very light, low rate parking spring 151. The valve will be forced in the down direction by pressure in the cavity 152 above the piston. When activated, air at a constant 30 in. wg. will be imposed in the cavity 152 and this will push the piston down and decreasing the cross sectional area of the annular passage 148 and therefore increasing the pressure in passage 145 and channel 68 (FIG. 14). When the pressure in passage 145 reaches 30 in. wg., the force downward by the activation air pressure will be just balanced by the equal 30 in. wg. pressure and the desired reverse pressure in channel 68 will be achieved. Also, the high velocity in the annular channel 148 will create a low pressure (vacuum) in the passage 150, as previously discussed, which will be used to enhance the reverse pressure across the trap walls.

When the engine speed and/or load increase, the increased flow through annular passage 148 will increase the pressure in passage 145 and this will push piston/valve 147 up against the constant activation pressure. Reduced engine speed and/or load will have a reverse affect. When regeneration is complete, the activation pressure is dropped to zero by the EEC and the gas pressure and the force of the return spring will move the piston/valve up to remain against its stop and the pressure in channel 68 (FIG. 15) will drop to substantially ambient.

Figure 21:
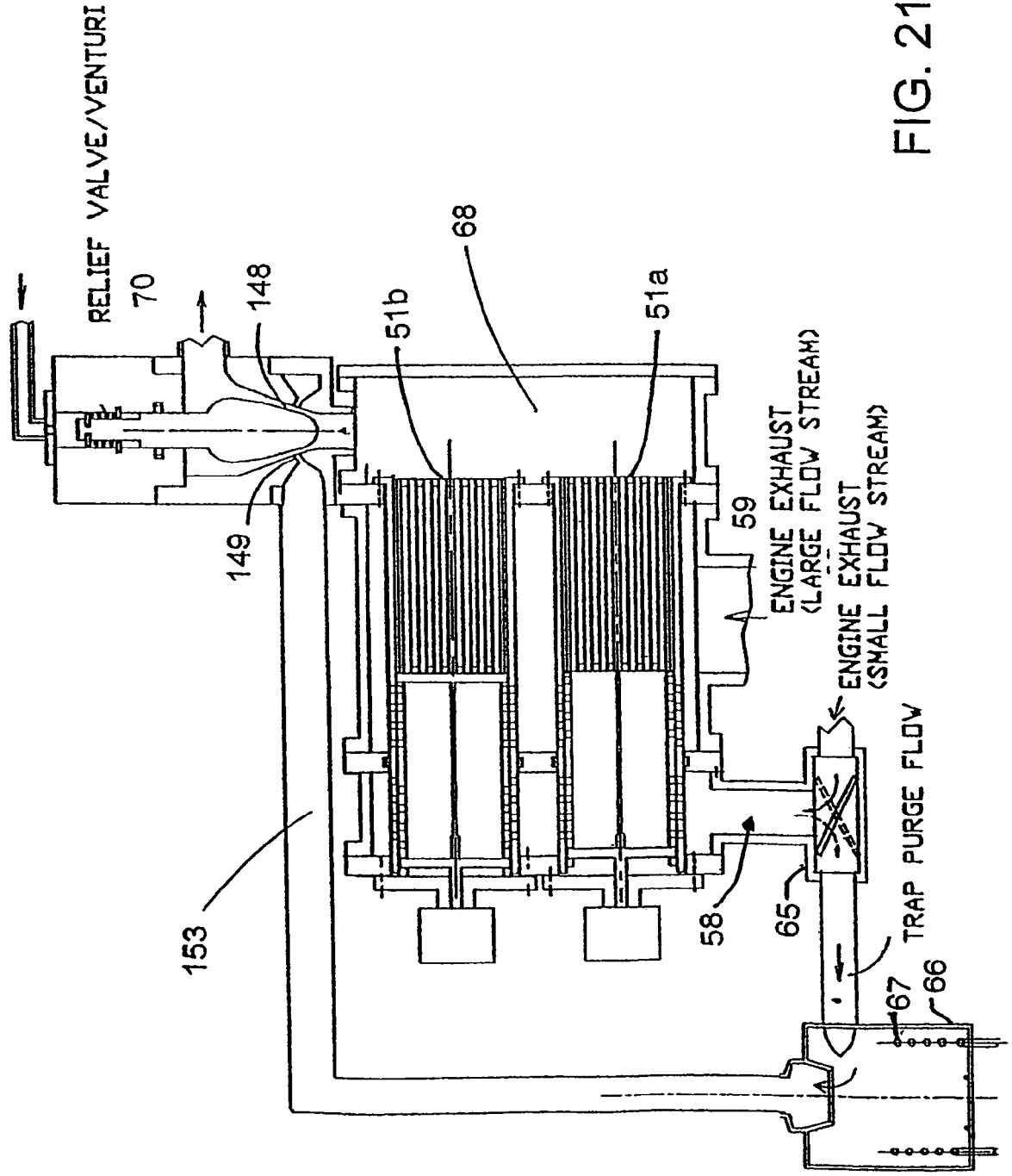
FIG. 21 is a cross sectional view of a multi-trap wall flow trap system having a remote controlled relief valve/venturi valve to increase the pressure at the normal exit of the trap while, at the same time, reducing the pressure at the entrance to the trap to provide a greater reverse pressure drop across the trap but without increasing back pressure on the engine and means to modify the exhaust flow to permit heating of the traps t o effect soot burn-out if required under certain conditions.

FIG. 21 is similar to the configuration shown in FIG. 15 that was discussed earlier except that it employs a venturi in conjunction with the relief valve to obtain greater reverse differential pressure and it also uses a 3-way valve to modify the exhaust flow to permit heating of a small portion of the exhaust gas to assist regeneration as will be discussed later in more detail. Because most of the elements are the same as in FIG. 15, only the parts pertinent to the discussion will be identified.

The relief valve/venturi, which was described in the discussion of FIG. 20, is shown at the exit of the filtered exhaust channel 68, and connected by channel 153, to the outlet of the separator. As described in the discussion of FIG. 20, the relief valve/venturi will provide the desired increased pressure in chamber 68 of say 30 in. w.g. while the increased velocity at the throat 148, of the venturi will reduce the pressure at this point to 20-60 in. w.g. below ambient (vacuum). The increased pressure in channel 68 coupled with the reduced pressure in duct 153 results in a significantly greater reverse pressure drop of 50-90 in. w.g. across the trap wall during regeneration. The venturi principle can also be applied to the cross flow trap systems but it is felt to be more useful applied to the wall flow configurations because of the absence of any high velocity through flow in this type of trap.

The three-way valve 65 is arranged to normally admit the smaller of two streams of engine exhaust into channel 58 or, upon actuation for trap regeneration, connect the channel 58 with the soot/ash separator 66 and internal igniter coil 67. The major portion of the exhaust enters channel 59 and then after passing through the perforated valves as shown in 51*b*, enters all of the traps except one. Filtered exhaust, after passing through the traps, passes up channel 68 and then through the relief valve/venturi assembly, shown generally at 70, which, upon demand by the electronic engine control (EEC) can be actuated to create a pressure in channel 68, and thus in all of the clean exit passages of all of the traps, of about 30 in. w.g. along with a negative pressure (vacuum) in the separator chamber 67, as discussed above and in conjunction with FIG. 20.

In normal operation the exhaust flow from the engine will, after passing through a suitable divider, continue on to pass through 3-way valve 65 and thence enter channel 58. Depending upon the number of traps used, this flow may be from perhaps ¼ to ¹⁄₁₅ of the total exhaust flow. The remaining exhaust flow may be ¾ to ¹⁴⁄₁₅ of the total flow and will this will enter channel 59 through the large exhaust flow entrance. At the trap, the small exhaust stream will enter channel 58, pass through the open perforated valve in trap assembly 51a, thence through the trap and then exit into channel 68 as filtered exhaust. The large exhaust stream will enter the channel 59, from which it will enter all of the other trap assemblies in which the perforated valves are positioned as in trap assembly 51b. These traps will also filter the exhaust passing through them and these flow streams will also enter channel 68, where they will combine with the small exhaust flow emanating from trap assembly 51a. The combined stream of exhaust, now filtered, will pass through the relief valve/venturi 70, which is fully open to permit flow to pass through with no retained pressure in channel 68. This operation will continue with 90-97% of the soot/ash being removed from the exhaust, with little or no adverse affect on engine performance and without any need for low sulfur fuel. However, after extended operation of a number of hours, the soot/ash will build up as a cake on the inside surfaces of the trap passage walls and this will ultimately increase trap pressure drop until the engine exhaust back pressure increases to a level of 15-30 in. w.g., and regeneration is required to remove the collected layer of soot/ash.

When the electronic engine control (EEC) senses exhaust backpressure or other parameters and these indicate that regeneration is required, the relief valve 70 is activated to restrict any filtered exhaust from leaving channel 68 until its pressure has increased to about 30 in. w.g. As stated previously, this increases the pressure in all of the trap exit or clean passages. Following this action, the EEC will cause the three-way valve 65 to move to its position shown "dashed" and this will stop all further flow toward the trap system in the small flow pipe and this flow will then begin to enter channel 59 along with the large stream of exhaust gas. At the same time, channel 58 will be opened permitting the exhaust gas in channel 58 to flow to the centrifugal separator and thence through duct 153 to the relief valve/venturi in this configuration.

Each time a cylindrical perforated slide valve opens to connect a trap with channel 58, which is now at or near ambient pressure, there will be a strong reverse flow from channel 68, back through the trap walls during which time the flow will dislodge and erode the soot and ash cake. The flow will then carry the particles of dislodged particulate out through channel 58 and thence into the centrifugal separator. As mentioned in the discussion of FIG. 15, the reverse pressure drop will be sustained as long as the perforated slide valve keeps the trap open to channel 58. This is because the large exhaust flow stream will continue to pass through the traps and enter channel 68 and then exit through the relief valve which will keep the pressure constant at the selected setting under all engine operating speeds and loads. It is believed that this strong sustained reverse flow will remove all, or substantially all, of the soot and ash.

It is stressed that the reverse flow that is used to dislodge the soot and ash has been previously filtered and will contain no smoke except a very small amount that resides in the trap at the time the perforated valve is actuated. This clean stream, with its entrained, relatively large soot/ash particles, is carried out in channel 58 and will pass tangentially into the centrifugal separator 66. This action will force the relatively large particles of soot/ash to the outside where the soot will be burned by igniter 67 and the ash will remain in storage. The center flow will move up and through the pipe and thence, if found necessary, to a secondary filter. It will then be delivered to the combined relief valve/venturi assembly which will be at a vacuum of about 20 to 50 in. w.g. as a result of the venturi action.

The above action will continue, with each trap being reverse flow cleaned, in turn, until all of the traps have been cleaned. Following this, the relief valve/venturi will be deactivated thus dropping the pressure in channel 68 to substantially ambient. Valve 65 will then be actuated to again close off the flow path to the centrifugal separator and open the flow of the small flow stream into channel 58 once again. During all normal operation, the cylindrical slide valves will continue to actuate thus connecting each of the traps to channel 58 for a brief period in turn. This periodic movement will keep the valves and actuators from becoming stuck or otherwise put out of order due to prolonged residence in one position.

Figure 22:
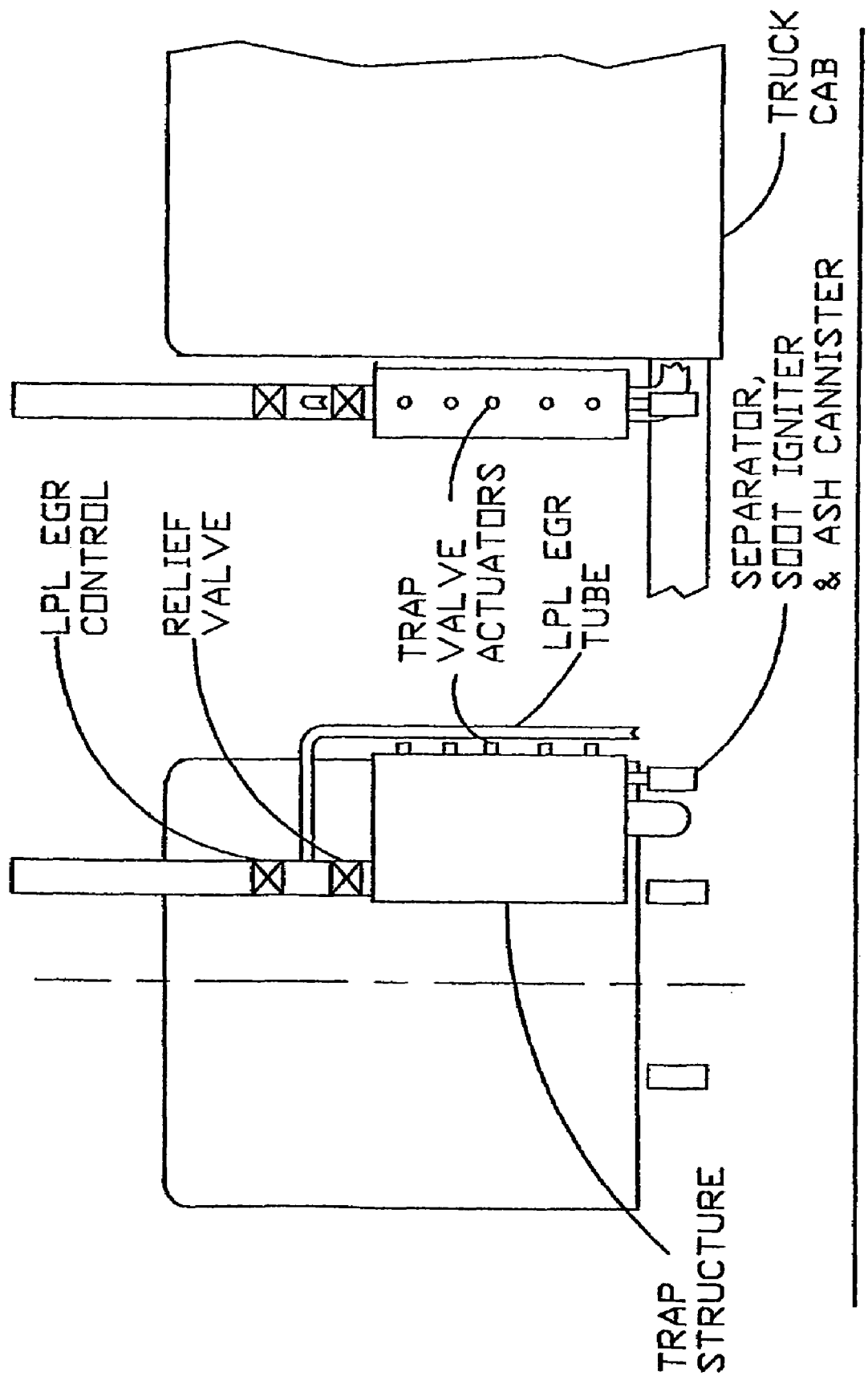
FIG. 22 is a view of how a particulate trap system consisting of wall flow traps and low pressure loop EGR might look like on a highway truck.

FIG. 22 illustrates an installation of the wall flow trap system of FIG. 15 as it might be installed on the tractor of a highway truck. In this design, five wall flow traps (5.66" dia.×12" long) traps are used, along with a duct and control for low pressure loop EGR. The use of the larger (5.66" dia.×12" long) traps minimizes the number of trap assemblies and associated trap control valves required for a given engine horsepower. Characteristics, such as high efficiency particulate removal, low trap temperature and the absence of catalysts that may generate sulfates make these trap systems attractive for the use of this simpler and more efficient EGR approach.

Figure 23:
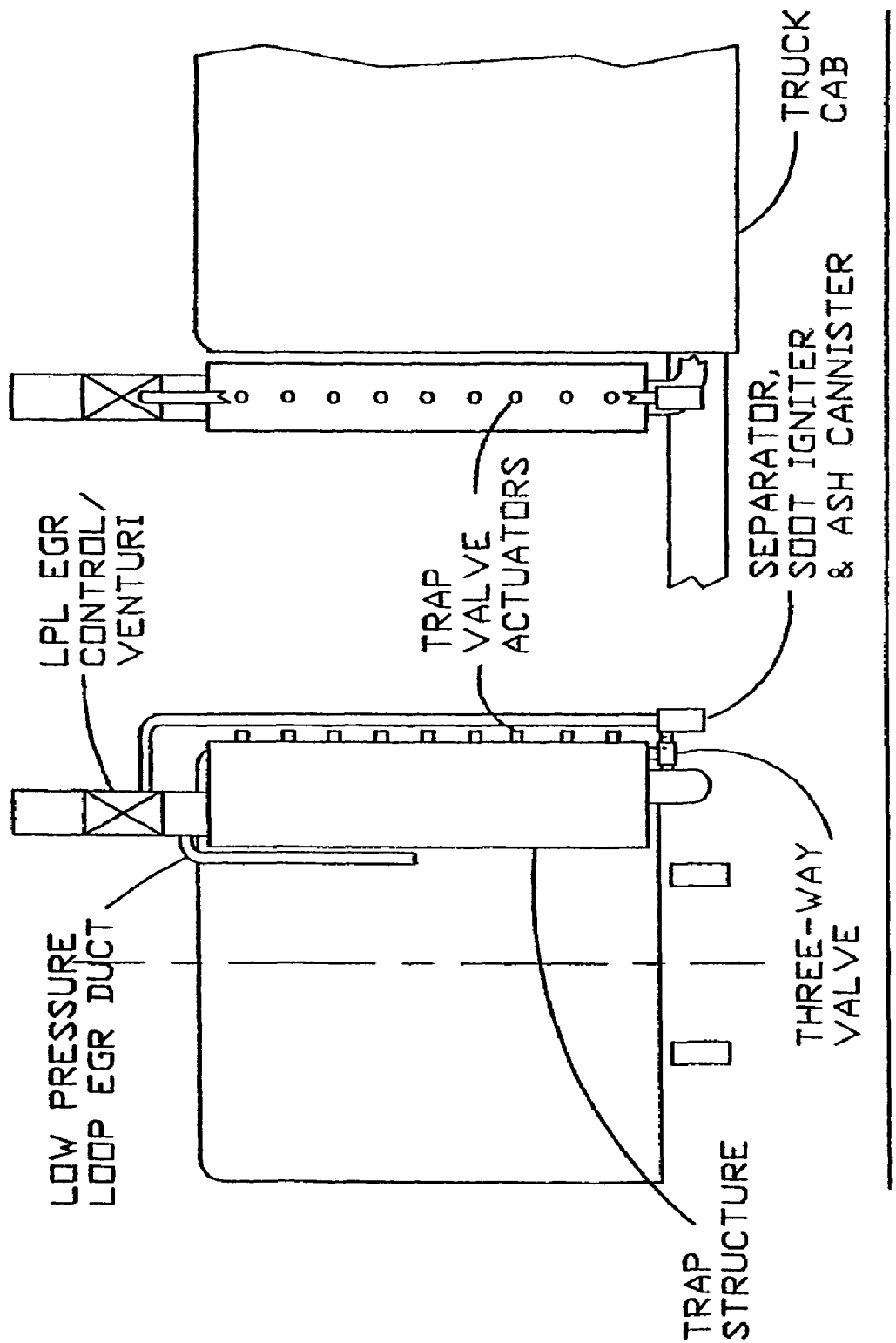
FIG. 23 is a view of how a particulate trap system consisting of wall flow traps that uses a relief valve/venturi to enhance regeneration and a low pressure loop system for reduction of nitrogen oxide emissions might look like when mounted on a highway truck.

FIG. 23 illustrates an installation of the wall flow trap system of FIG. 21 as it might be installed on the tractor of a highway truck. In this design, nine wall flow traps (5.66"× 6" long) are used, along with a relief valve/venturi connected to the separator, soot igniter and ash cannister. It also uses low pressure loop EGR. Although the operation of the designs shown in FIG. 22 and FIG. 23 are essentially the same, the smaller traps used in this design permit a reduced structure cross section that may be attractive for some applications.

Figures 24A, 24B:
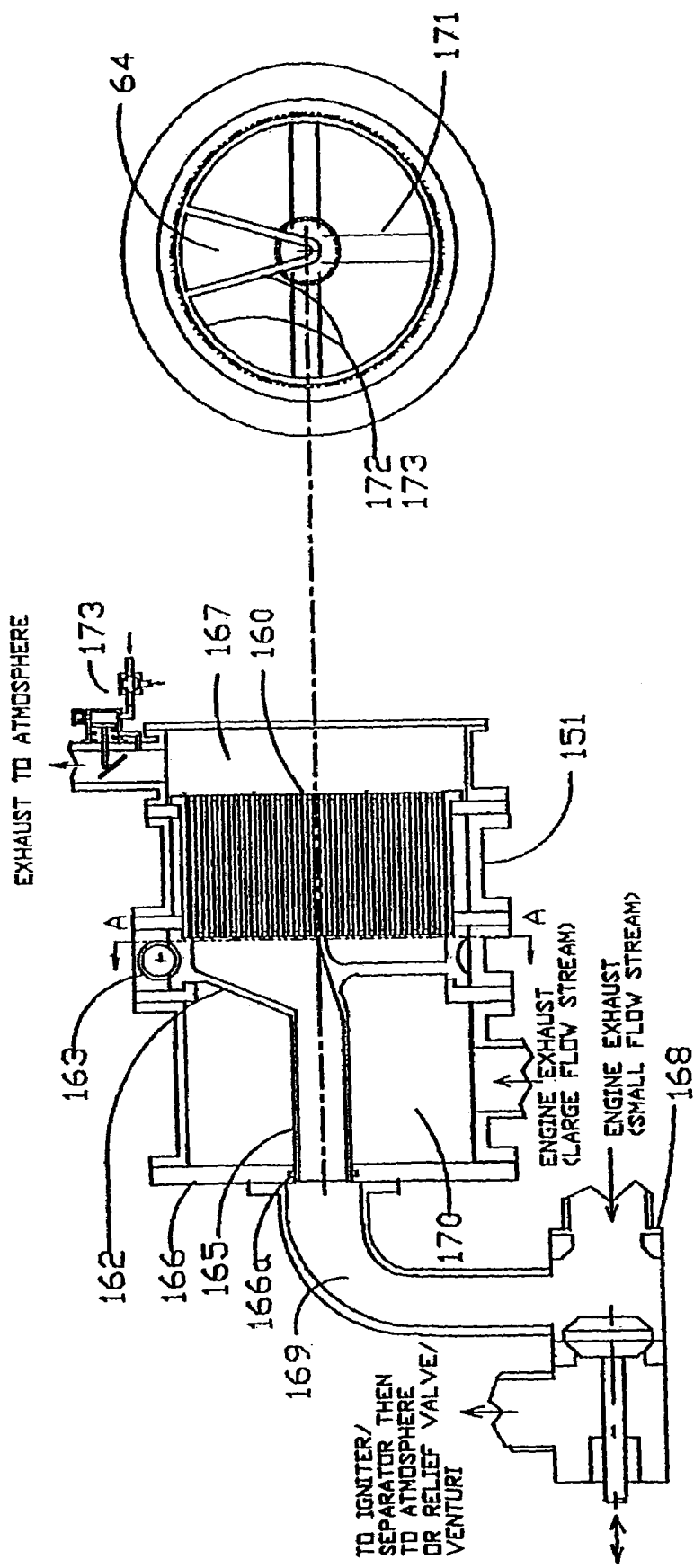
FIG. 24A is a cross sectional view of a single wall flow trap system.
FIG. 24B is a cross sectional view of the single wall flow trap system according to FIG. 24 taken along line a-a.

FIG. 24 shows a cross section of a single trap system that uses a wall flow trap that is regenerated by reverse flow of filtered exhaust gas. In this arrangement, the trap 160 is mounted and sealed in the trap system structure 161. A rotary valve/duct member 162 is turned at about one revolution per each half hour and is rotated by drive member 163. The duct part of the rotary member defines a pie shape at the point where it touches the face of the trap module as shown at 164 in section A-A. The tubular end 165 of the rotary member duct is symmetrical about the trap centerline and is rotated in bulkhead 166 and sealed against axial leakage by seal 166a. The circular chamber 167 at the exit of the trap passages connects with the passage leading to the type of relief valve employed.

In operation, the largest part of the exhaust passes into the trap passage labeled large flow stream. Also a smaller portion of the exhaust flow is passed in to valve assembly 168 and thence through passage 169 to enter the cylindrical portion 165 of the rotary member 162.

In normal trapping operation, the large flow enters the passage in the trap that is so labeled, passes into volume 170 and from this volume enters the open ends of the majority (⅚ to 19/20 of the total) of the trap entrance passages that are not covered by the rotating pie shaped duct. The small exhaust flow enters valve 168, passes through passage 169 and then through the rotating duct 165 and into the trap entrance passages encompassed by the pie shaped duct 164. It should be noted that spoke members 171 are used to maintain the integrity of the rotary member and play no other role. The shape of the contact between the rotary member and the trap is shown by the approximately 0.25 inch wide contacting members 172. As the trap continues to operate, the flow entering the trap passages passes through the porous walls of the channels and then exits through the clean or exit channels to then pass into channel 167 and thence through the open relief valve to the atmosphere.

When the trap system control senses that regeneration is required, the relief valve assembly 173 is activated, thus causing a constant pressure of 30 in. wg. to occur in the filtered exhaust in channel 167 and also in the clean exit passages of the trap. Shortly after this pressure rises and stabilizes, three-way valve 108 is actuated to the right and seats thus shutting off all of the small flow to the trap passage 169. By this same action, channel 169 is opened to much lower pressure and this causes the 30 in. wg. pressure in channel 167 to flow back through the porous walls of the passages encompassed by duct/trap contact 164. This dislodges and erodes the soot/ash cake and carries it out through valve 162 to be disposed of as discussed for the multi-trap system. Again, because exhaust is continually flowing into channel 167, the reverse pressure will be constant at 30 in. wg. as long as the relief valve is activated because filtered exhaust is continuously flowing from the much more numerous passages through which the entire exhaust gas flow is passing. Each of the passages will experience this high pressure reverse flow as long as they are encompassed within the contact pie shape 164. Though not shown, it will be understood that the previously described venturi could be used to increase the reverse flow pressure and then enhance regeneration.

Figure 25:
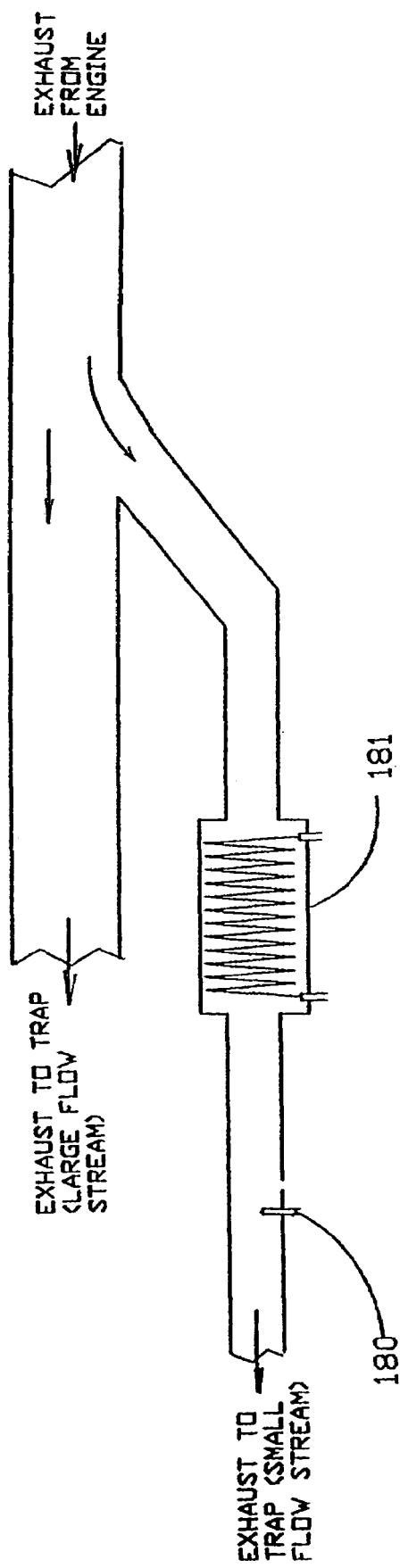
FIG. 25 is a schematic of an auxiliary heater that can be used to heat the small flow exhaust stream of any of the systems of the invention to burn away any remaining soot.

While we believe that the trap systems shown in FIG. 15 and FIG. 24 will effectively remove substantially all of the soot/ash cake in the passages, there may be some conditions such as very cold ambient where heat may need to be added to more completely burn out the soot. FIG. 25 shows the placement of an electrical heater 181 in the small flow passage that can be used to heat the small flow of exhaust gas to above the ignition temperature of the soot. This would only be used following reverse flow regeneration of the particulate trap system to insure that most of the soot/ash deposits were removed from the trap to prevent trap damage caused by combustion of the soot in the trap. The control system would initiate the reverse flow regeneration phase and then, if engine back pressure or other engine parameters indicated that additional trap cleaning were necessary, the control would return the three-way valve to the "normal" position and energize the heater for at least one complete cycle. Because of the small flow rate, this can be accomplished with a relatively small heater and minimal expenditure of energy. Thermocouple 180 is used to sense the temperature and to reduce or shut off the electrical energy when the necessary small flow temperature is reached. A small burner could be used as an alternative to the electric heater.

FIGS. 26-30 cover the changes necessary to modify the aforementioned reverse flow embodiments that are fundamentally very efficient particulate trap systems into the advanced adsorber-catalyst particulate trap systems that will be required to achieve the very stringent 2007 EPA standards using ultra low sulfur fuel (10 ppm). An important advantage of the forgoing particulate trap systems is that substantially the same trap structure, trap control valves, exhaust relief valves, etc. will be used for the adsorber-catalyst systems. The principal difference will be the application of the wash coats of BaO and Pt. etc. catalysts to the inner surfaces of the trap channels, use of insulation to keep the traps hot and use of a divider enrichment device to split the exhaust into two streams. One of these streams will be of large flow ($5/6$-$19/20$ of total exhaust flow rate) of normal (lean) exhaust and the other a much smaller flow ($1/6$-$1/20$ of the total exhaust flow rate) and this stream will be enriched by burning fuel at stoichiometric conditions to provide an excess of CO and/or HC. The normal (lean) stream and the enriched stoichiometric streams are required for the adsorber-catalyst process as will be described.

In this patent, all values are to be considered as approximate and the values may vary some in an actual adsorption/reduction particulate trap system as a result of test experience.

Exhaust Gas Divider and Treatment Apparatus

Figure 26:
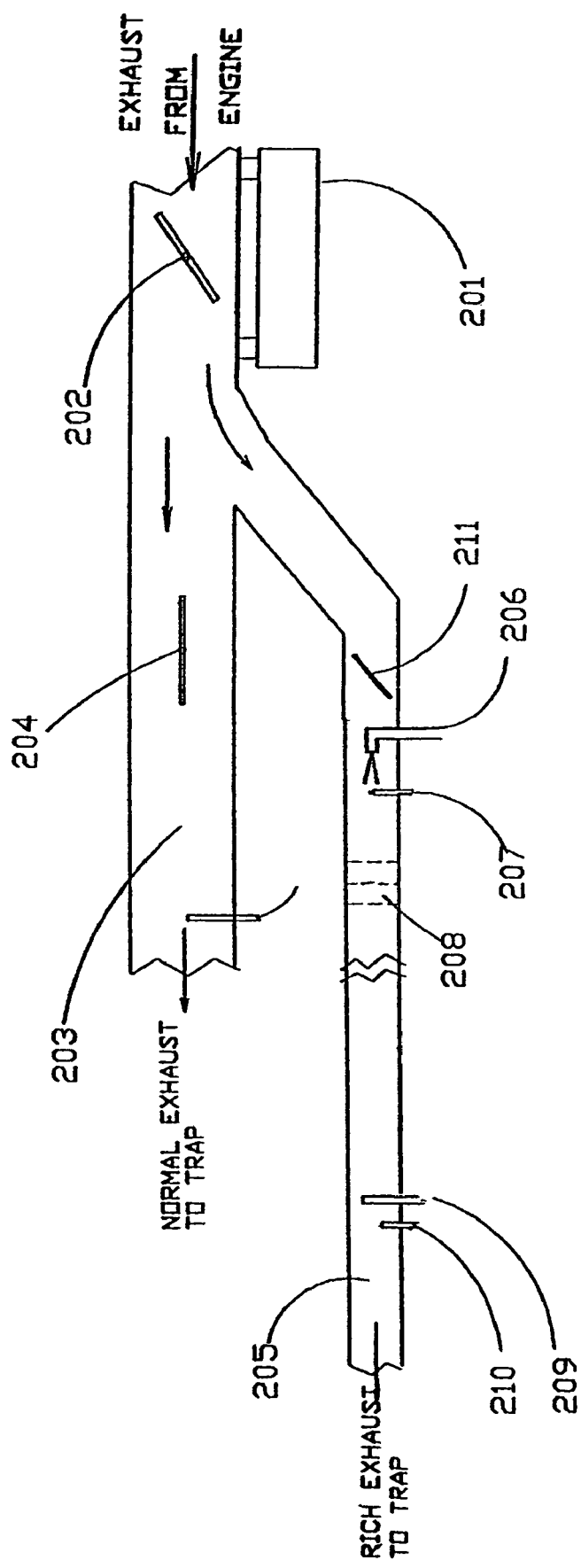
FIG. 26 is a schematic illustration of an exhaust divider and enrichment device used to enrich a smaller flow of the exhaust gas to stoichiometric mixture as part of a the adsorber-catalyst particulate trap and NOx reducer systems of the invention.

One purpose of the gas stream divider shown in FIG. 26, is to divide the engine exhaust into two streams prior to these being directed to the respective entry passages in the adsorber-catalyst particulate trap(s). One of these streams has flow rate of about $1/6$ to $1/20$ of the engine exhaust mass flow rate at a given normal engine operating condition, is enriched with hydrocarbon (HC) and is termed the "rich exhaust" stream. The other stream contains the remainder of the engine exhaust mass flow rate ($5/6$ to $19/20$) which remains unchanged in its content and is termed the "normal exhaust" stream. These two streams pass through appropriate pipes until they enter the respective labeled passage-ways in either the multi-trap or single-trap adsorber-catalyst particulate trap structure, with which it is used.

The relative flow rates and temperature of these two exhaust streams can be varied by the control system as required to achieve best NOx reduction with a minimum usage of added fuel, to periodically remove collected ash and to periodically remove sulfur contamination of the adsorber and/or catalyst coatings.

In operation, exhaust gas from the engine enters duct 203 as noted on the drawing. If the temperature of the larger normal exhaust stream at the point where it enters the trap structure after passing through duct 203, as indicated by thermocouple 212, is between 100 and 450° C., the temperature control valve 202 will remain fully open and the flow will continue unaffected down the duct 203. If the temperature is above 450° C., valve 202 will be partially closed by the EEC and some flow will be diverted to the exhaust-to-air or exhaust-to-coolant heat exchanger 201. This action will reduce the temperature of the normal exhaust stream at the point where it enters the trap structure. This closed loop control action will continue until the control valve stabilizes wherein the amount of flow passing through the cooler is just sufficient to keep the temperature at thermocouple 212 at just about 450° C. If the temperature at the normal exhaust entry into the trap structure is below about 80° C., and if the heat exchanger is of the exhaust-to-coolant type, valve 202 will closed by the EEC to divert exhaust gas through the heat exchanger to be heated by the coolant temperature. This action would only be used to speed heat-up of the exhaust gas flows after cold start or at perhaps extended idle.

After passing the temperature control valve 202, the engine exhaust gas is divided, as shown, with the bulk of the flow passing on down duct 203 as the normal exhaust stream. The smaller rich exhaust stream passes into the rich exhaust duct 205. The ratio of the normal stream flow rate to the rich stream flow rate during most operating conditions (through flow—all valves open) will be inherently controlled. This is because the area of the trap porous walls exposed to the rich flow and that exposed to the normal flow will be designed to be about the same ratio as that of the desired flow rates of the respective gas streams. This, coupled with the fact that the pressure difference across the trap walls will be about the same for each of the two exhaust gas streams, will inherently assure the desired relative flow rates for the two streams under most normal engine operating conditions.

The rich exhaust stream will pass rich stream control valve 211, which will be fully open. It will then pass the injector 206 which will inject a fine spray of diesel fuel into the stream which will be ignited by igniter 207 and then the burning flow of gas will pass through the flame holder/mixer section 208. This action will result in nearly complete combustion of a well mixed flow of fuel and air. This flow will eventually enter the "rich exhaust" passage in the trap structure. At or near this point will be located an oxygen sensor 209 and a thermocouple 210. The oxygen sensor 209 will detect any oxygen in the gas stream. If free oxygen exists, the oxygen sensor and a closed loop control will cause the injector 206 to increase the quantity of fuel injected until equilibrium exists with no oxygen sensed indicating a stoichiometric mixture (a lambda of 0.95-1.0) has been attained. If there is no oxygen sensed, the closed loop control will gradually decrease the amount of fuel injected until free oxygen is just detected.

The thermocouple 210 will determine whether the rich stream temperature is between 250 and 450° C. If the temperature is greater than 450° C., the valve 211 will close slightly, thus reducing the rate of flow of the exhaust entering the rich duct 205. This action will tend to cause the rich stream to become richer and this will be sensed by the oxygen sensor which will reduce the amount of fuel injected. Reducing the fuel rate will reduce the energy released and along with heat losses will reduce the temperature of the rich stream. This action will continue until equilibrium is achieved. If the temperature is below 250° C., valve 211 will remain fully open and valve 204 will close slightly and thus direct more exhaust into the rich stream in duct 205. This will cause the stream to become leaner resulting in the oxygen sensor and control increasing the amount of fuel injected by injector 206 and this action will continue until equilibrium exists when the temperature at thermocouple 210 reaches 250° C. as a result of the greater energy released by the combustor.

Cross Flow Multi-trap Adsorber-Catalyst Configuration

Figure 27:
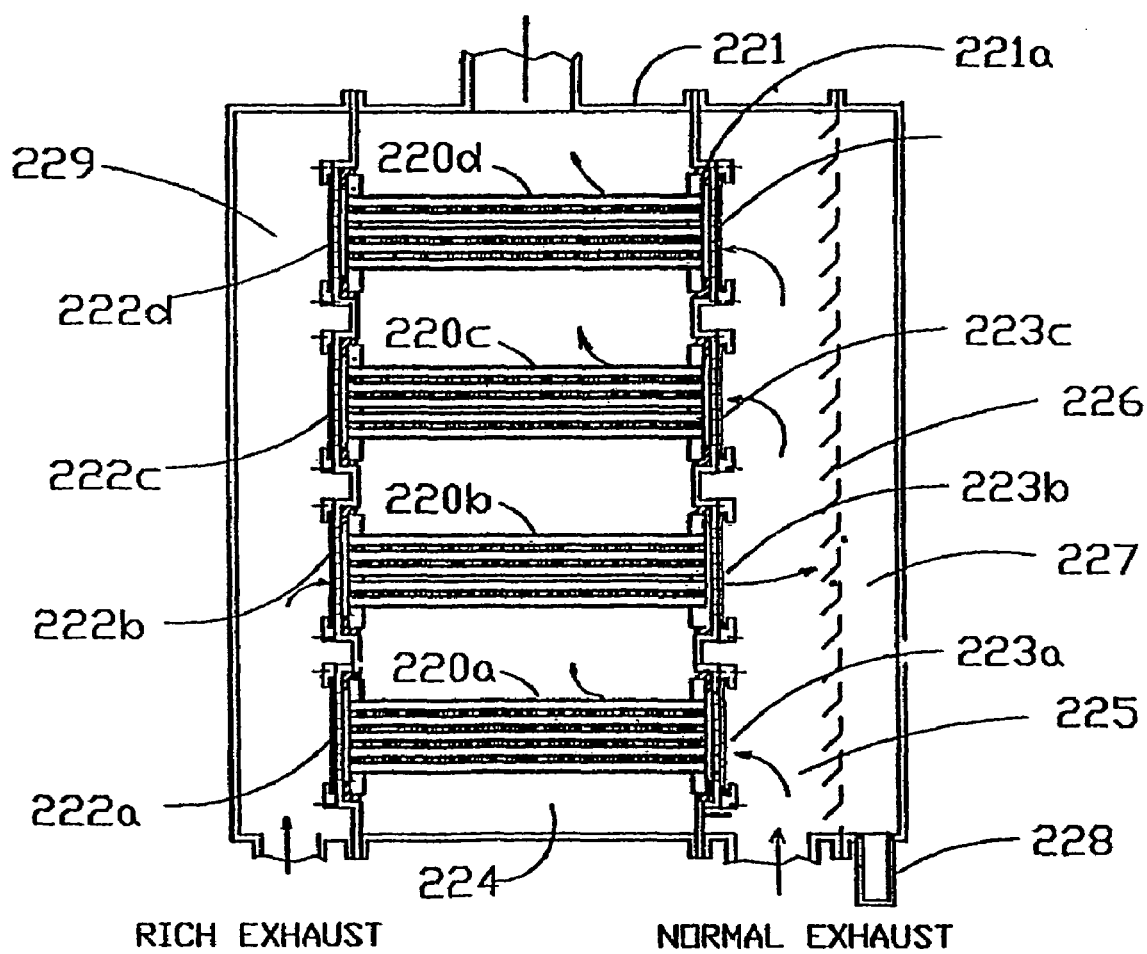
FIG. 27 is a cross sectional illustration of a cross flow multi-trap version of the adsorber-catalyst particulate trap and NOx reducer system.

FIG. 27 is a cross section of a cross flow multi-trap adsorber-catalyst system. This drawing shows four traps 220a, 220b, 220c and 220d but and actual system might have 6 to 15 individual cross flow traps in which the passages have porous walls through which the exhaust gas will pass to be filtered. The inner surface of the tubular passages will be coated with BaO and with more conventional precious metal catalysts such as Pt, Rh, Pd, etc. These catalysts will provide adsorption of the NOx while the platinum etc., coatings will cause reduction of the NOx by CO, as previously described.

The above listed traps are mounted in structure 221 and the ends of each are sealed by a high temperature sealant such as Interam as shown at 221a. The entry of rich exhaust gas into the trap modules is controlled by open-close slide valves 222a, 222b, 222c and 222d located at the left end of the traps having the same designation letters. Entry of normal exhaust gas into the right end of the traps is controlled by similar open-close slide valves 223a, 223b, 223c, and 223d that are located at the right end of the traps having the same designation letters. The chamber 224 surrounding the trap modules leads to the exit of the filtered exhaust to the atmosphere. No exhaust gas can get into chamber 224 and thence to the atmosphere without first passing through the porous walls of the cross flow passages.

Selecting a given moment in usual operation, normal exhaust at a temperature in the range of 250-450° C. will arrive from the divider/treatment apparatus and enter chamber 225 and from there enter open valves 223a, 223c and 223d (at a given moment) but no flow will enter the trap through valve 223b which is closed. Similarly, rich exhaust from the divider/treatment device will enter chamber 229 and from there enter trap 220b through the open valve 222b but will be blocked from entering traps 220a, 220c and 220d because valves 222a, 222c and 222d are closed. This action results in the NOx in the normal exhaust stream, which is lean, being adsorbed and stored in the BaO coating in the traps 220a, 220c and 220d while the rest of the exhaust gas passes on through the trap into chamber 224 and thence to the atmosphere. At the same moment, the rich exhaust at a similar temperature is entering trap 220b as noted above. This exhaust stream which is rich in hydrocarbons releases the stored NOx from the BaO layer and this is almost instantly reduced by the CO as a result of the Pt, Rh, etc. catalytic coating, resulting in the formation of N2, $CO_2$ etc. and then the cleaned exhaust gas passes through the porous wall into chamber 224 and thence to the atmosphere.

After a few seconds of this operation, the valve 222b will close and valve 223b will open. Also, at the same instant valve 222c will open and valve 223c will close. These valve actuations will result in the rich exhaust stream now entering trap 220c releasing and reducing its stored NOx while trap 220b in turn accepts lean normal exhaust and stores the NOx contained therein.

The above actions continue all the while that the engine is operating with each trap, in turn, receiving lean exhaust and storing its contained NOx and, in turn, receiving the rich exhaust stream for a few seconds to release and reduce the NOx that was stored therein. The temperature of the exhaust gas streams and of the traps 220 are maintained at the correct temperature for effective operation by the previously described action of the divider/treatment device ahead of the traps.

Although the soot particulate will be substantially continuously burned and thus removed from the trap with the adsorption/reduction system, incombustible ash will remain in the trap and increase engine backpressure unless removed. In our system the EEC will sense engine operating conditions along with backpressure to determine if the ash build-up needs removal. If so, the control will first cause valve 204 in FIG. 26 to partially close to cause the pressure in rich exhaust duct 205 to exceed that in normal exhaust duct 203 by 10 to 40 in. W.G. Referring to FIG. 27, this pressure difference will, of course, also exist between chamber 229 and 225. The control will also direct all of the valves 223 to remain open while the valves 222 each open, in turn, through one full sequence as explained previously. This action will result in a strong flow (50-150 fps) of rich gas to pass through each trap, in turn, thus blowing our the accumulated ash. Because this sequence will require only a short time, it may be allowable to also shut off the injected fuel during this process. The ash particles blown out will be carried by inertia and enter the louvers in plate 226. Upon reaching the relatively quiescent chamber 227, the ash will settle by gravity into the ash canister 228. Following this ash removal sequence, the system will return to normal operation mode, discussed previously.

If the fuel contains any sulfur, it will eventually collect in the BaO coating and destroy its effectiveness to store NOx as discussed earlier. Also, as discussed earlier, this contamination can be removed by heating the trap to 700° C. in the presence of HC. The need to regenerate the trap of sulfur can be determined by miles or hours of operation or perhaps other sensing means. When sulfur removal is required, the control system will slow the time required to go through a complete sequence of the trap valve events from the normal operation time value of 1 to 2 minutes to perhaps a total time of 1 to 1½ hours. Referring to FIG. 26, the control will also change the interaction between the thermocouple 212 and valve 202 to limit the temperature entering duct 203 to 700° C., rather than 450° C. as exists during normal operation. The temperature of the flow of rich exhaust gas will be sensed by thermocouple 210 and if below 700° C. the control will open valve 211 fully. If the temperature is still lower than 700 deg C., the control will partially close valve 204 to direct additional exhaust gas into duct 205. This will result in increased fuel being injected by injector 206 to keep the mixture stoichiometric and thus additional heat will be supplied to the rich exhaust passage at the trap until eventually the temperature will reach equilibrium at 700° C. The high 700° C. temperature of the trap passages coupled with the longer period that it is sustained will result in the sulfur contamination being released as $H_2S$ and released to the atmosphere.

Cross Flow Single-Trap Adsorber-Catalyst Configuration

Figure 28A:
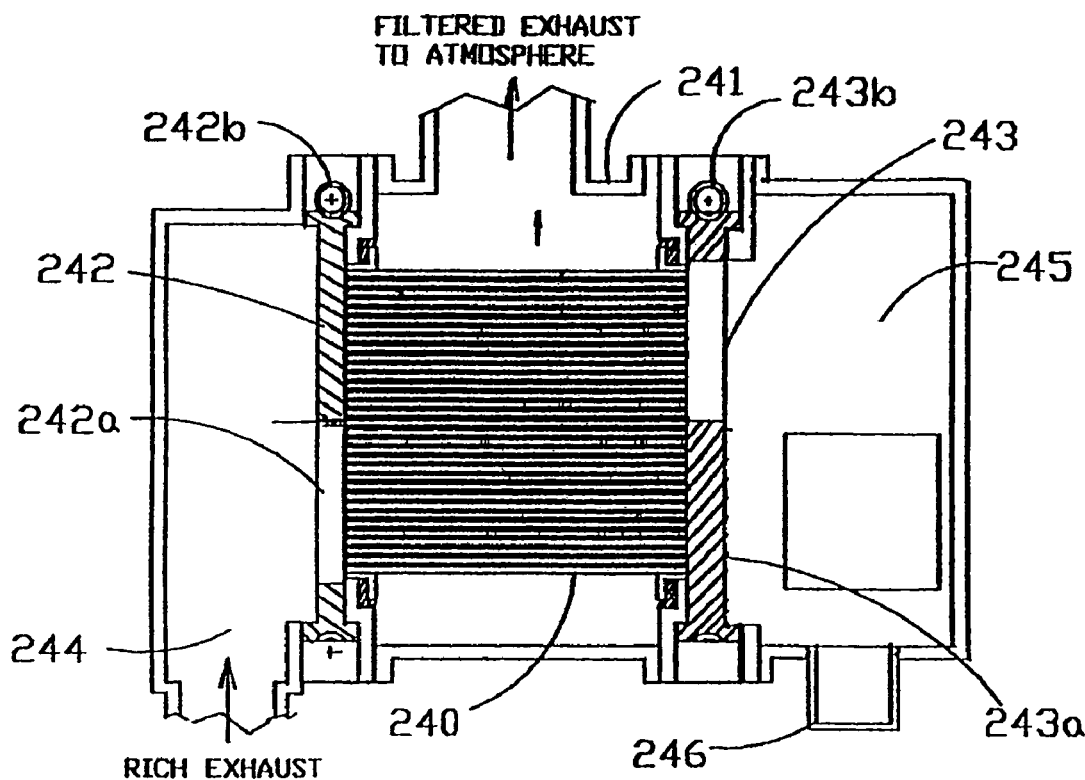
FIG. 28A is a cross sectional illustration of a cross flow single trap version of the adsorber-catalyst particulate trap and NOx reducer system.
Figure 28B:
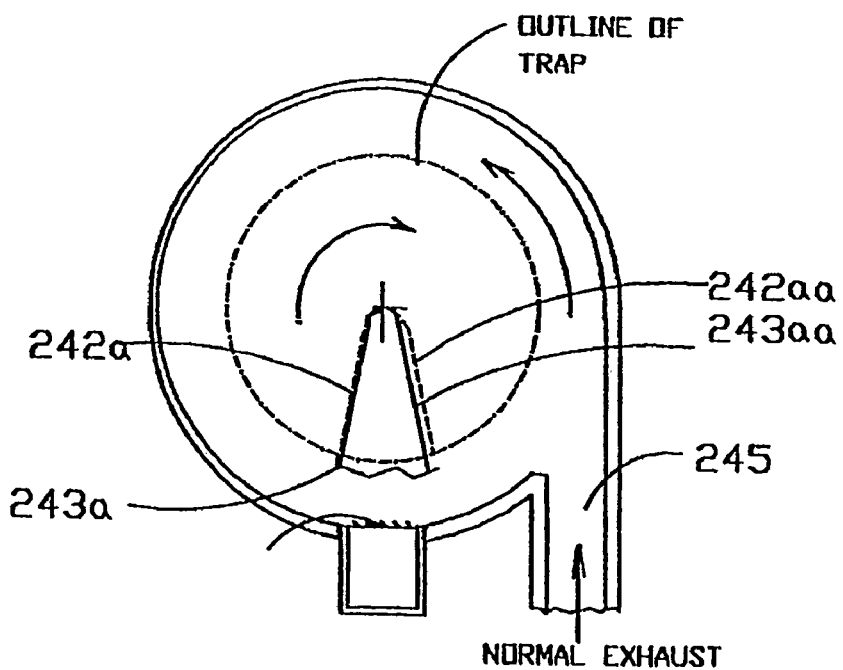

FIG. 28 shows in longitudinal and transverse cross section the cross flow single-trap arrangement of the adsorber/reducer system. The larger single cross flow trap 240 is mounted in the structure 241 and the ends are sealed by high temperature sealant Interam. Rotary valves 242 and 243 are rotated at the same speed and in fixed angular relationship to each other. Rotation speed under normal operation is 1 to 2 rpm and it is driven by synchronized drive gears 242b and 243b. The rotary valves are sealably fitted against the respective machined faces of the trap 240. Rotary valve 242 contains a narrow slit (about 3 to 60 degrees wide) to admit ½0 to ⅙ of the total exhaust flow to the trap passages. Rotary valve 243 contains a strut 243a about (2 to 40 degrees wide) that is sealably fitted against the trap face. The rich exhaust stream after being received from the divider/treatment system in FIG. 26, is directed into the chamber 244. The normal exhaust stream when received tangentially enters chamber 245, as shown.

In operation, the normal exhaust stream after entering chamber 245 and spins as the flow moves to the center and enters most of the passages of the trap (19⁄20 to ⅚ of the total trap passages). This lean normal flow then passes through the porous walls of the passages wherein the NOx is adsorbed by the BaO layer. The rich exhaust flow enters the fewer number of trap passages (½0 to ⅙ of the total trap passages) wherein this rich flow releases the stored NOx from the BaO coating and the released NOx is then reacted almost instantly with the CO to form N2 and $CO_2$. The stream, now cleaned of NOx, passes on through the porous walls and to the atmosphere. Other control functions, such as maintenance of correct temperatures, etc., are substantially the same as in the case of the multi-trap system.

The soot is burned by the elevated temperatures and aided by the presence of the precious metal catalyst as previously described for the multi-trap system. However, again, accumulated noncombustible ash must be periodically removed to prevent excessive increase in engine backpressure. Again, this is accomplished automatically by the control unit upon sensing that ash contamination is excessive. The valve 204 in FIG. 26 is partially closed to raise the pressure in trap system 244 to a pressure level that is about 10 to 20 in. W.G. greater than the pressure in chamber 245. This results in a flow of rich gas completely through the trap from the slit 42a, through the trap passages and exiting into chamber 245. It is emphasized that when the slit first uncovers a passage, the exit end is closed and the rich gas must pass through the porous walls whereby the NOx release and reduction occur. However, a little before the slit closes the passages, the strut, which is narrower than the slit, will have uncovered the exit of some of the passages. This brief underlap period is illustrated by the small space between the trailing edge of the strut 243aa and the trailing edge of the slit 242aa and permits rich exhaust to flow at high velocity (50-100 fps) to erode, dislodge and remove the ash deposits. The ash particles are mixed in with the swirling normal exhaust in chamber 245, whereby the centrifugal force created by the swirl forces them to the periphery of chamber 245 and these are then caught by the louvers 46a and deposited in the ash canister 246.

The process for removing the sulfur contamination from the single-trap system is very similar to that used for the multi-trap system. However, increasing the time for a complete sequence from 1 to 2 minutes to 1 to 1½ hour is accomplished by reducing the speed of the rotary valve drive to ⅟60 of normal speed. All other functions are substantially the same.

Wall Flow Multi-Trap Adsorber-Catalyst System

Figure 29:
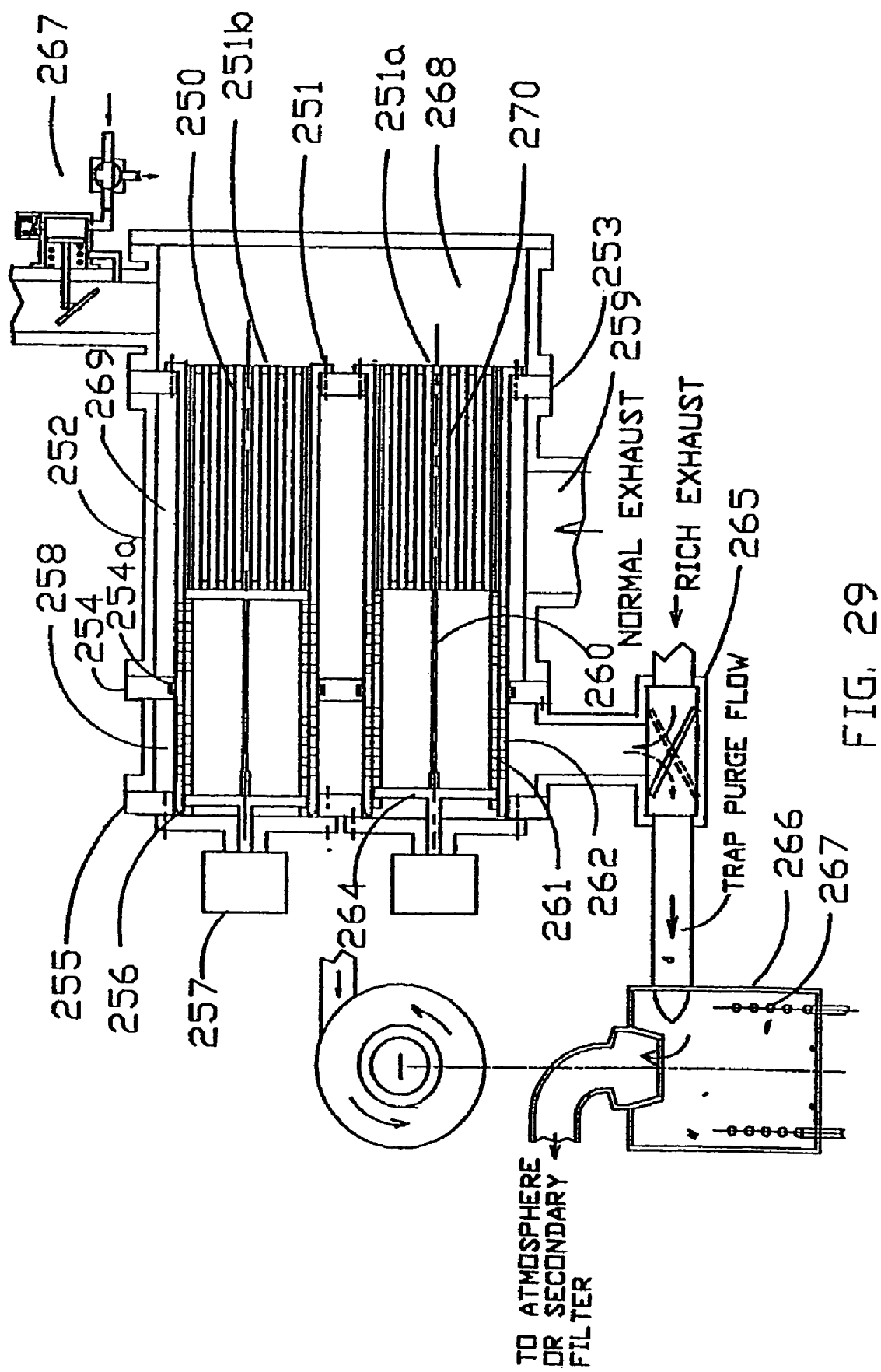
FIG. 29 is a cross sectional illustration of a wall flow multi-trap version of the adsorber-catalyst particulate trap and NOx reducer system.

FIG. 29 is a cross section of a wall flow multi-trap adsorber-catalyst configuration. The traps 250 are the same as used with the reverse flow regeneration systems except the passages are coated with a BaO wash coat and a Pt., Rh, etc. precious metal catalyst as indicated at 270. Another difference between the adsorber-catalyst configurations compared with the reverse flow regenerated configurations is that it will be necessary to apply insulation (not shown) on the inner surfaces of the trap system passages to reduce heat loss. This is especially important in the case of the multi-trap configurations. The rich and normal exhaust streams from the divider/treatment device in FIG. 26 are directed to the entrance passages that are so labeled in FIG. 29.

At a given point in time during normal engine operation, all but one of the cylindrical perforated slide valve members 261 are in the position shown for trap 251b, thus permitting normal (lean) exhaust gas to enter all of the traps from channel 269, except one. Because the exhaust temperature is within a window of about 250-450° C., the NOx in this flow is adsorbed in the BaO coating on the traps as it passes through the porous walls. This results in the rich stream first releasing the stored NOx from the BaO as primarily $NO_2$ and this, because of the presence of the Pt, Rh, etc. catalyst, immediately reacts with FIG. 29 is a cross section of a wall flow multi-trap adsorber-catalyst configuration. The traps 250 are the same as used with the reverse flow regeneration systems except the passages are coated with a BaO wash coat and a Pt., Rh, etc. precious metal catalyst as indicated at 270. Another difference between the adsorber-catalyst configurations compared with the reverse flow regenerated configurations is that it will be necessary to apply insulation (not shown) on the inner surfaces of the trap system passages to reduce heat loss. This is especially important in the case of the multi-trap configurations. The rich and normal exhaust streams from the divider/treatment device in FIG. 9 are directed to the entrance passages that are so labeled in FIG. 29.

At a given point in time during normal engine operation, all but one of the cylindrical perforated slide valve members 261 are in the position shown for trap 251b, thus permitting normal (lean) exhaust gas to enter all of the traps from channel 269, except one. Because the exhaust temperature is within a window of about 250-450° C., the NOx in this flow is adsorbed in the BaO coating on the traps as it passes through the porous walls. This results in the rich stream first releasing the stored NOx from the BaO as primarily $NO_2$ and this, because of the presence of the Pt, Rh, etc. catalyst, immediately reacts with the CO to form N2 and $CO_2$. The stream, now cleaned of NOx, passes on through the porous walls and to the atmosphere. Other control functions, such as maintenance of correct temperatures, etc., are substantially the same as in the case of the multi-trap system. The above described conditions last for 1-4 seconds and after this time the slide valve 261 is actuated for trap 251a, thus shutting off further in-flow of rich exhaust gas and permitting normal exhaust gas to flow through trap 251a. At the same instant, the slide valve for trap 251b is actuated and this opens channel 258 to permit rich exhaust gas to enter trap 251b. This flow of rich exhaust gas releases the stored NOx from the BaO coating as primarily $NO_2$ which, assisted by the precious metal catalyst, is immediately converted by the CO in the rich exhaust stream to $N_2$ and $CO_2$ and passes to the atmosphere.

The above described events are repeated for each of the traps, in turn. The total cycle time must not exceed four minutes, preferably less, and the period of rich exhaust gas flow is about one to four seconds. The selected actual timing of the events will depend upon the number of traps used for a particular engine application and empirical results. For example, it may be desirable to reduce the flow rate of the rich exhaust stream by partially closing valve 211 in the flow divider/treatment device of FIG. 26. The reduced space velocity in trap 251a (as shown) may permit extending the release/reduction process time and provide more efficient use of the rich exhaust gas. The system lends itself to many control strategies that can be effected by the EEC.

Although the soot collected in the traps is substantially continuously burned in this adsorber-catalyst system by the temperature of the exhaust gas coupled with the Pt, Rh, etc. catalyst, incombustible ash will collect and must be periodically removed to prevent excessive back pressure on the engine. When the EEC senses a significant increase in engine backpressure, the relief valve 267 is activated, thus increasing the pressure in channel 268 to 30 in. W.G. This action is followed by simultaneously changing the position of three-way valve 265 to shut off the flow of rich gas to channel 258 while simultaneously opening channel 258 to the separator or a secondary filter/canister which are substantially at ambient pressure. The injector 206 in FIG. 26 would also be shut off during this action. The 30 in. W.G. pressure in channel 258 will thus result in a strong reverse flow by through the trap walls which will dislodge and carry the ash particles out of the trap system to a separator and/or a canister and secondary filter to be stored and periodically removed during normal vehicle maintenance.

As mentioned earlier, if there is any sulfur in the fuel the BaO will eventually become contaminated by sulfur. This progressively destroys the capability of the BaO coating to adsorb NOx and it will pass on out to the atmosphere. The sulfur contamination can be regenerated by heating the trap to about 700° C. in a rich stream containing HC and CO for several minutes.

Referring to FIG. 26, when sulfur contamination is sensed by some parameter or scheduled such as by time coupled with fuel sulfur content, the EEC changes the interaction between the thermocouple 212 and the exhaust to air or exhaust to coolant heat exchanger by-pass valve 202 to provide cooling of the exhaust only if it is above 700° C. instead of the 450° C. in normal operation. At the same time, the control also changes the interaction between thermocouple 212 and control valve 204. If the temperature of the thermocouple 210 is below 700° C., valve 204 will close slightly to cause a greater percentage of the engine exhaust to pass through rich duct 205. In order to maintain the desired stoichiometric mixture, the injector 206 will, through its closed loop control with oxygen sensor 209, increase the amount of fuel injected. This will increase the energy, and thus, the temperature of the rich exhaust stream as it approaches the trap system until at least 700° C. is achieved. The EEC will also increase the time of the aforementioned events by a factor of about sixty. Thus, the hot (700° C.) rich stream will pass through a contaminated trap for 1 to 4 minutes and thus provide time for each trap to have the sulfur contaminated trap completely regenerated. The valves 261 will be actuated as required to sequentially regenerate each of the traps, in turn, until all have been treated. The EEC will then return the system back to normal operation mode.

Wall Flow Single Trap Adsorber-Catalyst Configuration

Figures 30A, 30B:
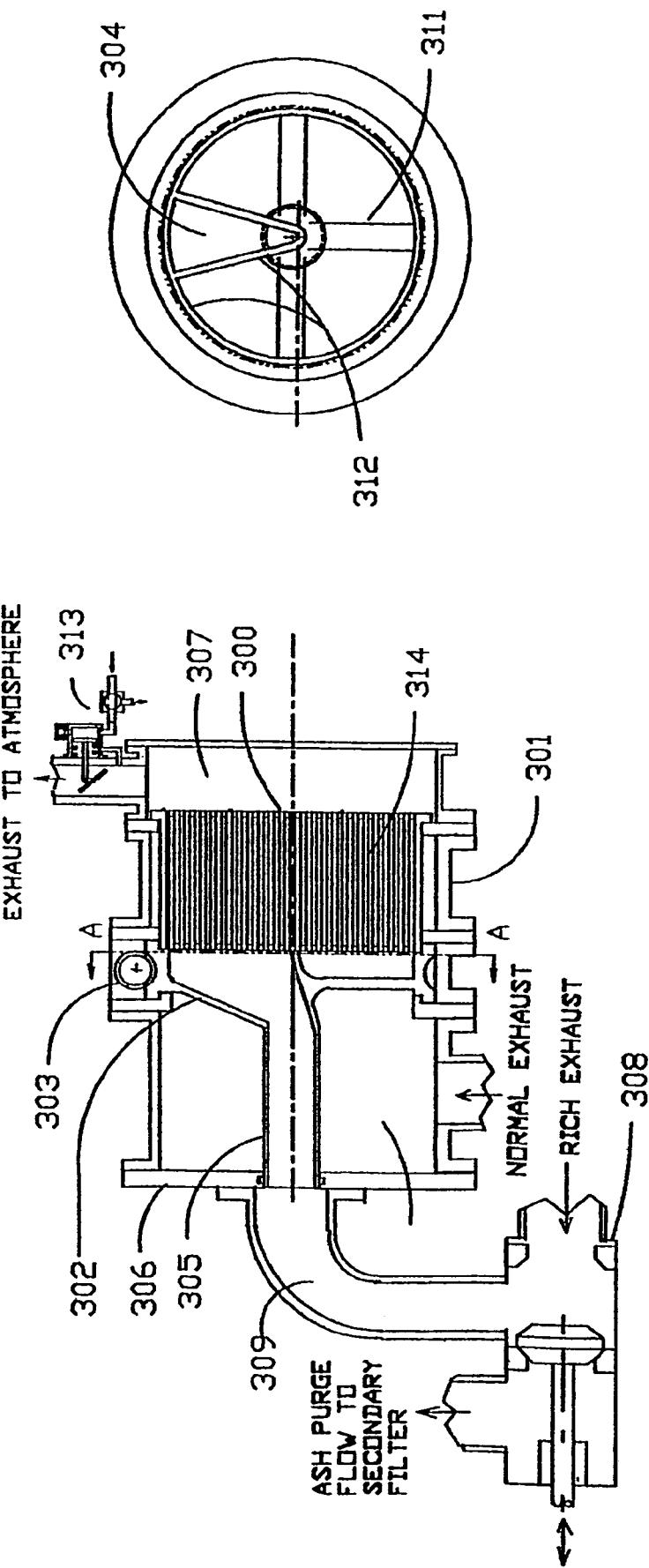
FIG. 30A is a cross sectional illustration of a wall flow single trap version of the adsorber-catalyst particulate trap and NOx reducer system.
FIG. 30B is a cross sectional illustration of the wall flow single trap version of the adsorber-catalyst particulate trap and NOx reducer system according to FIG. 30A taken along line a-a.

The changes to the single trap adsorber-catalyst configuration, shown in FIG. 30, are the same as those described for the multi-trap configuration except that the valve functions are carried out by a rotary valve instead of the plurality of cylindrical perforated slide valves. The interaction with the divider/treatment device in FIG. 26 is the same, as are the methods for periodic removal of ash. The general method of removing the sulfur contamination is the same except that the speed of rotation of the rotary valve is slowed by the EEC from 1-4 rpm to about 1 or 2 rph to provide a much longer time of exposure of the trap passages to the hot (700° C.) rich exhaust gas stream. The BaO and Pt, Rh, etc. coatings are also, of course, applied to the single trap as shown at 314.

While preferred embodiments of the invention have herein been illustrated and described, this has been done by way of illustration and not limitation, and the invention should not be limited except as required by the scope of the appended claims.

What is claimed is:

1. A particulate trap system for an internal combustion engine, comprising:
   a particulate trap module positioned to accept engine exhaust gas including a plurality of passages having porous walls for receiving the exhaust gas, wherein the porous walls filter particulates from the exhaust gas;
   a reversing apparatus, said reversing apparatus periodically reversing a portion of the filtered exhaust gas back through the porous walls in reverse flow at a pressure drop, resultant flow velocity, and duration sufficient to dislodge build-up of particulates from the porous walls; and
   a rotary valve, said rotary valve preventing exhaust gas entry into a minority of the passages and for connecting an entrance of the minority of the passages to a separation chamber, wherein the rotary valve rotates to sequentially cause reverse flow through the porous walls of each of the minority of the passages while permitting normal flow to continue through the porous walls of a majority of the trap passages.

2. A particulate trap system for an internal combustion engine, comprising:
   a particulate trap module positioned to accept engine exhaust gas including a plurality of passages having porous walls for receiving the exhaust gas, wherein the porous walls filter particulates from the exhaust gas;

a reversing apparatus, said reversing apparatus periodically reversing a portion of the filtered exhaust gas back through the porous walls in reverse flow at a pressure drop, resultant flow velocity, and duration sufficient to dislodge build-up of particulates from the porous walls; and wherein said reverse flow is entirely within the same exhaust channel through which exhaust is filtered.

3. A self-cleaning particulate filter module for a multi-cylinder internal combustion engine exhaust comprising:
   a particulate filter, said filter being disposed in a single exhaust channel, said channel being common to all cylinders, said particulate filter filtering particulates from the exhaust when said exhaust flows in a first direction;
   a flow reverser, said flow reverser being disposed within said single exhaust channel to clean particulate build up from said filter by reversing an exhaust flow through said filter in a second direction; and
   wherein said second flow direction is entirely within said single exhaust channel.

4. A self-cleaning particulate filter module for a multi-cylinder internal combustion engine exhaust comprising:
   a particulate filter, said filter being disposed in a single exhaust channel, said channel being common to all cylinders, said particulate filter filtering particulates from the exhaust when said exhaust flows in a first direction;
   a flow reverser, said flow reverser being disposed within said single exhaust channel to clean particulate build up from said filter by reversing an exhaust flow through said filter in a second direction; and
   wherein said reversed exhaust flow is filtered exhaust.

5. An exhaust particulate filter system for an internal combustion engine, comprising:
   a particulate trap; the particulate trap including a plurality of passages disposed to receive engine exhaust gas;
   an exit chamber for receiving filtered exhaust gas passing through the particulate trap;
   a separation chamber operatively connected to the particulate trap for receiving a reverse flow from a portion of the particulate trap;
   a flow restriction apparatus, said flow restriction apparatus being disposed to selectively create a pressure difference between the exit chamber and the separation chamber in response to a pre-established operating condition, such that the pressure in the exit chamber is greater than the pressure in the separation chamber, thereby forcing a portion of the filtered exhaust gas from the exit chamber back through a selected portion of the particulate trap in reverse flow and at sufficient pressure drop, resultant flow velocity, and duration to dislodge build-up of particulates from the particulate trap; and
   a flow directing device oriented to receive the reverse flow from the selected portion of the particulate trap and direct the reverse flow to the separation chamber.

6. The system of claim 5 wherein the particulate trap has porous walls for filtering particulate from the exhaust gas.

7. The system of claim 5 wherein the particulate trap filters soot.

8. The system of claim 5 wherein the particulate trap filters ash.

9. The particulate trap system according to claim 5, wherein the at least one particulate trap module is at least one monolithic cross flow trap module having a plurality of through flow passages.

10. The particulate trap system according to claim 5, wherein the at least one particulate trap module is at least one wall flow trap module.

11. A particulate trap system for an exhaust system of an internal combustion engine and including a monolithic wall-flow particulate trap having a plurality of contiguous porous walls,
    a remotely actuated relief valve downstream of said trap for periodically creating a reverse pressure throughout the exhaust system upstream of the relief valve and including said trap, and
    a reversing apparatus for periodically creating a reverse pressure drop across a portion of the contiguous porous walls of said trap to dislodge accumulated particulate and cause a portion of the filtered exhaust gas to flow back through said portion of the contiguous porous walls to remove particulate therefrom.

12. A particulate trap system according to claim 11 in which the reversing apparatus includes a relief valve at the downstream end of the trap, the relief valve having a first open position permitting unrestricted flow of filtered exhaust to the atmosphere and a second position restricting passage of the filtered exhaust until a pre-selected pressure level is reached.

13. A particulate trap system as set forth in claim 11 wherein the reversing apparatus includes a valve assembly at the upstream end of the trap and said valve assembly being movable between a first position allowing exhaust flow through said portion of the contiguous walls and a second position blocking such exhaust flow and creating the reverse pressure drop.

14. A method of regenerating a wall-flow particulate trap having a plurality of contiguous porous walls for filtering particulate from an exhaust system of an internal combustion engine, the method including the steps of:
    creating a backpressure in the entire exhaust system from a location downstream of the trap;
    creating a reverse pressure drop across only a portion of the porous walls to dislodge accumulated particulate therefrom; and
    causing a portion of filtered exhaust gas to flow back through said portion of the porous walls to carry the dislodged particulate out of the trap.

* * * * *